US 11,059,608 B2

(12) United States Patent
Holder et al.

(10) Patent No.: US 11,059,608 B2
(45) Date of Patent: Jul. 13, 2021

(54) EARTH TO ORBIT TRANSPORTATION SYSTEM

(71) Applicant: Radian Aerospace, Inc., Renton, WA (US)

(72) Inventors: Livingston L. Holder, Renton, WA (US); Gary C. Hudson, Renton, WA (US); Bevin C. McKinney, Renton, WA (US); Marshall L. Crenshaw, Renton, WA (US); Daniel Paul Raymer, Playa Del Rey, CA (US)

(73) Assignee: Radian Aerospace, Inc., Renton, WA (US)

( * ) Notice: Subject to any disclaimer, the term of this patent is extended or adjusted under 35 U.S.C. 154(b) by 0 days.

(21) Appl. No.: 16/745,187

(22) Filed: Jan. 16, 2020

(65) Prior Publication Data

US 2020/0198809 A1    Jun. 25, 2020

Related U.S. Application Data

(63) Continuation of application No. PCT/US2019/034003, filed on May 24, 2019.
(Continued)

(51) Int. Cl.
*B64G 1/00* (2006.01)
*B64G 1/40* (2006.01)
(Continued)

(52) U.S. Cl.
CPC ............... *B64G 1/14* (2013.01); *B64G 1/002* (2013.01); *B64G 1/402* (2013.01); *B64G 1/64* (2013.01); *B64G 5/00* (2013.01)

(58) Field of Classification Search
CPC .......... B64G 1/002; B64G 5/00; B64G 1/402; B64F 1/06; B64C 2201/084; F41F 3/0406
See application file for complete search history.

(56) References Cited

U.S. PATENT DOCUMENTS 2,569,887 A    10/1951   Daniel
2,734,702 A    2/1956    Northrop et al.
(Continued)

FOREIGN PATENT DOCUMENTS

GB    2211155     6/1989
RU    2046071     10/1995
(Continued)

OTHER PUBLICATIONS

International Search Report and Written Opinion for International Patent Application No. PCT/US2019/034003, Applicant: Radian Aerospace, Inc., dated Oct. 3, 2019, 13 pages.
(Continued)

*Primary Examiner* — Nicholas McFall
*Assistant Examiner* — Terri L Filosi
(74) *Attorney, Agent, or Firm* — Perkins Coie LLP

(57) ABSTRACT

Various embodiments of space launch vehicle systems and associated methods of manufacture and use are disclosed herein. In some embodiments, the systems include a reusable, horizontal takeoff/horizontal landing (HTHL), ground-assisted single-stage-to-orbit (SSTO) spaceplane that is capable of providing frequent deliveries of people and/or cargo to Low Earth Orbit (LEO). In some embodiments, the spaceplane can takeoff with the aid of a rocket-powered sled that, in addition to providing additional thrust for takeoff, can also provide propellant for the spaceplane engines during the takeoff run so that the spaceplane launches with full propellant tanks.

16 Claims, 36 Drawing Sheets

Related U.S. Application Data

(60) Provisional application No. 62/676,809, filed on May 25, 2018.

(51) Int. Cl.
    *B64G 5/00* (2006.01)
    *B64G 1/14* (2006.01)
    *B64G 1/64* (2006.01)

(56) References Cited

U.S. PATENT DOCUMENTS

| | | | |
|---|---|---|---|
| 5,626,310 | A | 5/1997 | Kelly |
| 6,394,391 | B1 | 5/2002 | Lo |
| 6,569,171 | B2 | 5/2003 | Bulman |
| 2008/0072607 | A1* | 3/2008 | Haberbusch .......... F25B 9/145 62/6 |
| 2011/0042521 | A1* | 2/2011 | Sample ................ B64G 1/002 244/159.3 |

FOREIGN PATENT DOCUMENTS

| | | | |
|---|---|---|---|
| RU | 2096273 | | 11/1997 |
| RU | 2155147 | | 8/2000 |
| RU | 2187446 | | 8/2002 |
| RU | 2193510 | | 11/2002 |
| RU | 2196078 | | 1/2003 |
| RU | 2215673 | | 11/2003 |
| RU | 2217619 | | 11/2003 |
| RU | 2386890 | | 4/2010 |
| RU | 2577908 | | 3/2016 |
| RU | 2581756 | | 4/2016 |
| WO | WO-2008066512 | A2 * | 6/2008 ........... B64G 1/1078 |

OTHER PUBLICATIONS

Bulman, Melvin J., "Thrust Augmented Nozzle (TAN): the New Paradigm for Booster Rockets (Preprint)," American Institute of Aeronauctics and Astrnautics, 2006, 9 pages.

* cited by examiner

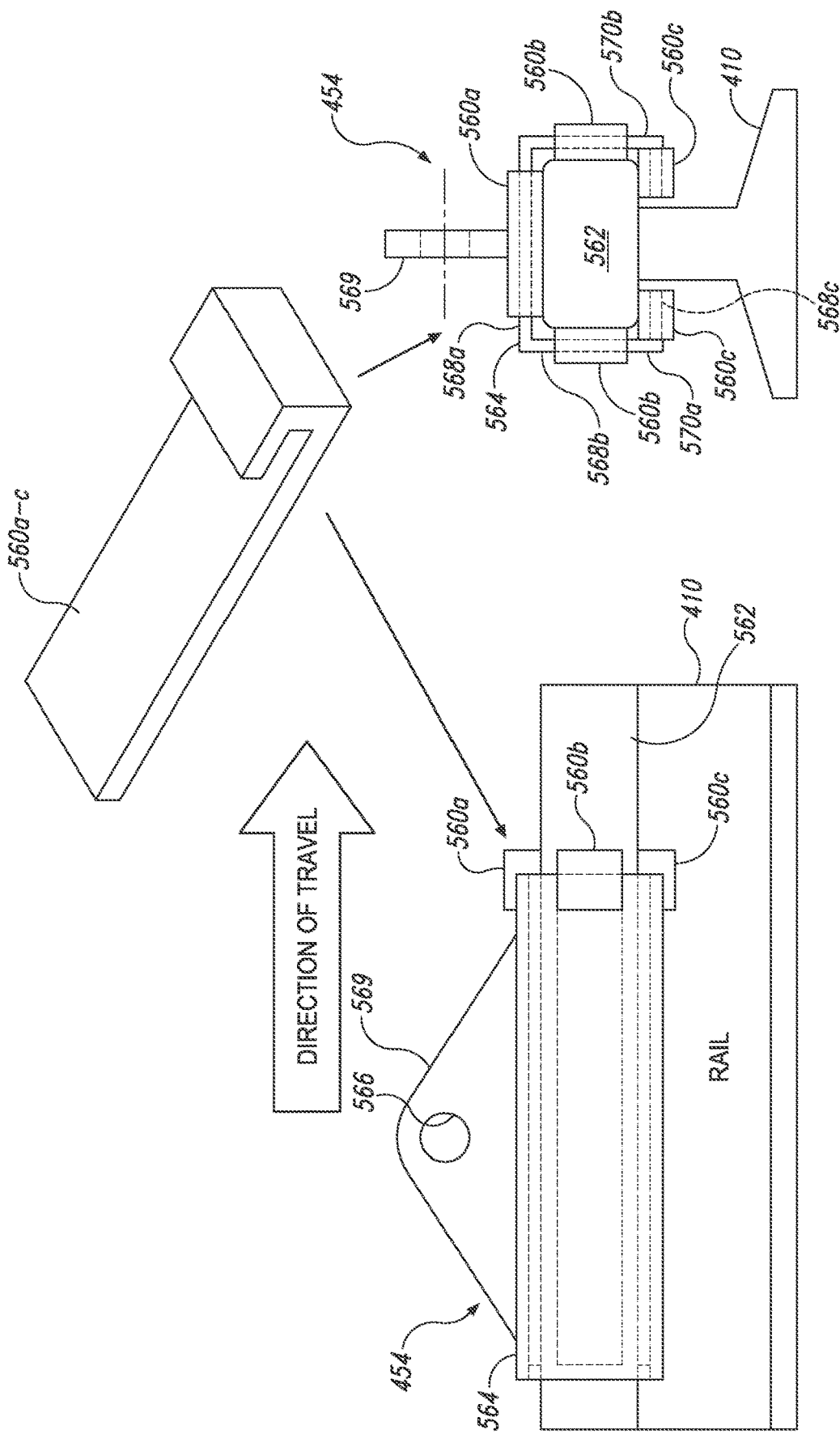

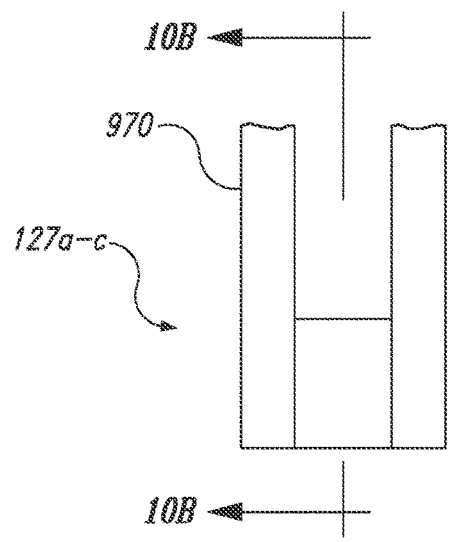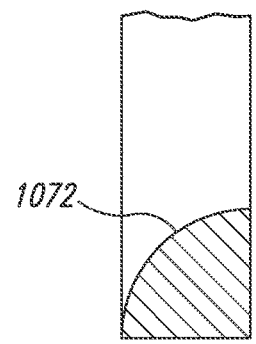
*Fig. 10A*  *Fig. 10B*
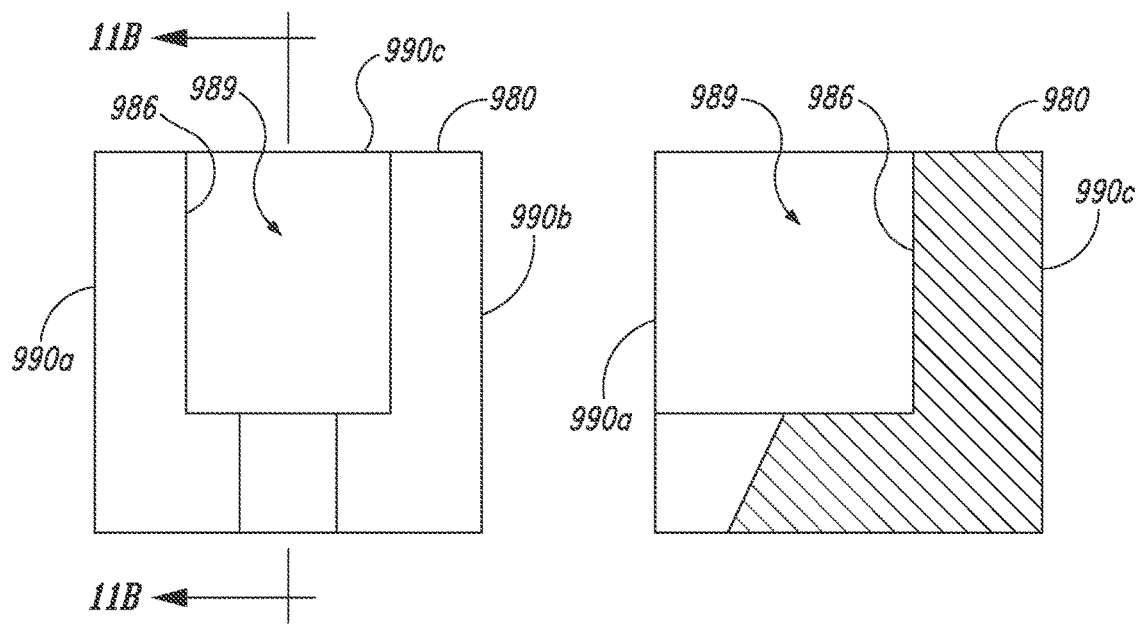
*Fig. 11A*  *Fig. 11B*

EARTH TO ORBIT TRANSPORTATION SYSTEM

CROSS-REFERENCE TO RELATED APPLICATIONS INCORPORATED BY REFERENCE

The present application is a continuation of International Patent Application No. PCT/US19/34003, filed May 24, 2019, and titled EARTH TO ORBIT TRANSPORTATION SYSTEM, which claims priority to U.S. Provisional Patent Application No. 62/676,809, filed May 25, 2018, and titled EARTH TO ORBIT TRANSPORTATION SYSTEM, each of which is incorporated herein by reference in its entirety.

TECHNICAL FIELD

The present disclosure is generally related to vehicles and associated systems and methods for transporting crew and cargo to space (e.g., reusable Earth-to-orbit vehicles).

BACKGROUND

There are a number of existing launch vehicles available for transporting crew and cargo to Low Earth Orbit (LEO) and to existing in-orbit systems, such as the International Space Station (ISS). The Space Shuttle and the SpaceX Falcon 9 are two such vehicles. The Space Shuttle, however, was costly to operate, and although many of its systems were reusable, with the notable exception of the large external tank, they required a great deal of logistics support to refurbish, reassemble, and relaunch. Additionally, both the Space Shuttle and the Falcon 9 were designed to carry relatively heavy payloads of about 50,000 lbs. to LEO. As a result, these vehicles do not present viable, relatively low-cost options for transporting crew and/or lighter cargo (e.g., about 5-10,000 lbs.) to LEO.

Space transportation systems include single-stage-to-orbit (SSTO) launch vehicles as well as multi-stage-to-orbit vehicles. In the early 1970's, Boeing developed a design proposal for a REUSABLE AERODYNAMIC SPACE VEHICLE (RASV). Although the RASV was never built, the proposed design was a SSTO Horizontal Takeoff, Horizontal Landing (HTHL) spaceplane that utilized a sled boost assisted launch. The vehicle was primarily directed toward military space missions, and utilized a welded metal honeycomb airframe with integral thermal protection. The proposed propulsion system included very complex, high maintenance liquid oxygen (LOX)/liquid hydrogen (LH2) Space Shuttle main engines.

BRIEF DESCRIPTION OF THE DRAWINGS

FIGS. 5A and 5B are partially schematic side and end views, respectively, of a coupling for movably mounting a launch sled to one or more launch rails in accordance with embodiments of the present technology.

FIGS. 10A and 10B are a front view and a side cross-sectional view, respectively, of a vehicle support arm interface configured in accordance with embodiments of the present technology.

FIGS. 11A and 11B are a front view and a side cross-sectional view, respectively, of a support arm end fitting configured in accordance with embodiments of the present technology.

DETAILED DESCRIPTION

Figure 1A:
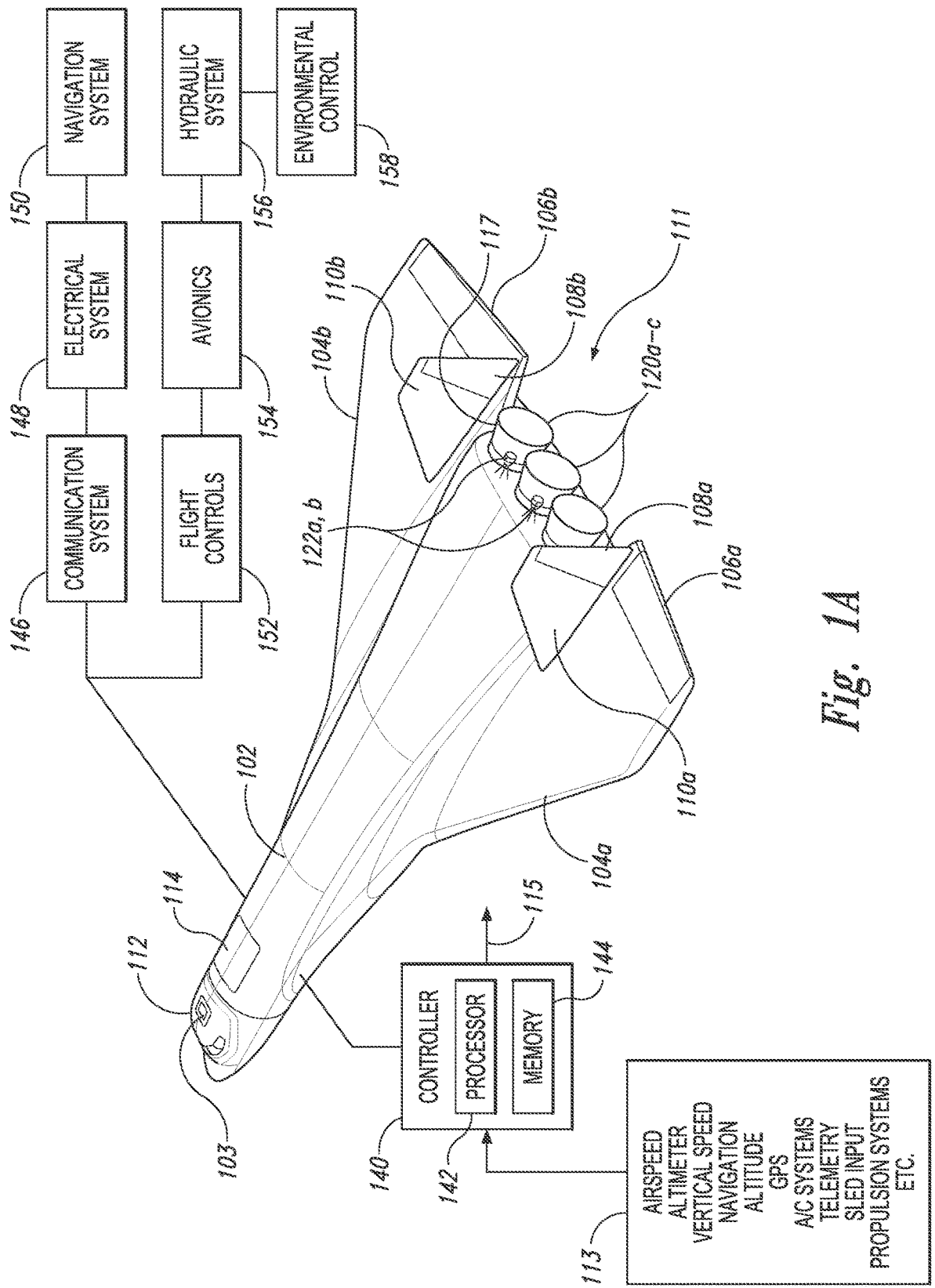
FIG. 1A is a partially schematic, top rear isometric view of an aerospace vehicle configured in accordance with embodiments of the present technology.

The following disclosure describes various embodiments of space launch vehicle systems and associated methods of manufacture and use. In some embodiments, the systems include a fully reusable, horizontal takeoff/horizontal landing (HTHL), ground-assisted single-stage-to-orbit (SSTO) spaceplane that is capable of providing frequent deliveries of people and/or cargo to Low Earth Orbit (LEO). As described in greater detail below, the spaceplane can take off with the aid of a rocket-powered sled that, in addition to providing thrust for takeoff, can also provide propellant for the spaceplane engines during the takeoff run so that the spaceplane launches with full propellant tanks. In some embodiments, the sled can utilize magnetic levitation and magnetic propulsion to provide thrust for takeoff. After several hours or days in orbit, the spaceplane can fly back to Earth and land on a conventional runway having a length of, for example, about 10,000 ft. Embodiments of the systems disclosed herein can enable the expansion of the existing space industry by providing low-cost access to orbital destinations, such as the International Space Station (ISS), for people and light to medium cargo (e.g., about 5,000 lbs.) at relatively high frequency (e.g., as often as twice a week).

Certain details are set forth in the following description and in FIGS. 1-26B to provide a thorough understanding of various embodiments of the present technology. In other instances, well-known structures, materials, operations and/or systems often associated with aerospace vehicle structures, propulsion systems, control systems, flight sequences, control routines, etc. are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

The accompanying Figures depict embodiments of the present technology and, unless otherwise specified, are not intended to be limiting of its scope. The sizes of various depicted elements are not necessarily drawn to scale, and these various elements may be arbitrarily enlarged to improve legibility. Component details may be abstracted in the Figures to exclude details such as position of components and certain precise connections between such components when such details are unnecessary for a complete understanding of how to make and use the disclosed technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

In general, identical reference numbers in the Figures identify identical, or at least generally similar, elements. To facilitate the discussion of any particular element, the most significant digit or digits of any reference number refers to the Figure in which that element is first introduced. For example, element 110 is first introduced and discussed with reference to FIG. 1.

Figure 1B:
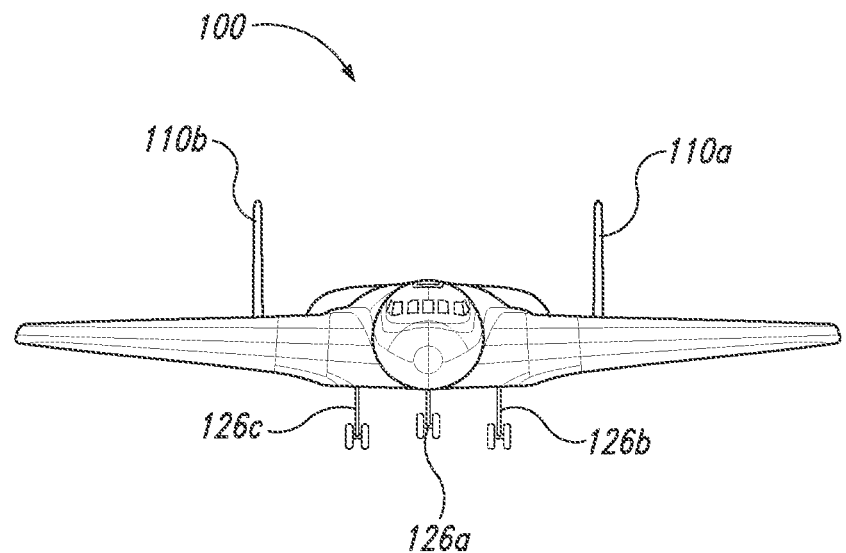
FIGS. 1B-1E are series of front, side, top front isometric, and bottom front isometric views, respectively, of the aerospace vehicle.
Figure 1C:
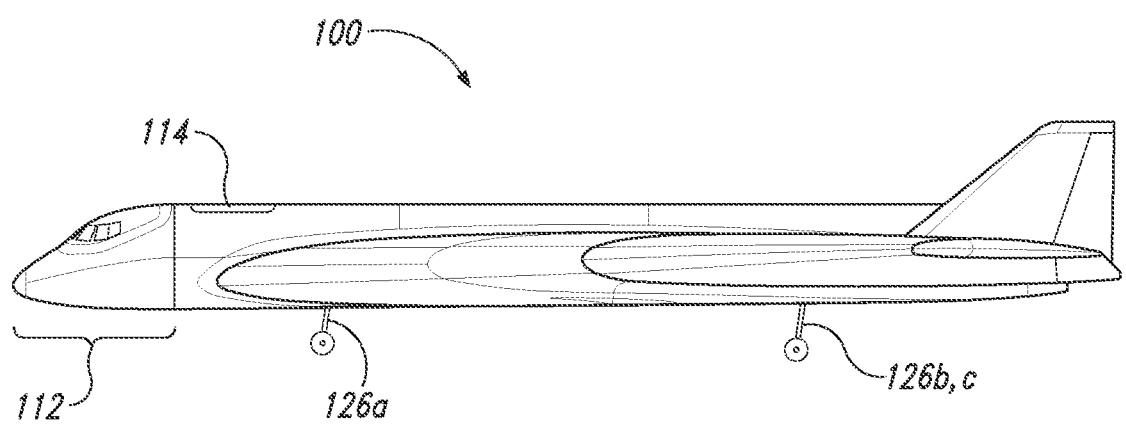

FIG. 1A is a partially schematic, top rear isometric view of an aerospace vehicle 100 (which can also be referred to as a spaceplane) configured in accordance with embodiments of the present technology. FIGS. 1B-1E are front, side, top front isometric, and bottom front isometric views, respectively, of the vehicle 100. Referring first to FIGS. 1A-1C, in the illustrated embodiment the vehicle 100 is an HTHL/SSTO vehicle having a pair of highly swept wings 104 (identified individually as a left wing 104a and a right wing 104b) extending outwardly from a fuselage 102 to provide lift during flight in the Earth's atmosphere. The trailing edge portion of each of the wings 104a, b includes a corresponding elevon 106a, b for vehicle pitch and roll control. Additionally, the vehicle 100 includes a pair of vertical stabilizers 110 (identified individually as a left vertical stabilizer 110a and a right vertical stabilizer 110b) having corresponding rudders 108a, b on trailing edge portions thereof for providing the vehicle 100 with yaw control. The fuselage 102 can include a door 103 in an upper portion of a crew cabin 112 for crew ingress and egress. Additionally, in the illustrated embodiment the forward portion of the fuselage 102 includes a movable hatch 114 for providing access to a docking port (not shown in FIG. 1A-1E) for docking the vehicle 100 with an on-orbit station, such as the ISS, and enabling human and/or cargo movement therebetween.

As shown in FIG. 1A, in the illustrated embodiment the aft portion of the fuselage 102 carries a propulsion system 111 having one or more rocket engines 120 (three are shown in FIG. 1A; identified individually as first, second, and third rocket engines 120a-c, respectively). Each of the engines 120a-c has a corresponding nozzle 117 positioned generally proximate the trailing edge portion of the wings 104a, b between the vertical stabilizers 110a, b. As described in greater detail below, in some embodiments the rocket engines 120a-c are configured to burn liquid oxygen (LOX) and jet fuel as propellants. The jet fuel can include common kerosene-types of aviation fuel designed for use in aircraft powered by gas-turbine engines including, for example, "Jet-A." Additionally, in some embodiments the engines 120a-c can include dual area ratio nozzles with injection ports for tripping the exhaust flow. When the injection ports are inactive, the exhaust flow occupies the entire cross-sectional area at the exit plane of the nozzle 117, producing a first effective nozzle area. The area ratio of the first effective nozzle area to the area at the nozzle throat can be relatively large, which is suitable for high altitude performance. For example, the area ratio can be about 60:1 in some embodiments. When the injection ports are activated, the flow from the injection ports trips the exhaust flow and produces a shockwave that limits the effective flow over of the nozzle 117 to a smaller, second effective nozzle area. The area ratio of the second effective nozzle area to the area at the nozzle throat can be relatively small, for example, about 33:1. Accordingly, since the nozzle flow is typically over-expanded at low altitude (as a compromise to improve high altitude performance), the nozzle exit area reduction provided by the tripped exhaust flow can improve nozzle efficiency at low altitude. In some embodiments, the engines 120a-c can be at least generally similar in structure and function to engines described in U.S. Provisional Application No. 62/693,829, filed on Jul. 3, 2018, and titled "ROCKET PROPULSION SYSTEMS AND ASSOCIATED METHODS," which is incorporated herein by reference in its entirety.

The vehicle 100 can further include orbital maneuvering system (OMS) engines 122 (identified individually as a first OMS engine 122a and a second OMS engine 122b) having nozzles positioned just above the nozzles for the main engines 120a-c. In some embodiments, the OMS engines 122 can be bipropellant rocket engines that use LOX and compressed natural gas (CNG; consisting mostly of methane). The use of LOX and CNG provides a gas-gas propellant solution that can be used in a blowdown system that relies on gas pressure to drive the propellants into the OMS engines 122. As described in greater detail below, the OMS engines provide steering and directional control when the vehicle 100 is in space, and can enable the vehicle 100 to reorient in space for deorbiting and reentry into the Earth's atmosphere. Although the illustrated embodiment of the vehicle 100 includes three main engines 120 that use LOX and Jet-A as propellants, the technology disclosed herein is not limited to any particular number of engines or any particular types of propellants. Accordingly, it will be understood that vehicles configured in accordance with the present technology can include more or fewer engines using other types of propellants (e.g., LOX and refined petroleum (e.g., RP-1), LOX/liquid hydrogen, LOX/CNG, etc.) consistent with the present disclosure.

The vehicle 100 can include a controller 140 having one or more processors 142 that can control various operations and functions of the vehicle 100 in accordance with computer-readable instructions stored on system memory 144. The controller 140 can receive inputs 113 and issue outputs 115. By way of example, the inputs 113 can include control signals and commands from, e.g., ground systems, the crew, etc.; flight parameters such as airspeed and/or ground speed, altitude, dynamic pressure, temperature, etc.; engine operating parameters; propellant parameters; vehicle positional and directional information; etc. The outputs 115 can include commands directing vehicle operation, including control surface operation via associated valves, actuators, and/or other components; engine operation including start, stop, and throttle settings; data and telemetry transmissions; etc. The processor 142 can include any logic processing unit, such as one or more central processing units (CPUs), digital signal processors (DSPs), accelerated processing units (APUs), application-specific integrated circuits (ASICs), etc. The processor 142 may be a single processing unit or multiple processing units distributed across multiple systems and/or subsystems of the vehicle 100. The processor 142 is operably connected to the memory 144 and may be operably connected to various systems of the vehicle 100 to transmit instructions and/or receive input therefrom. The memory 144 can include read-only memory (ROM) and random-access memory (RAM) or other storage devices that store executable applications, test software, databases and/or other software required to, for example, control or at least partially control the flight, propulsion, power, avionics, telemetry, environmental, and/or other systems of the vehicle 100 in accordance with the methods described herein, and enable the vehicle 100, its systems and occupants to communicate and/or exchange data and information with remote computers (e.g., computers on Earth and/or in orbit) and/or other devices.

In some embodiments, the vehicle 100 includes all of the systems necessary for implementing the mission sequences described herein. Such systems can include, for example, a communications system 146 for, e.g., wireless communications (including crew communications, digital communications between processing devices, etc.) between the vehicle 100 and, e.g., ground control, ground stations, orbiting stations, etc. The communication system 146 can include, for example, wireless transceivers, antennae, etc. for broadcasting transmissions to and receiving transmissions from remote locations. The vehicle systems can also include an electrical power and distribution system 148; a navigation system 150; a flight controls system 152 for affecting actuation of the vehicle control surfaces, engine throttles, landing gear, etc.; avionics 154; a hydraulic system 156 for, e.g., control surface and landing gear actuation; and an environmental control system 158 for maintaining, e.g., air conditioning, etc. for human occupancy. The foregoing systems are non-exclusive, and it will be understood that some embodiments of the vehicle 100 can include other control and operating systems, while other embodiments of the vehicle 100 may not include one or more of these systems.

As shown in FIGS. 1B and 1C, in the illustrated embodiment the vehicle 100 includes a landing gear system having a nose gear 126a, a left main gear 126b, and a right main gear 126c. (In FIG. 1E, the landing gear 126a-c are retracted and stowed behind corresponding gear doors 129a-c.) As described in more detail below, the vehicle 100 takes off with the assistance of a launch sled and, as a result, the landing gear 126a-c are retracted and stowed into associated gear bays during takeoff. For landing, the landing gear 126a-c are deployed in a manner that is at least generally similar to conventional commercial aircraft. Since the landing gear 126a-c are only designed to carry the loads associated with landing the vehicle 100 when it is not carrying a full load of propellant and is therefore relatively light, the landing gear 126a-c can be substantially lighter than they would otherwise be if they were designed to support the vehicle 100 during takeoff with a full load of propellant. This weight savings results in an increased payload capacity.

Figure 1D:
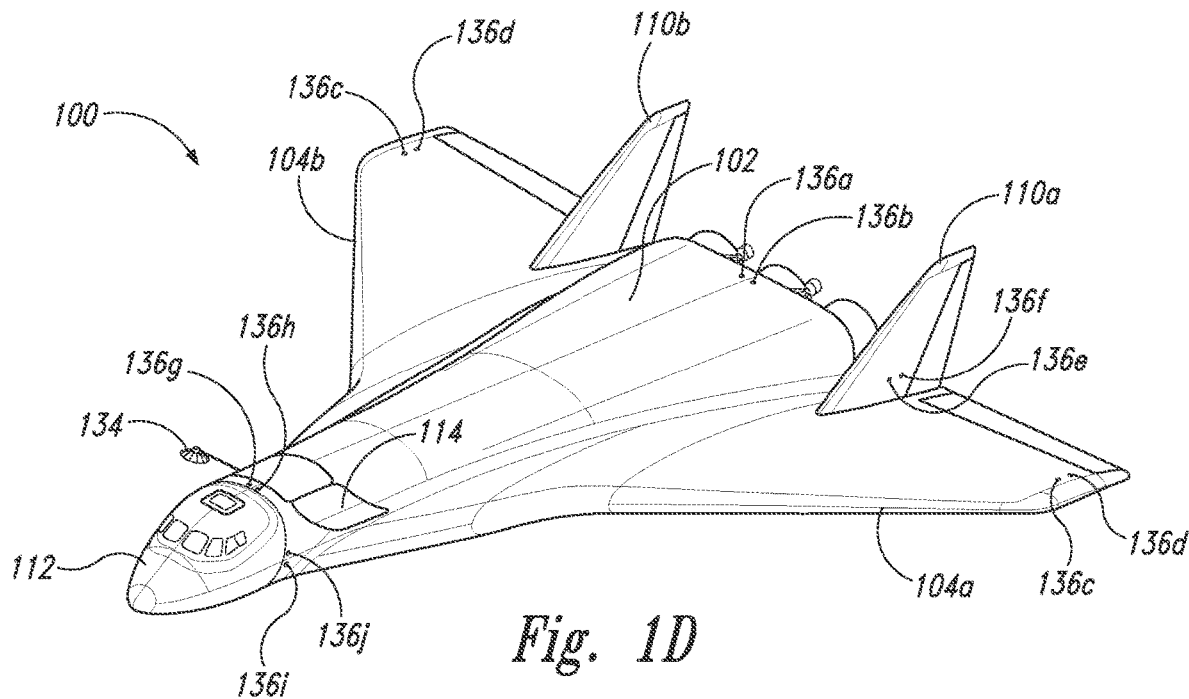
Figure 1E:
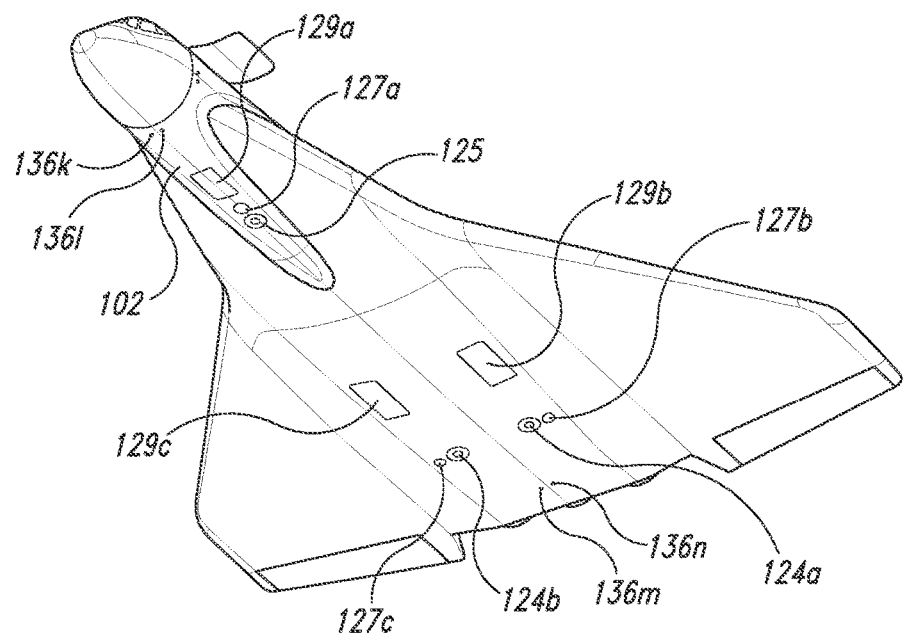

Referring next to FIG. 1D, in some embodiments the vehicle 100 can include an antenna 134 which can be deployed from the fuselage 102 once the vehicle 100 is in orbit to facilitate communications between Earth, on-orbit stations, and/or other remote locations. The vehicle 100 can further include a plurality of thrusters 136 positioned at various locations on the exterior of the vehicle 100 to provide attitude control while on orbit. Such reaction control system (RCS) thrusters can include, for example, relatively small monopropellant thrusters known in the art. In some embodiments, the vehicle 100 may be configured to use only "green" propellants. In such embodiments, the thrusters 136 can use a hydroxylammonium nitrate-based propellant known as AF-M315E, and/or a propellant known as LMP-103S, which is based on the oxidizer ammonium dinitramide. Both of these propellants are less toxic than, for example, hydrazine. In other embodiments, the thrusters 136 can use hydrazine in a conventional manner. In some embodiments, the vehicle 100 can include a pair of thrusters 136a, b toward an upper aft portion of the fuselage 102, and a pair of thrusters 136c, d near the tip portion of each of the wings 104a, b. Additionally, the vehicle 100 can also include a pair of thrusters 136e, f at the base of each vertical stabilizer 110a, b, a pair of thrusters 136g, h toward an upper forward portion of the fuselage 102 just behind the crew cabin 112, and another pair of thrusters 136i, j on opposite sides of the fuselage near the same location. As shown in FIG. 1E, additional thrusters 136k, l and 136m, n can also be included on the underside of the vehicle 100 proximate the forward and aft portions the fuselage 102, respectively. Selective activation of the various thrusters 136 enable the vehicle to be positioned in virtually any attitude while in orbit to facilitate, for example, docking with on-orbit stations, transmission and/or reception of communications, planetary viewing, etc. The thruster locations illustrated in FIGS. 1D and 1E are provided by way of examples of some embodiments. Accordingly, it will be understood that other embodiments can have more or fewer thrusters and/or thrusters in other locations.

As also shown in FIG. 1E, in the illustrated embodiment the vehicle 100 further includes propellant interfaces 124 (identified individually as a first propellant inlet interface 124a and a second propellant inlet interface 124b), and support arm interfaces 127 (identified individually as a forward support arm interface 127a, a first aft support arm interface 127b, and a second aft support arm interface 127c). Each of the support arm interfaces 127a-c can include a coupling configured to releasably engage a corresponding support arm for mounting the vehicle 100 to the launch sled (not shown in FIG. 1E) prior to and during takeoff. In some embodiments, each of the propellant inlet interfaces 124a, b is positioned just inboard of (and laterally adjacent to) the corresponding support arm interface 127b, c. As described in greater detail below, each of the propellant interfaces 124a, b can include a quick-disconnect valve and/or other suitable coupling for releasably connecting a corresponding propellant umbilical (e.g., a propellant conduit; which can also be referred to as a propellant line) from the launch sled to the vehicle 100 and sealing the interface when the propellant umbilical is disconnected. Additionally, the propellant inlet interfaces 124a, b can also include doors that close flush with the outer surface of the fuselage 102 to protect the interfaces 124a, b from aerothermal heating, etc. Propellants (e.g., LOX and Jet-A) are transferred from the launch sled to the vehicle 100 via the propellant umbilicals and the inlet interfaces 124a, b for operation of the main vehicle engines 120a-c during takeoff. For example, in some embodiments the first propellant inlet interface 124a can be configured to receive LOX from the launch sled via a LOX umbilical, and the second propellant inlet interface 124b can be configured to receive fuel from the launch sled via a fuel umbilical. Additionally, as described in greater detail below, in some embodiments the first propellant inlet interface 124a can also be configured to recirculate vented/warmed LOX from the vehicle 100 back to the launch sled via the LOX umbilical, and the second propellant inlet interface 124b can also be configured to recirculate vented fuel from the vehicle 100 back to the launch sled via the fuel umbilical.

In addition to the propellant inlet interfaces 124a, b, the vehicle 100 further includes an electrical interface 125 positioned just aft of the forward support arm interface 127a. The electrical interface 125 is configured to releasably connect to an electrical umbilical that extends from the launch sled to the vehicle 100. As described in greater detail below, the electrical interface 125 can include one or more electrical receptacles configured to receive one or more corresponding connectors on the electrical umbilical to enable transmission of commands, power, and data between the vehicle 100 and the launch sled. Like the propellant interfaces 124a, b, the electrical interface 125 can also include a door that closes flush with the outer surface of the fuselage 102 after the electrical umbilical has been disconnected to protect the interface 125 from aerothermal heating, etc.

Figure 2:
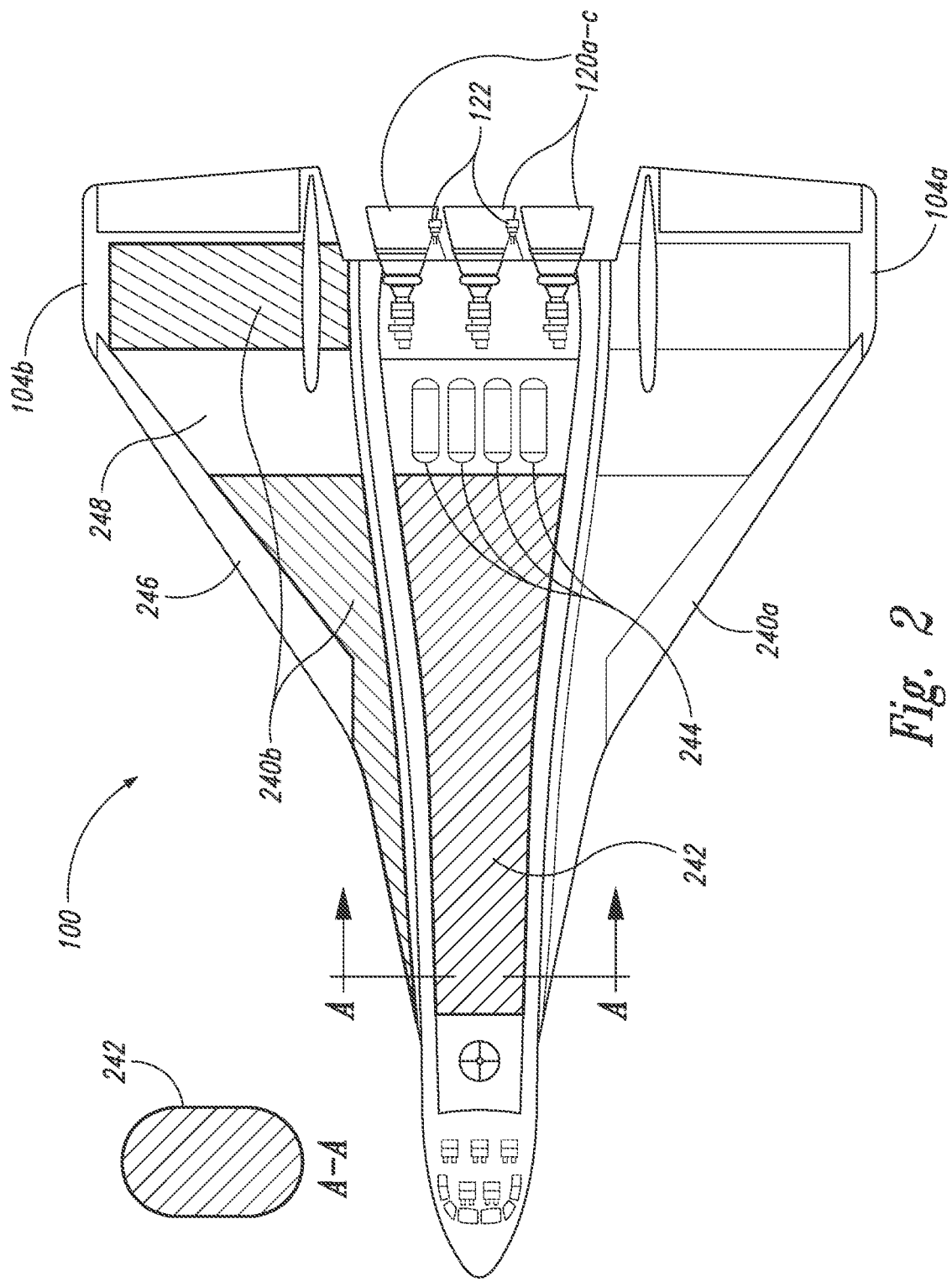
FIG. 2 is a partially schematic, partially cross-sectioned top view of the aerospace vehicle configured in accordance with embodiments of the present technology.

FIG. 2 is a partially schematic, partially cross-sectioned top view of the vehicle 100 configured in accordance with embodiments of the present technology. In one aspect of this embodiment, the oxidizer (e.g., LOX) for the main engines 120a-c is contained in a fuselage tank 242 that is formed by external sidewalls of the fuselage 102 and, accordingly, the tank 242 can have a cross-sectional shape that follows the cross-sectional shape (contour) of the fuselage 102. More specifically, as discussed in greater detail below, in some embodiments the LOX is subcooled to a temperature of, for example, about −320 degrees Fahrenheit (F) (i.e., about −196 degrees Celsius (C)). At this temperature, the LOX vapor pressure is sufficiently low that the pressure differential across the walls of the fuselage tank 242 is less than about 3 psig, such as between 2-3 psig. By maintaining the tank pressure at about 2-3 psig, the structural loads on the tank walls are relatively low. As a result, the tank 242 does not have to have the shape of a conventional high-pressure propellant tank or pressure vessel (e.g., a spherical shape or a cylindrical shape having a circular cross-section). This enables the internal volumes of the airframe (e.g., the fuselage 102) to be used as a LOX tank, while at the same time being shaped for optimum aerodynamic performance without requiring any structural reinforcement to accommodate high tank pressure loads. For example, in some embodiments the oxidizer tank 242 can have a cross-sectional shape that is non-circular, such as an oval, or near oval, cross-sectional shape, an elliptical cross-sectional shape, an asymmetric cross-sectional shape, and/or other non-circular cross-sectional shapes. Additionally, as shown by the plan view of FIG. 2, in some embodiments the cross-section of the oxidizer tank 242 can vary in both shape and/or size along the length of the fuselage 102. In other embodiments, however, the oxidizer tank 242 can have other shapes, such as cylindrical and/or spherical shapes. The oxidizer tank 242 is connected in fluid communication with the first propellant inlet interface 124a (FIG. 1E). In another aspect of this embodiment, each of the wings 104a, b includes a corresponding fuel tank 240a, b that contains the fuel for the vehicle main engines 120a-c. The fuel tanks 240a, b fill much of the interior volumes of the wings 104a, b in the forward strake regions and the main wing regions, except for the volumes proximate wing leading edge regions 246 and main spar sections 248. The fuel tanks 240a, b are connected in fluid communication with the second propellant inlet interface 124b (FIG. 1E). The OMS propellant tanks 244 (e.g., LOX and CNG tanks) are positioned between the main engine oxidizer tank 242 and the main engines 120a-c.

Figure 3A:
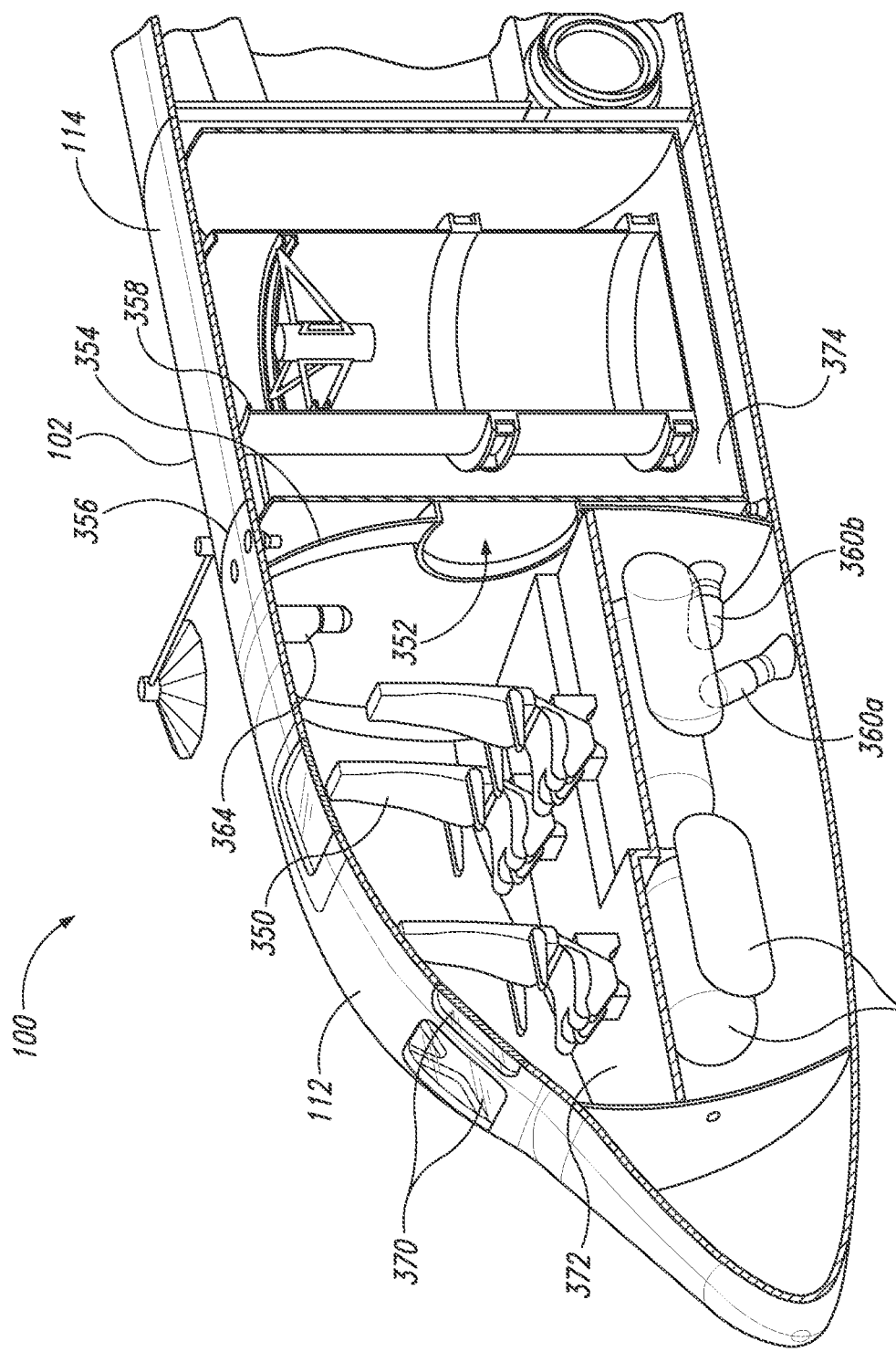
FIG. 3A is a cross-sectional side isometric view illustrating a forward portion of the fuselage of the aerospace vehicle.
Figure 3B:
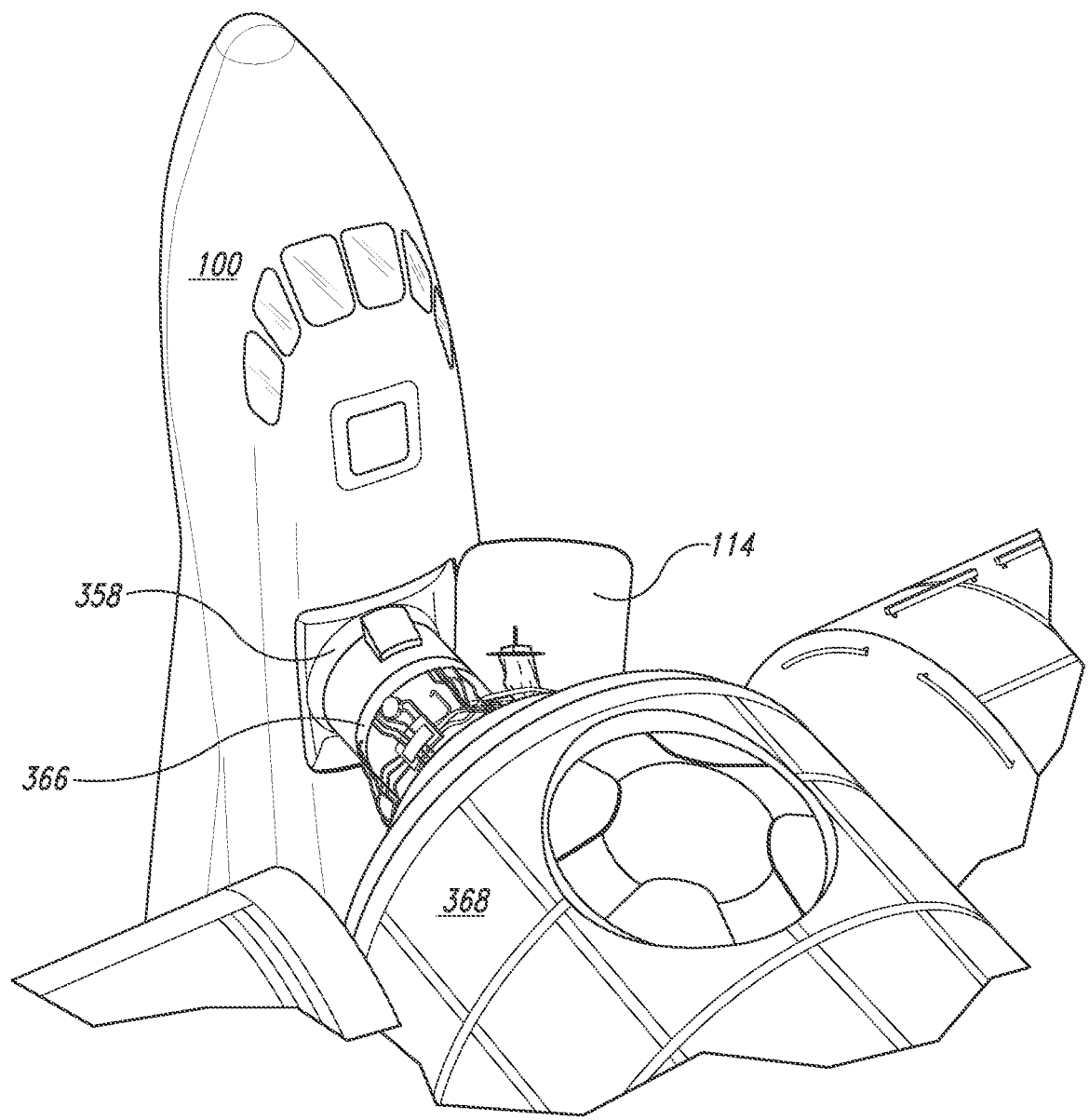
FIG. 3B is an isometric view of the aerospace vehicle docking with an orbiting station in space, in accordance with embodiments of the present technology.

FIG. 3A is a side cross-sectional view of the forward portion of the fuselage 102 illustrating the crew cabin 112 and an adjacent payload bay 374. In some embodiments, the payload bay 374 can include an airlock and a docking port 358. In other embodiments, in addition to or instead of the docking port 358, the payload bay 374 can include a payload support and deployment system (not shown) configured to carry payloads (e.g., one or more satellites) and deploy them into orbit. FIG. 3B is an isometric view of an orbiting station 368 operably coupled to the vehicle 100 via the docking port 358 in accordance with embodiments of the present technology. Referring first to FIG. 3A, in the illustrated embodiment the crew cabin 112 can include a plurality of seats 350 (e.g., 5 seats) for vehicle crew and/or passengers. The crew cabin 112 can also include a plurality of windows 370 for occupant viewing outside of the vehicle 100.

In some embodiments, the crew cabin 112 is a self-contained unit that can separate from the rest of the fuselage 102 in the event of a mission critical failure that occurs at any point during flight. More specifically, an aft portion of that crew cabin 112 can be sealably enclosed by a pressure bulkhead 354 that enables the crew cabin 112 to maintain internal pressure during all phases of operation. Additionally, the crew cabin 112 can be structurally attached to the rest of the fuselage 102 by a frangible joint 356 that extends around the circumference of the fuselage just aft of the bulkhead 354. The frangible joint 356 can include a pyrotechnically actuated explosive device (e.g., Super Zip from Ensign-Bickford Aerospace Company) or linear shaped charge that structurally attaches the crew cabin 112 to the fuselage 102 until actuated in response to a separation signal. Upon actuation, the frangible joint 356 breaks to immediately detach the crew cabin 112 from the rest of the fuselage 102. In other embodiments, instead of (or in addition to) the frangible joint 356, the crew cabin 112 can be attached to the rest of the fuselage 102 with a plurality of explosive bolts and/or other known separating devices to enable the crew cabin 112 to be quickly disengaged and separated from the fuselage 102 in the event of a mission critical failure of one or more vehicle systems.

The vehicle 100 can include a number of subsystems to facilitate separation of the crew cabin 112 from the rest of the fuselage 102 and safe return of the crew cabin 112 to Earth in the event of a mission critical failure. For example, in the illustrated embodiment the crew cabin 112 can include a recovery chute 364 positioned toward an upper aft portion of the crew cabin 112, and a downward-firing thruster 360a and a first aft-firing thruster 360b positioned toward a lower aft portion of the crew cabin 112. Although not shown by virtue of the section view, a second aft-firing thruster is positioned adjacent to the first aft-firing thruster 360b on the opposite sided of the vehicle centerline. The thrusters 360a, b can be conventional bipropellant or green propellant thrusters that receive propellant from corresponding fuel and oxidizer tanks 362 positioned beneath a floor 372 of the crew cabin 112. The nozzle of the first thruster 360a can be directed generally downward and aft, and the nozzle of the second thruster 360b can be directed generally aft. The recovery chute 364 can include one or more parachutes that are deployed from the crew cabin 112 after separation from the rest of the fuselage 102 and when the crew cabin 112 is at an appropriate altitude on descent.

As described in greater detail below, in the event the vehicle 100 experiences a mission critical failure at any point during flight, the frangible joint 356 can be activated to separate the crew cabin 112 from the rest of the fuselage 102. Immediately after separation, the thrusters 360a, b can be ignited to quickly move the crew cabin 112 a safe distance away from the rest of the vehicle 100. Once the crew cabin 112 descends to an appropriate altitude, the recovery chute 364 can be deployed to slow the decent through the Earth's atmosphere. The recovery chute 364 can be positioned to properly orient the crew cabin 112 during descent through the atmosphere. Additionally, the crew cabin 112 can also include a thermal protection system (e.g., a fibrous, reinforced oxidation-resistant composite covering) on at least the forward-facing surfaces to provide sufficient heat shielding during reentry.

In another aspect of this embodiment, the crew cabin includes a passage 352 (with a sealable door, not shown) that enables the crew of the vehicle 100 to move back and forth between the crew cabin 112 and the adjacent airlock or payload bay 374 when in orbit. As shown in FIG. 3B, in operation the hatch 114 can be opened to enable the docking port 358 to sealably engage and structurally attach to a corresponding docking port 366 on the orbiting station 368. Once properly docked, crew and/or cargo from the vehicle 100 can move back and forth between the vehicle 100 and the orbiting station 368.

Figure 4A:
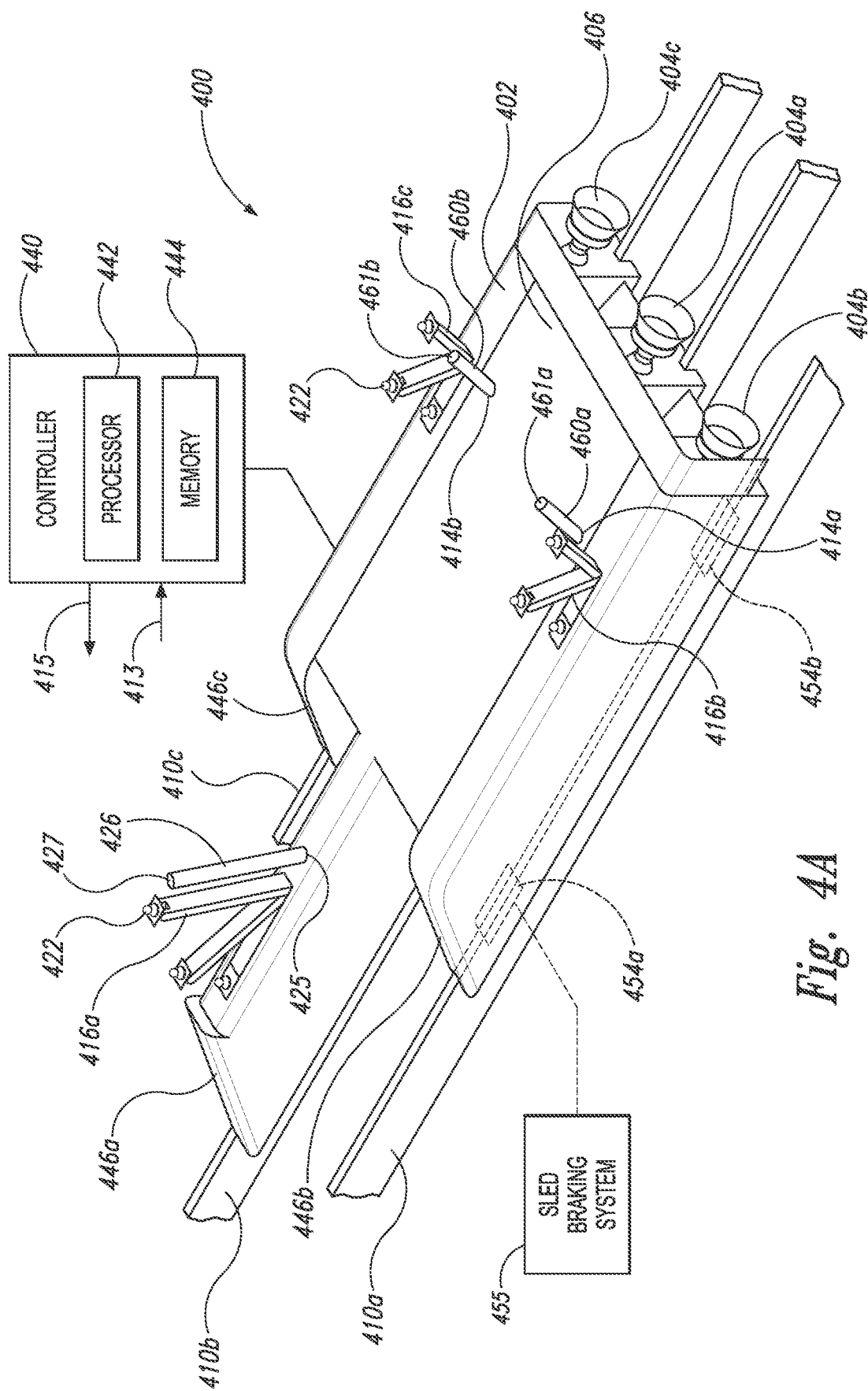
FIGS. 4A-4C are a series of top rear isometric, top cross-sectional isometric, and side cross-sectional isometric views, respectively, of a rocket powered launch sled configured in accordance with embodiments of the present technology.
Figure 4B:
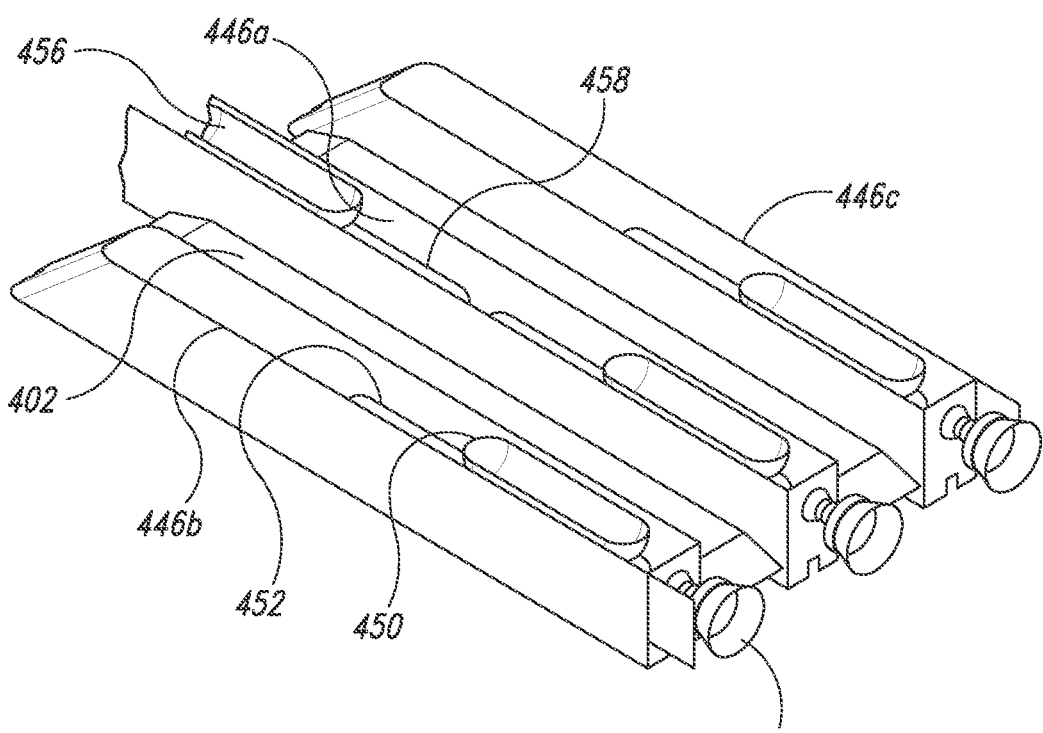
Figure 4C:
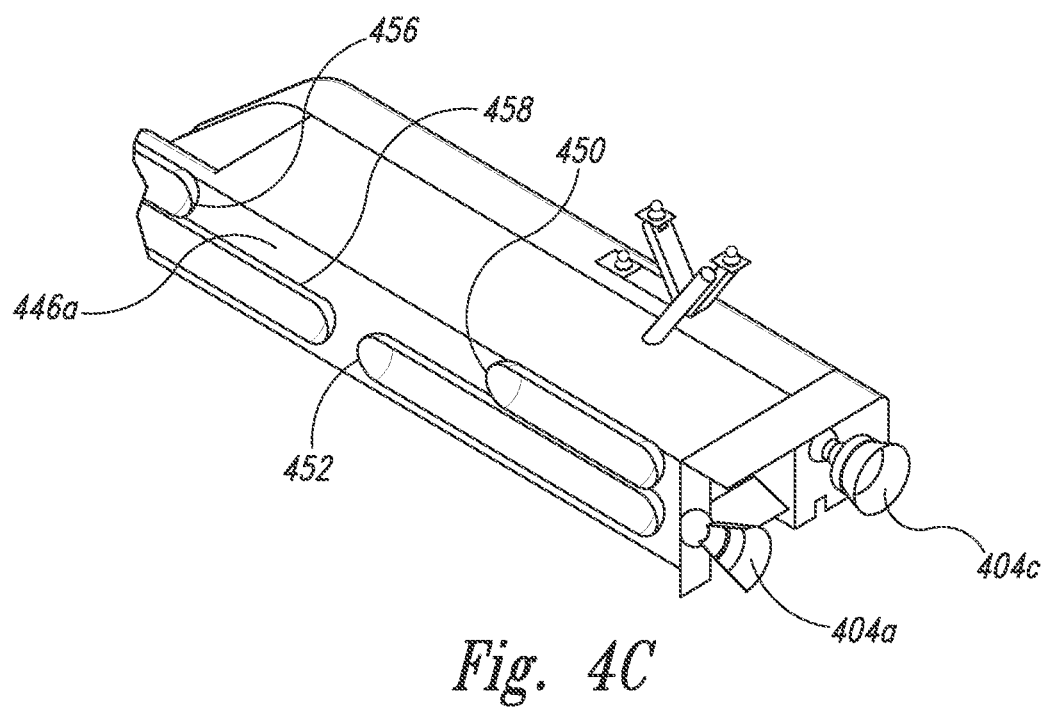

FIG. 4A is a partially schematic isometric view of a launch sled 400 configured in accordance with embodiments of the present technology, and FIGS. 4B and 4C are top cross-sectional isometric and side cross-sectional isometric views, respectively, of the launch sled 400. Referring first to FIG. 4A, the sled 400 runs on three heavy duty rails 410a-c that react the combined loads from the sled 400 and the vehicle 100 during acceleration and deceleration. In some embodiments, the rails 410a-c can be about two miles long. In the illustrated embodiment, the sled 400 includes a body or chassis 402 having a center section 446a, a left outer section 446b, and a right outer section 446c that are connected by an aerodynamic top plate 406. The sections 446a-c can also be referred to as "trucks." The underside of each of the sections 446a-c is moveably engaged with a corresponding rail 410a-c by at least a forward coupling 454a and an aft coupling 454b. In operation, the couplings 454a, b enable the sled to move fore and aft on the rails 410a-c, while keeping the sled 400 attached to the rails.

The sled 400 further includes a forward support arm 416a operably coupled to a forward portion of the center section 446a, and first and second aft support arms 416b and 416c, respectively, operably coupled to the first outer section 446b and the second outer section 446c, respectively. In some embodiments, the proximal end portion of each of the support arms 416a-c is pivotably coupled to the sled chassis 402, and the arms 416a-c are operably coupled to a drive system (e.g., an electromechanical system, a hydraulic system, a pneumatic system, etc.; not shown) that moves (e.g., rotates) the arms 416a-c through their ranges of operating motion. The distal end portion of each support arm 416a-c is configured to be releasably attached to the corresponding support arm interface 127a-c on the vehicle 100 by means of a hold and release mechanism. For example, in some embodiments the distal end portion of each support arm 416a-c can include a fitting 422 (e.g., a ball fitting or other suitable fitting that can permit rotation of the arm 416 while the vehicle 100 is attached) that is configured to be releasably engaged with the corresponding support arm interface 127a-c (e.g., a ball socket) by the hold and release mechanism. In some embodiments, the hold and release mechanism can include a mechanical clamp mechanism that holds the distal end portion of each control arm 416a-c to the corresponding interface 127a-c until commanded to release. In other embodiments, other suitable hold and release mechanisms known in the art can be used to releasably attach the support arms 416a-c to the corresponding interfaces 127a-c.

In FIG. 4A, each of the support arms 416a-c is illustrated in three different operational positions: a lowermost or stowed position, an intermediate position in which the arm is rotated partially upward to engage and raise the vehicle 100 for stowage of the landing gear 126a-c, and a launch position in with the arm is rotated fully aft and/or upward to optimize (or nearly optimize) vehicle angle of attack for separation and lift off. The support arms 416a-c react all the acceleration and deceleration loads between the vehicle 100 and the sled 400 during takeoff, thereby eliminating the need for the vehicle 100 to include a landing gear system that is rated for takeoff loads. Additionally, the positioning of the support arms 416a-c can be adjustable to optimize the vehicle angle of attack as needed for each mission. Although the illustrated embodiment includes three support arms 416a-c, in other embodiments the sled 400 can include more support arms (e.g., four, five, or more arms) or fewer arms (e.g., two or one arm).

In the illustrated embodiment, the sled 400 includes three rocket engines 404 (identified individually as rocket engines 404a-c) which are mounted to the aft portions of the corresponding sled sections 446a-c. In other embodiments, the sled 400 can have more or fewer rocket engines (e.g., one to five or more rocket engines). The rocket engines 404a-c have nozzles with area ratios optimized for ground performance. Like the main vehicle engines 120a-c (FIG. 1A), the engines 404a-c can be bipropellant rocket engines configured to burn, for example, LOX and Jet-A. Since the engines 404a-c operate at a constant or near-constant altitude, their nozzles can be configured for single area ratio operation and optimum performance at the altitude at which the sled operates (e.g., sea level or near sea level). In some embodiments, the engines 404a-c can be at least generally similar in structure and function to engines described in U.S. Provisional Application No. 62/693,829, filed on Jul. 3, 2018, and titled "ROCKET PROPULSION SYSTEMS AND ASSOCIATED METHODS," which is incorporated herein by reference in its entirety.

In some embodiments, each of the engines 404a-c can have dedicated propellant tanks (e.g., a dedicated oxidizer (e.g., LOX) tank 452 and/or a dedicated fuel (e.g., Jet-A) tank 450) mounted and housed within the enclosure of the corresponding sled section 446a-c, as shown in FIGS. 4B and 4C. The propellant tanks 450 and 452 are sized and configured to provide propellant to the corresponding engines 404a-c for the duration of the sled run. In other embodiments, the sled 400 can carry a single oxidizer tank and/or a single fuel tank that provides sufficient propellant for all the engines 404a-c. In further embodiments, all or a portion of the engines 404a-c may use different propellants, and/or one or more of the engines 404a-c may be solid rocket motors.

In addition to the sled propellant tanks 450 and 452, the sled 400 can also carry auxiliary propellant tanks (e.g., an oxidizer (e.g., LOX) tank 458 and a fuel (e.g., Jet-A) tank 456; shown in cross-section in FIGS. 4B and 4C) for providing propellant to the vehicle engines 120a-c (FIG. 1A) for the duration of the sled run. As described in greater detail below, this assures that the vehicle 100 is as full of propellant as possible at liftoff from the sled, thereby minimizing (or at least greatly reducing) the vehicle dry mass penalty at lift off. In some embodiments, the auxiliary propellant tanks 456 and 458 can be housed in the center section 446a. In other embodiments, the propellant tanks 456 and 458 can be carried in one or both of the left outer section 446b and/or the right outer section 446c. In other embodiments, one or both of the auxiliary propellant tanks 456 and 458 can be omitted, and one or more of the sled propellant tanks 452 and 450 can be sized and configured to provide propellant to both the corresponding sled engine(s) 404 as well as the vehicle engines 120a-c for the duration of the sled run.

The sled 400 further includes a first propellant outlet interface 414a and a second propellant outlet interface 414b located on or proximate the top plate 406. In the illustrated embodiment, the first propellant outlet interface 414a is positioned inboard of, and laterally adjacent to, the base of the first aft support arm 416b and is operably connected in fluid communication with the auxiliary oxidizer tank 458. The second propellant outlet interface 414b is positioned inboard of, and laterally adjacent to, the base of the second aft support arm 416c and is operably connected in fluid communication with the auxiliary fuel tank 456. A first propellant umbilical 460a (e.g., a LOX umbilical) extends from the first propellant outlet interface 414a and has an outlet 461a, and a second propellant umbilical 460b (e.g., a fuel umbilical) extends from the second propellant outlet interface 414b and has an outlet 461b. As described above with reference to FIG. 1E, in operation the outlet 461a of the first propellant umbilical 460a is configured to releasably connect to the first propellant inlet interface 124a on the vehicle 100, and the outlet 461b of the second propellant umbilical 460b is configured to releasably connect to the second propellant inlet interface 124b on the vehicle 100.

As described in greater detail below, during launch of the vehicle 100, the auxiliary oxidizer tank 458 provides oxidizer (e.g., LOX) to the vehicle oxidizer tank 242 (FIG. 2) for the vehicle main engines 120a-c via the first propellant umbilical 460a, and the auxiliary fuel tank 456 provides fuel (e.g., Jet-A) to the vehicle fuel tanks 240a, b (FIG. 2) for the vehicle main engines 120a-c via the second propellant umbilical 460b. Additionally, as further described below, in some embodiments the first propellant umbilical 460a is also configured to recirculate vented oxidizer from the vehicle oxidizer tank 242 back to the sled 400, and the second propellant umbilical 460b is also configured to recirculate vented fuel from the vehicle fuel tanks 240a, b back to the sled 400. Just prior to separation of the vehicle 100 from the sled 400, the valves associated with each of the vehicle propellant interfaces 124a, b (FIG. 1E) are closed, the propellant umbilicals 460a, b from the sled 400 are disconnected from the corresponding interfaces 124a, b, and the associated interface doors are closed. By launching the vehicle 100 in this way, the sled 400 operates as both a "first stage" and an external propellant tank of the vehicle 100.

In addition to the propellant interfaces 414a, b, the sled 400 can further include an electrical umbilical 426 extending from an electrical interface 425 positioned just aft of the base of the forward support arm 416a on the top plate 406.

As described in greater detail below, the distal end portion of the electrical umbilical 426 can include one or more electrical connectors 427 configured to releasably connect to corresponding receptacles on the vehicle electrical interface 125 (FIG. 1E) so that operating commands, power and data can be transmitted between the sled 400 (e.g., the sled controller 440) and the vehicle 100 while the vehicle is mounted to the sled.

The sled 400 can further include a sled braking system 455 configured to slow the sled 400 to a stop if an anomalous operating condition of one or more of the sled engines 404a-c or the main vehicle engines 120a-c is detected during launch. The sled braking system 455 also slows the sled to a stop at the end of each takeoff run. In some embodiments, the braking system 455 can be at least generally similar and structure and function to the braking system used on the Holloman high speed test track at Holloman Air Force Base in New Mexico, U.S.A., which includes a water brake comprising a series of water barriers of calibrated depth that slow and stop the sled. In other embodiments, the braking system 455 can include hydraulically-actuated brakes (not shown) that engage the rails 410a-c to slow the sled. In other embodiments, the sled 400 can include other mechanically, pneumatically, electrically, magnetically, and/or hydraulically actuated forms of braking devices including, for example, reverse thrust rocket engines (also not shown).

The sled 400 can also include a controller 440 having a processor 442 and memory 444. The controller 440 can receive inputs 413 and issue outputs 415 (e.g., commands directing sled operation, including operating valves, pumps, actuators, and/or other components). By way of example, the inputs 413 can include control signals and commands from, e.g., ground systems, the vehicle 100, etc., data from the vehicle 100, operating parameters such as speed, temperature, etc., engine operating parameters, propellant parameters, and/or other information). The outputs 415 can include commands directing sled operation (including engine operation, e.g., start, stop and throttle settings, braking system operation, etc.), data transmissions, etc. The processor 442 can include one or more logic processing units, such as one or more CPUs, DSPs, ASICs, etc., that are operably connected to controls associated with, for example, the engines 404a-c, the propellant tanks 450, 452, 456 and 458, the support struts 416a-c, the sled braking system 455, etc. The processor 442 can control operation of these sled systems as described herein in accordance with computer-readable instructions stored on the memory 444.

Figure 4D:
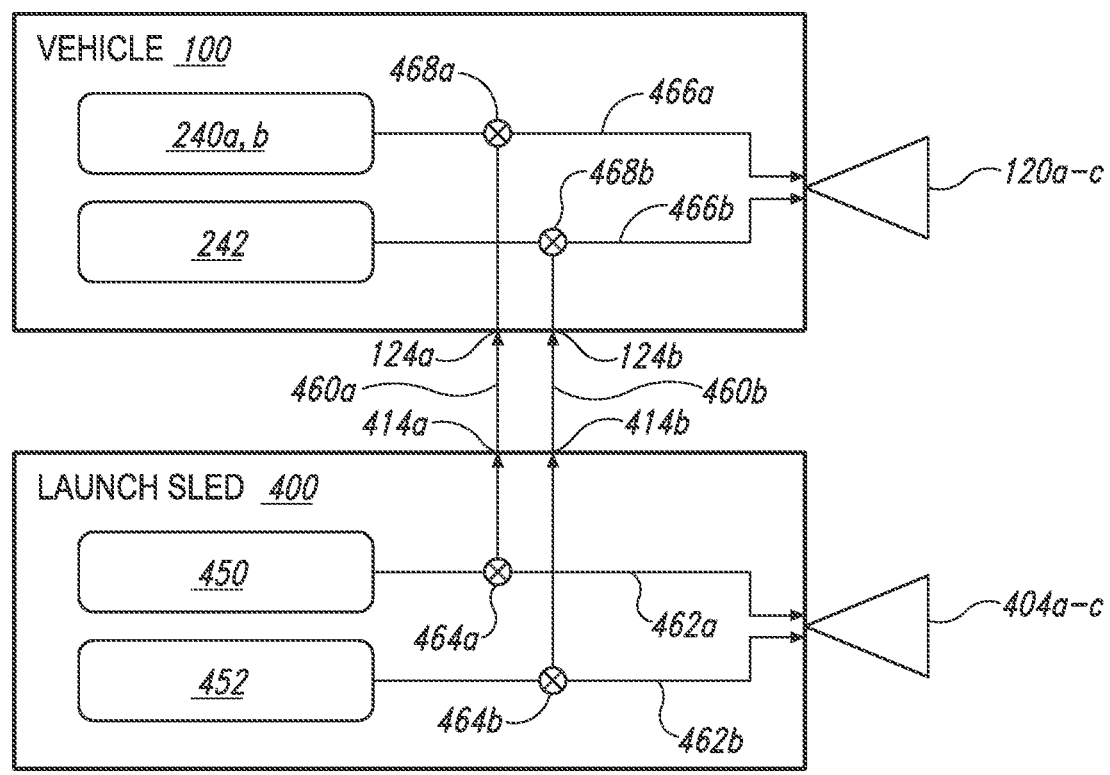
FIG. 4D is a schematic diagram illustrating propellant distribution between the launch sled and the vehicle in accordance with an embodiment of the present technology.

FIG. 4D is a schematic diagram illustrating propellant distribution between the launch sled 400 and the vehicle 100 during launch, in accordance with an embodiment of the present technology. In this particular embodiment, one or more of the sled oxidizer tanks 452 and the sled fuel tanks 450 provide propellant for both the vehicle engines 120a-c and the corresponding sled engine(s) 404a-c during the sled run. In FIG. 4D, the vehicle 100 is mounted to the launch sled 400 in preparation for launch. For ease of illustration, the oxidizer tanks 452 and the fuel tanks 450 on the launch sled 400 are represented by a single oxidizer tank 452 and a single fuel tank 450, respectively. In the illustrated embodiment, the launch sled 400 includes a first propellant conduit or line 462a that provides fuel from the fuel tank 450 to the sled engines 404a-c, and a second propellant line 462b that provides oxidizer from the oxidizer tank 452 to the engines 404a-c. Although not shown, one or more propellant pumps can be associated with each of the tanks 450, 452 to drive propellant from the tanks through the associated propellant lines 462a, b, and to the vehicle 100. Additionally, the launch sled 400 further includes a first valve 464a in fluid communication with the first line 462a that can direct fuel from the fuel tank 450 to the first propellant outlet interface 414a, and a second valve 464b in fluid communication with the second line 462b that can direct oxidizer from the oxidizer tank 452 to the second propellant outlet interface 414b. Prior to launch, the first propellant line 460a is operably connected to the first propellant inlet interface 124a on the vehicle 100, and the second propellant line 460b is operably connected to the second propellant inlet interface 124b.

In the illustrated embodiment, the vehicle 100 includes a first propellant line 466a that provides oxidizer from the vehicle fuel tanks 240a, b to the vehicle main engines 120a-c, and a second propellant line 466b that provides fuel from the vehicle oxidizer tank 242 to the main engines 120a-c. Although not shown, one or more propellant pumps can be associated with each of the tanks 240a, b and 242 to drive propellant from the tanks through the associated propellant lines 466a, b. Additionally, the vehicle 100 further includes a first valve 468a in fluid communication with the first propellant line 466a, and a second valve 468b in fluid communication with the second propellant line 466b. The first valve 468a is configured to receive fuel from the first propellant inlet interface 124a and provide the fuel to the engines 120a-c. Similarly, the second valve 468b is configured to receive oxidizer from the second propellant inlet interface 124b and provide the oxidizer to the engines 120a-c.

Propellant can be distributed between the launch sled 400 and the vehicle 100 during vehicle takeoff in one embodiment as follows. Prior to takeoff, the valves 464a, b are opened to provide fuel and oxidizer from the fuel and oxidizer tanks 450 and 452, respectively, to the sled engines 404a-c for ignition. Additionally, the valves 464a, b also provide fuel and oxidizer to the valves 468a, b, respectively, on the vehicle 100 via the propellant lines 460a, b, respectively. Prior to igniting the sled engines 404a-c, the valves 468a, b are positioned to direct the fuel and oxidizer from the sled fuel tank 450 and the sled oxidizer tank 452, respectively, to the vehicle main engines 120a-c for ignition. The sled engines 404a-c and the vehicle engines 120a-c are then ignited, and once the sled and vehicle engines come up to launch thrust, the sled 400 is released on the takeoff run down the rails 410a-c (FIG. 4A). Accordingly, the sled fuel tank 450 and sled oxidizer tank 452 provide fuel and oxidizer, respectively, to both the sled engines 404a-c and the vehicle main engines 120a-c throughout ignition and the takeoff run of the vehicle 100. Just prior to (or during) separation of the vehicle 100 from the launch sled 400 at the end of the takeoff run, the valves 464a, b on the sled 400 are closed, and the propellant lines 460a, b are disconnected from the corresponding propellant inlet interfaces 124a, b. Just prior to this time, however, the valves 468a, b on the vehicle 100 are positioned to close off the connections to the propellant inlet interfaces 124a, b and instead enable propellant to flow from the vehicle oxidizer tank 242 and the vehicle fuel tanks 240a, b to the main engines 120a-c via the first line 466a and the second line 466b. Thus, the vehicle 100 does not begin burning its own propellant until just prior to separation from the launch sled 400. FIG. 4D illustrates one approach to propellant distribution between the launch sled 400 and the vehicle 100, and in other embodiments other approaches can be employed, as described in more detail below.

FIGS. 5A and 5B are side and end views, respectably, of the coupling 454a configured in accordance with embodiments of the present technology. For ease of reference, the coupling 454a will be referred to herein as the "coupling 454," with the understanding that the illustrated embodiment can apply to both of the couplings 454a and 454b shown in FIG. 4A. In the illustrated embodiment, the coupling 454 includes a body 564 and a plurality of sacrificial inserts 560a-c. The body 564 includes a lug portion 569 that extends upwardly from a pair of legs 570a and 570b. The body 564 is structurally coupled to the underside of the sled 400 by means of a pin or bolt that extends through an opening 566 in the lug portion 569. Each of the legs 570a, b includes a plurality of leg portions 568a-c that wrap around an upper cap 562 of the launch rail 410 to couple the coupling 454 to the rail 410. In one aspect of this embodiment, each of the sacrificial inserts 560a-c can be manufactured from a suitably tough synthetic resin, such as polytetrafluoroethylene (PTFE). One example of such material is commonly referred to as Teflon™. Each of the leg portions 568a-c has a corresponding sacrificial insert 560a-c fixedly attached thereto to provide low friction, load-bearing contact surfaces between the body 564 and the launch rail 410. As noted above with reference to FIG. 4A, the coupling 454 moveably (e.g., slideably) engages the sled 400 with the launch rail 410, and enables the sled 400 to move fore and aft on the rail 410 while restricting movement perpendicular to the rail (e.g., side-to-side and up-and-down). In operation, the sacrificial inserts 560a-c are able to withstand the high temperatures and high pressures that result from supporting the weight of the vehicle 100 and the sled 400 on the launch rails 410 during the vehicle takeoff run. After each use, the sacrificial inserts 560a-c can be inspected to determine condition and easily replaced if necessary.

In other embodiments, the launch sled 400 can be moveably attached to the launch rails 410a-c (FIG. 4A) using other types of suitable coupling devices. For example, in some embodiments the launch sled 400 can be movably coupled to the rails 410a-c by a magnetic levitation ("Maglev") system that is at least generally similar in structure and function to the Maglev systems found on high speed trains. Such Maglev systems are described in, for example, U.S. Pat. No. 6,044,770, titled "Integrated High Speed MAGLEV System," which is incorporated herein by reference in its entirety. The Maglev system can be incorporated into the rails 410a-c and can include, for example, a plurality of magnets to support the sled 400 at relatively high speeds with relatively little, if any, friction between the sled 400 and the rails 410a-c. Additionally, the Maglev system can also include a plurality of magnets for propelling the sled 400 down the rails 410a-c during launch, and/or decelerating and stopping the sled 400 at the end of the launch run.

In some embodiments, use of magnetic levitation and/or propulsion can supplement or replace the propulsion provided by the rocket engines 404a-c (FIG. 4A). For example, an electromagnetically levitated rocket propelled sled 400 can reduce the amount of propellant carried on the sled that is required to reach takeoff velocity and can also reduce maintenance required for the sled system. In some embodiments, the sled 400 can include a super conducting electromagnetically levitated (SCMaglev) and propelled sled that will eliminate the need for rocket engines on the sled 400. Such embodiments can significantly reduce the total amount of propellant required for takeoff, reduce launch noise, and improve launch turnaround time so that multiple launches can be carried out in a short period of time (e.g., in a single day). In yet other embodiments, the sled 400 can be moveably coupled to the rails 410a-c using a system of rollers. However, if rollers or similar systems are used, the rollers must be carefully selected to ensure that the bearings do not overheat and fail at the sled speeds required for vehicle take off run.

Figure 6:
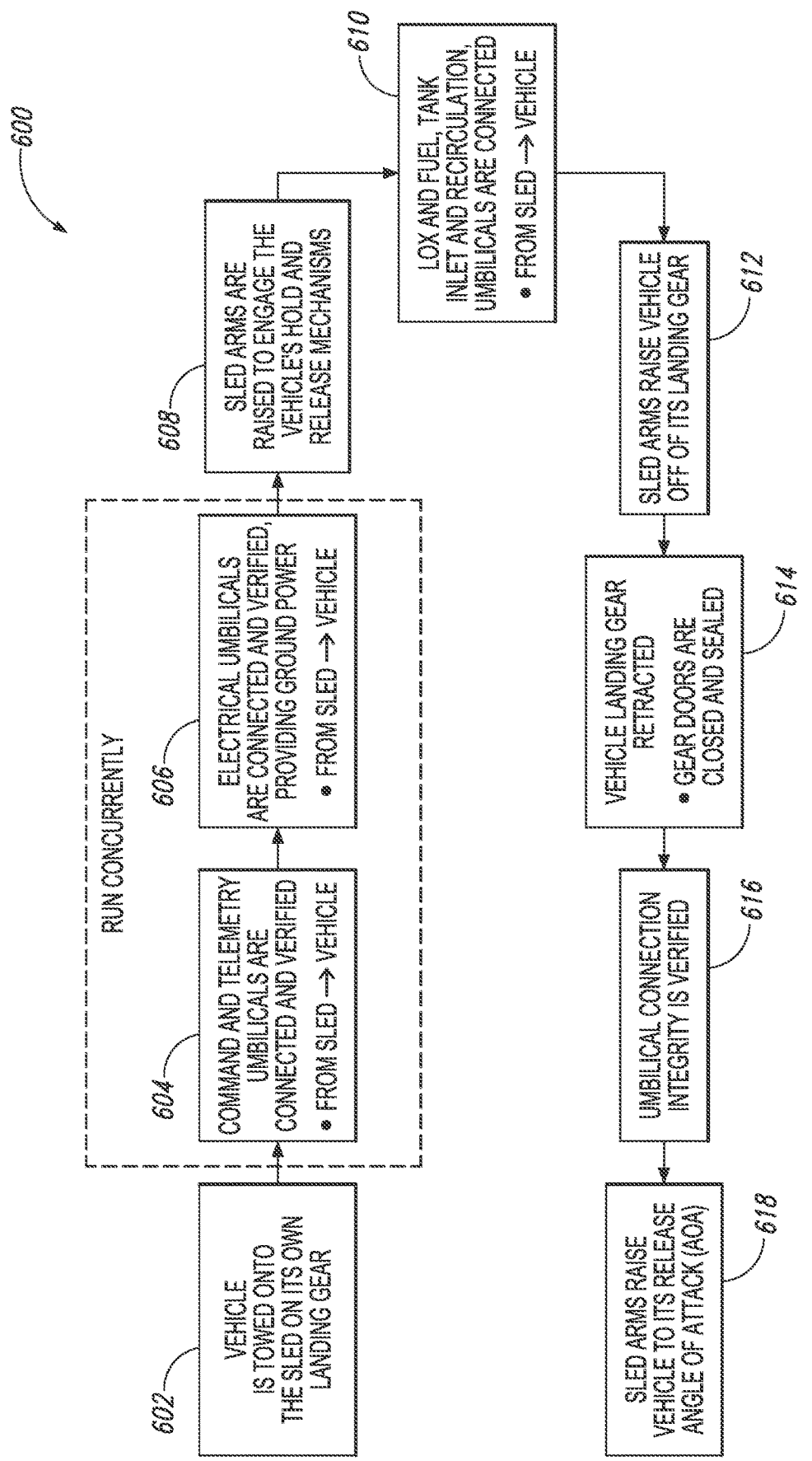
FIG. 6 is a flow diagram of a method for attaching the aerospace vehicle of FIGS. 1A-1E to the launch sled of FIGS. 4A-4C in accordance with embodiments of the present technology.
Figure 7A:
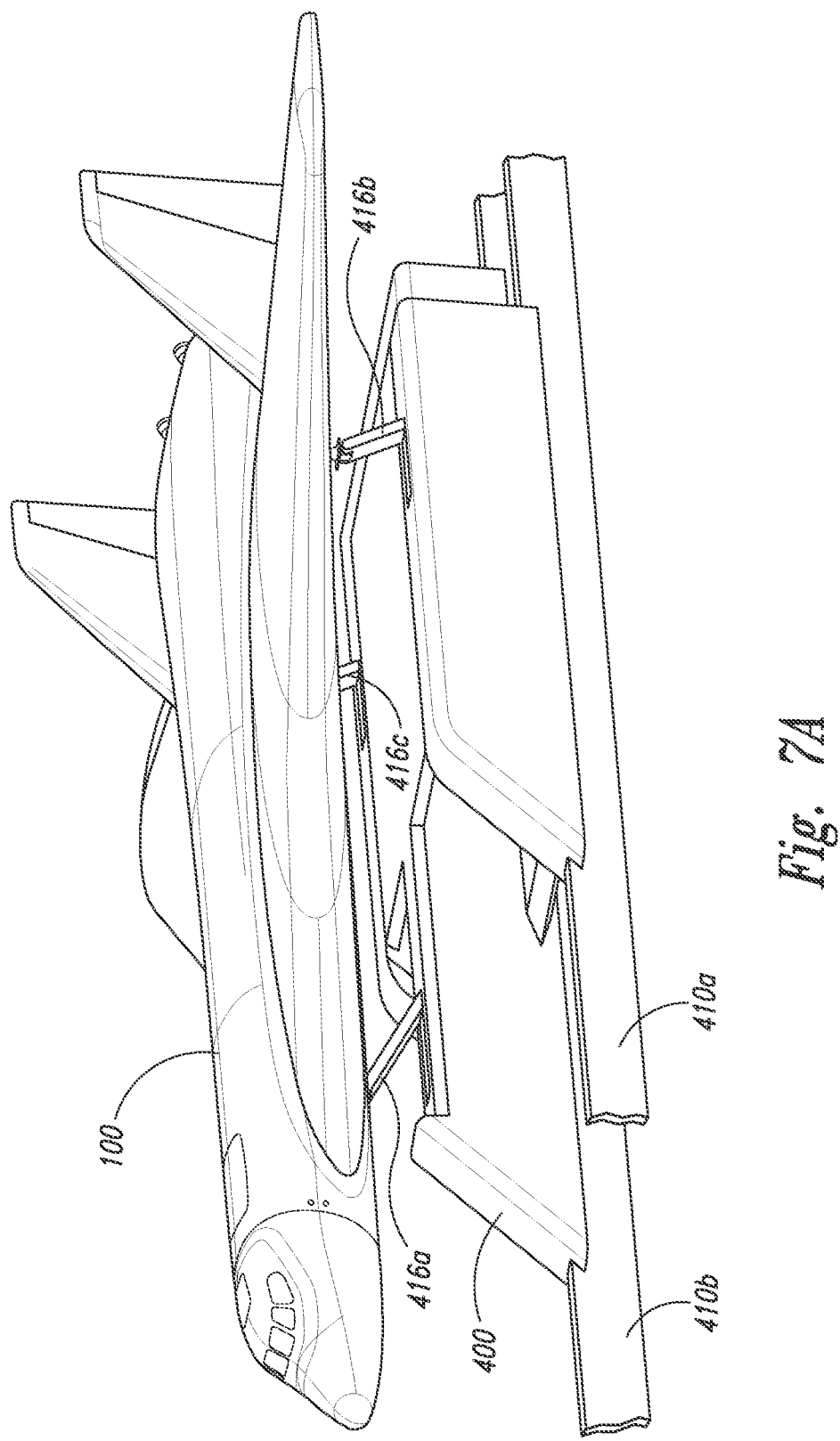
FIG. 7A is a front isometric view of the aerospace vehicle operably mounted to the launch sled.
Figure 7B:
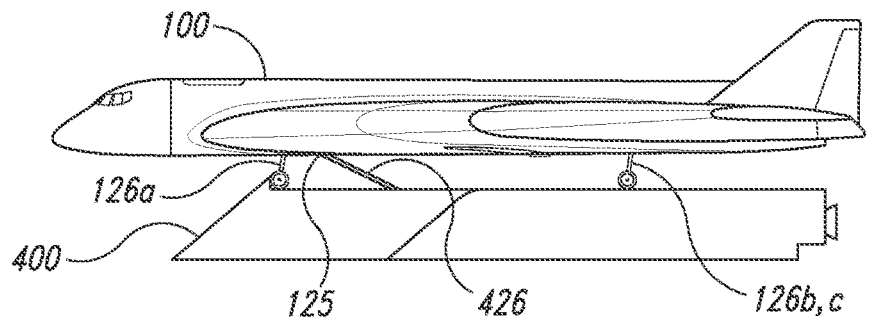
FIGS. 7B-7E are a series of side views illustrating various stages of a process for attaching the vehicle to the launch sled and preparing the vehicle for launch in accordance with embodiments of the present technology.

FIG. 6 is a flow diagram of a method 600 for mounting the vehicle 100 to the launch sled 400 and preparing the vehicle 100 for launch, in accordance with embodiments of the present technology. FIG. 7A is a front isometric view of the vehicle 100 mounted to the launch sled 400, and FIGS. 7B-7E are a series of side views illustrating various stages of the method of FIG. 6 in accordance with embodiments of the present technology. Referring to FIG. 6, the method 600 begins in block 602 with the vehicle 100 being towed onto the sled 400 on its landing gear 126a-c, as shown in FIG. 7B. In block 604, command and telemetry umbilicals are connected from the sled 400 to the vehicle 100 and verified, and in block 606, electrical umbilicals are connected from the sled 400 to the vehicle 100 to provide ground power. In some embodiments, the operations of blocks 604 and 606 can be performed concurrently by a ground crew by connecting the electrical umbilical 426 (FIG. 4A) from the sled 400 to the electrical interface 125 on the vehicle 100 (FIG. 1E), as shown in FIG. 7B.

Figure 7C:
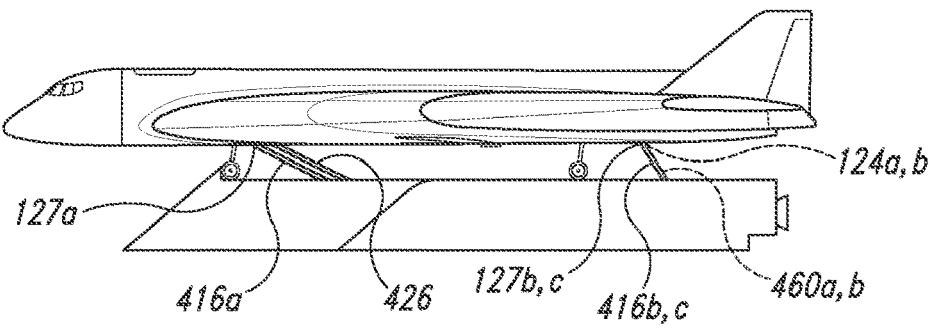

In block 608, the support arms 416a-c are rotated upwardly from the sled 400 to an intermediate position to engage the corresponding support interfaces 127a-c on the underside of the vehicle 100 (FIG. 1E), as shown in FIG. 7C. The support arms 416a-c are releasably coupled to the corresponding interfaces 127a-c on the vehicle 100 by suitable "hold and release mechanisms." Engaging the support arms 416a-c with the vehicle 100 provides the stability needed to connect the propellant umbilicals 460a, b from the sled 400 to the vehicle 100, and in block 610, the propellant umbilicals 460a, b are connected from the sled 400 to the corresponding propellant interfaces 124a, b on the underside of the vehicle 100 (FIG. 1E), as also shown in FIG. 7C. (It should be noted that the propellant umbilicals 460a, b are hidden behind the first aft support arm 416b in FIG. 7C.)

Figure 7D:
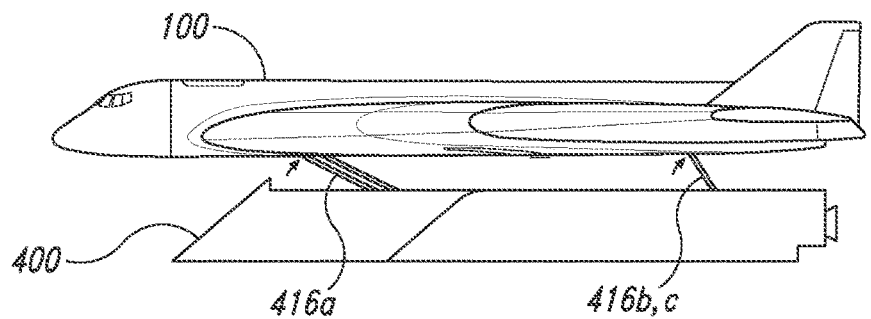
Figure 7E:
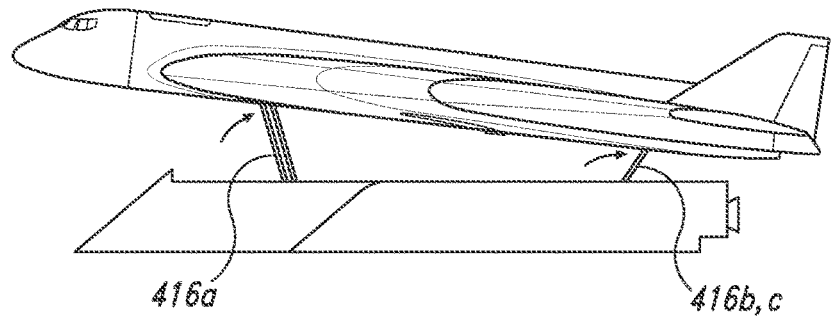

Once the propellant umbilicals 460a, b have been connected to the vehicle 100, their connections are verified, and in block 612, the support arms 416a-c are further rotated upwardly enough to raise the vehicle 100 off of its landing gear 126a-c (see arrows in FIG. 7D). In block 614, the landing gear 126a-c retract into their respective gear bays on the vehicle 100, as shown in FIG. 7D, and the gear doors 129a,c are closed and sealed. In block 616, all of the umbilical connections between the launch sled 400 and the vehicle 100 (e.g., the connections between the electrical umbilical 426 and the propellant umbilicals 460a, b and the vehicle 100) are verified to ensure that, for example, the electrical connections have sufficient integrity, and that the propellant connections are properly sealed. Once this has been done, in block 618, the support arms 416a-c are rotated further aft to raise the vehicle 100 to its release angle of attack (AOA) as shown in FIG. 7E. In other embodiments, the landing gear 126a-c can remain down until the vehicle is raised to its release AOA as shown in FIG. 7E, and can then be retracted into their respective gear bays. In one aspect of these embodiments, it should be noted that because the electrical umbilical 426 and propellant umbilicals 460a, b are positioned adjacent to the respective support arms 416a-c and are approximately the same length as the respective support arms 416a-c, the length of the umbilicals does not change substantially when the support arms 416a-c are rotated from the position shown in FIG. 7D to the position shown in FIG. 7E. This avoids the need to provide for a substantial change in length of the umbilicals 426 and 460a, b during rotation of the vehicle 100.

Figure 8A:
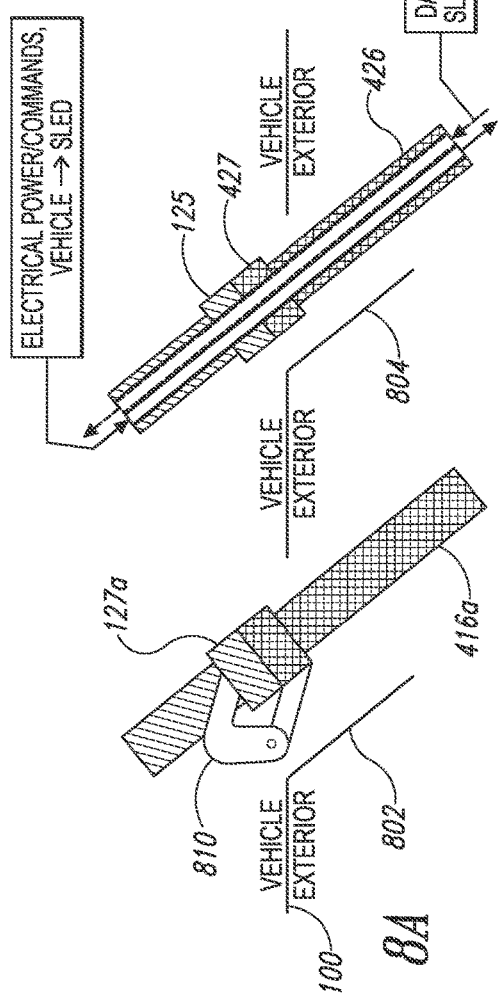
FIG. 8A is a partially schematic side view illustrating forward support arm and electrical umbilical connections to an aerospace vehicle.
Figure 8B:
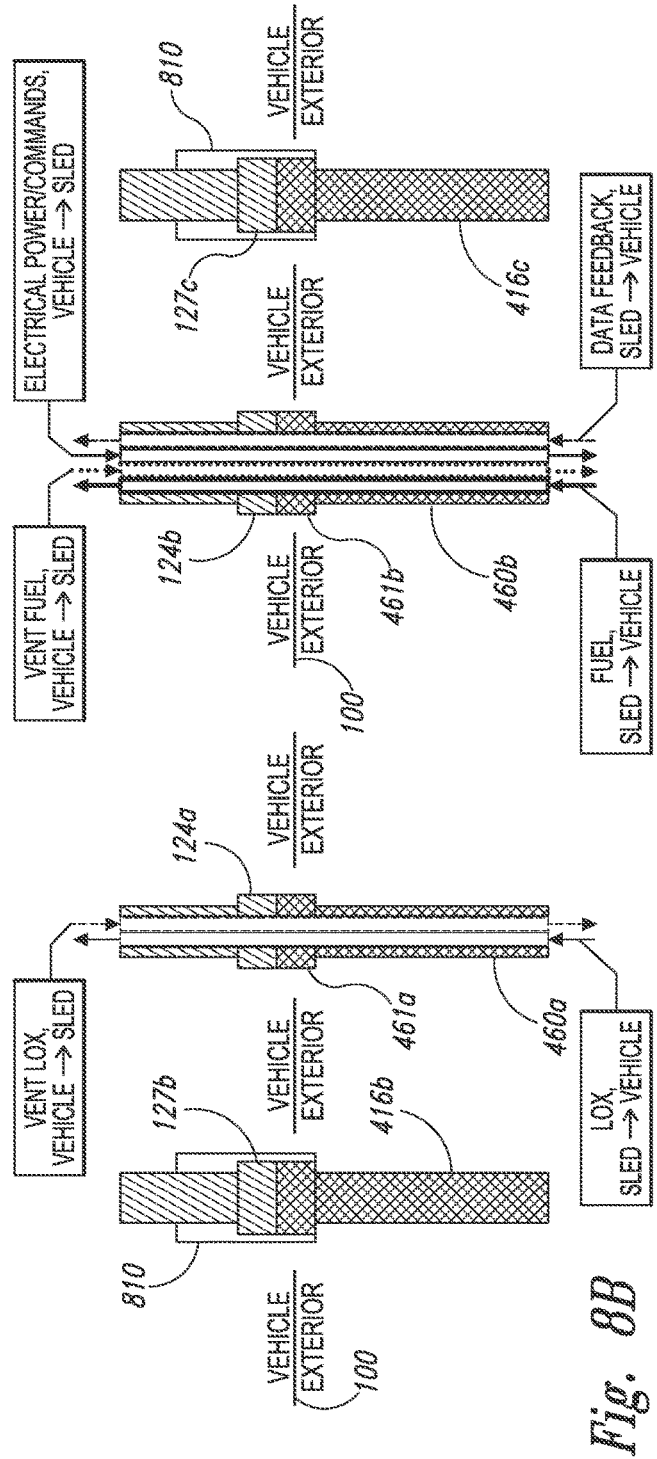
FIG. 8B is a partially schematic rear view illustrating rear support arm and propellant umbilical connections to the aerospace vehicle, configured in accordance with embodiments of the present technology.

FIG. 8A is a partially schematic side view illustrating the connections between the vehicle 100 and the forward support arm 416a and the electrical umbilical 426, and FIG. 8B is a partially schematic rear view illustrating the connections between the vehicle 100 and the rear support arms 416b, c and the propellant umbilicals 460a, b, in accordance with embodiments of the present technology. Referring first to FIG. 8A, as noted above, the distal end portion of each of the support arms 416a-c can be releasably attached to the corresponding support arm interface 127a-c by a hold and release mechanism 810 until commanded to release. Although the hold and release mechanisms 810 securely attach the vehicle 100 to the support arms 416a-c, as described in greater detail below with reference to FIGS. 9A-12D, the hold and release mechanisms 810 enable the support arms 416a-c to rotate relative to the vehicle 100 to move the vehicle 100 relative to the sled 400 as described above with reference to FIGS. 7B-7D. The hold and release mechanisms 810 can include, for example, one or more mechanical hold-down arms connected to linkages that are pneumatically, hydraulically, and/or electrically controlled to hold an engagement feature (e.g., an engagement surface) on the corresponding interface 127a-c until commanded to release in response to a control command. In some embodiments, the hold and release mechanism 810 can be carried on the distal end portion of each support arm 416a-c to reduce vehicle weight. In other embodiments, all or a portion of the hold and release mechanism 810 can be incorporated into the vehicle interface 127a-c. Hold and release mechanisms are known in the art, and in other embodiments, other suitable hold and release systems can be used to attach the support arms 416a-c to the corresponding interfaces 127a-c until commanded to release. As also shown in FIG. 8A, each of the support arm interfaces 127a-c can include a corresponding door 802 that automatically closes once the support arm 416a-c has been released, to thereby close off the interface and protect it from detrimental aerothermal heating, etc.

In some embodiments, the electrical umbilical 426 can be attached to the corresponding electrical interface 125 on the vehicle 100 using any number of suitable connector/receptacle mechanisms known in the art to maintain the electrical connections between the sled 400 and the vehicle 100 until the electrical umbilical 426 is retracted (via, e.g., a lanyard connected to the sled 400) for vehicle separation and liftoff. As schematically illustrated in FIG. 8A, in some embodiments electrical power and commands are transmitted from the vehicle 100 to the sled 400 via the electrical umbilical 426, and data/feedback can be transmitted from the sled 400 to the vehicle 100 via the electrical umbilical 426. In other embodiments, power, commands, data, and/or other electrical information and signals can be transmitted in different directions via the electrical umbilical 426. As with the support arms 416a-c, the electrical interface 125 and both of the propellant interfaces 124a, b can also include a door 804 that automatically closes upon retraction of the corresponding umbilical.

Referring next to FIG. 8B, in the illustrated embodiment oxidizer (e.g., subcooled LOX) flows from the sled 400 to the vehicle 100 via the first propellant umbilical 460a. In one aspect of this embodiment, the first propellant umbilical 460a can be further configured to enable oxidizer that is vented from the vehicle oxidizer tank 242 to flow back to the sled 400. For example, in some embodiments the first propellant umbilical 460a can include two separate conduits: one that flows oxidizer (e.g., subcooled LOX) to the vehicle tank 242, and one that flows vented oxidizer from the vehicle tank 242 back to the sled 400 for re-cooling and re-densifying. As described in greater detail below, by recirculating vented oxidizer back to the launch sled 400 in the foregoing manner, the vehicle oxidizer tank 242 can be maintained at a full level. Similarly, the second propellant umbilical 460b can also include two separate conduits: one configured to flow fuel (e.g., Jet-A) from the launch sled 400 to the vehicle 100, and another to recirculate vented fuel from the vehicle tanks 240a, b back to the sled so that the vehicle tanks 240a, b are maintained at a full fuel level. The outlets 461a, b of the propellant umbilicals 460a, b can be releasably attached to the corresponding propellant interfaces 124a, b using suitable propellant conduit couplings known in the art. Such couplings can include, for example, pneumatically actuated clamps that maintain the sealed connection between the umbilical outlets 461a, b and the corresponding interfaces 124a, b until commanded to release. In the illustrated embodiment, the second propellant line 460b is also configured to provide one or more electrical umbilical connections between the launch sled and the vehicle 100. Although it is schematically illustrated that the aforementioned electrical umbilicals extend through the second propellant umbilical 460b, it will be understood that in other embodiments the electrical connections provided at the second propellant umbilical 460b can be positioned outside of the propellant line 460b or otherwise in close proximity to the umbilical 460b.

Figure 9A:
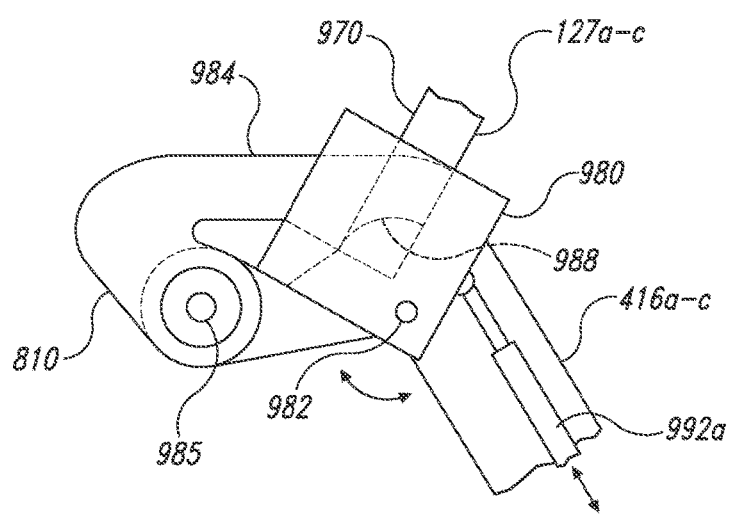
FIGS. 9A and 9B are side and rear views, respectively, of a support arm hold and release mechanism in a first stage of operation.
Figure 9B:
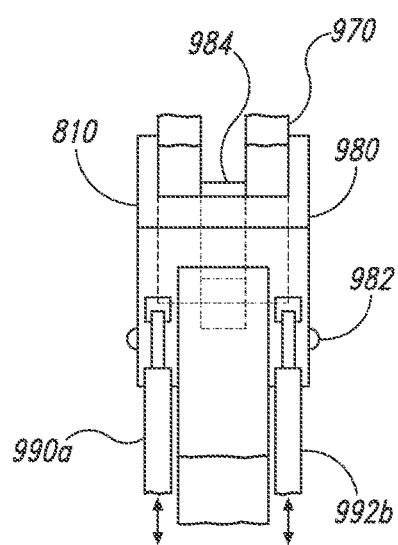
Figure 9C:
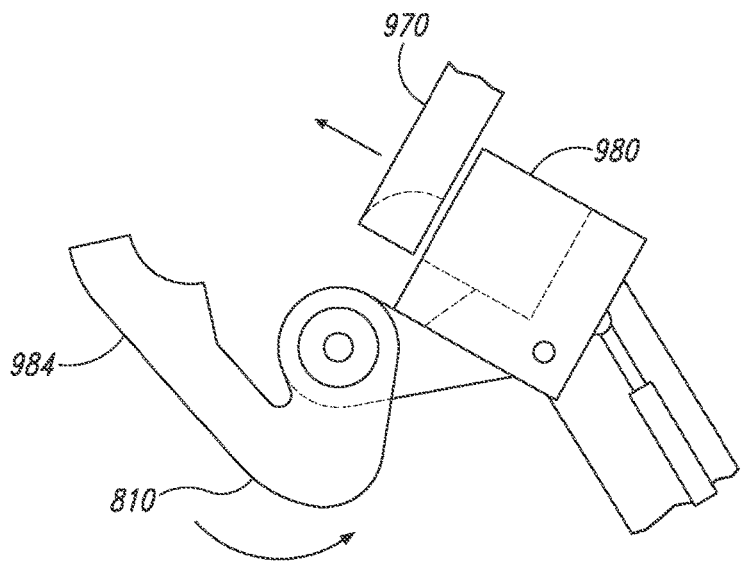
FIG. 9C is a side view of the support arm hold and release mechanism in a second stage of operation, in accordance with embodiments of the present technology.

FIGS. 9A and 9B are side and rear views, respectively, of a support arm hold and release mechanism 810 in a first stage of operation, and FIG. 9C is a side view of the hold and release mechanism 810 in a second stage of operation, in accordance with embodiments of the present technology. Referring first to FIGS. 9A and 9B, each of the support arms 416a-c on the sled 400 carries a hold and release mechanism 810 on a distal end portion thereof. In some embodiments, each of the hold and release mechanisms 810 includes a fitting 980 (e.g., a "backstop" fitting) that is pivotally attached to the distal end portion of the corresponding support arm 416a-c by means of a pivot shaft 982. Additionally, each of the hold and release mechanisms 810 includes a hold-down arm 984 that is pivotally coupled to the backstop fitting 980 by means of a pivot shaft 985. The distal end portion of the hold-down arm 984 includes a recessed surface 988 that in operation clamps an attachment fitting 970 of the corresponding vehicle interface 127a-c to the backstop fitting 980.

FIGS. 10A and 10B are front and side cross-sectional views, respectively, of the attachment fitting 970 configured in accordance with embodiments of the present technology. Referring to FIGS. 10A and 10B together, in some embodiments the attachment fitting 970 can be a "U"-shaped fitting having a curved (e.g., rounded convex) clamping surface 1072. As shown in FIG. 9A, the recessed surface 988 on the distal end portion of the hold-down arm 984 has a complementary shape (e.g., rounded concave) to clamp against the surface 1072 of the attachment fitting 970.

FIGS. 11A and 11B are front and side cross-sectional views, respectively, of the backstop fitting 980 configured in accordance with embodiments of the present technology. As these views illustrate, in some embodiments the backstop fitting 980 can include a pocket 989 (e.g., a rectangular-shaped pocket) having side walls 990a, b and a back wall 990c. The pocket 989 is shaped and sized to receive and retain the attachment fitting 970 against downward and aft movement, yet enable the attachment fitting 970 to move forward and upwardly out of the backstop fitting 980 when released by the hold-down arm 984, as described in greater detail below.

As described above, the support arms 416a-c are configured to rotate as shown in FIGS. 7D and 7E after attachment to the corresponding vehicle interfaces 127a-c. To accommodate this rotation, the hold and release mechanism 810 includes extensible actuators 992a, b, each having a distal end portion attached to the backstop fitting 980. The actuators 992a, b are configured to extend as the corresponding control arms 416a-c rotate aft, thereby causing the corresponding backstop fitting 980 to rotate about the pivot shaft 982 and accommodate rotation of the support arm 416a-c relative to the corresponding vehicle attachment fitting 970. In some embodiments, the actuators 992a, b can be hydraulic actuators, pneumatic actuators, electro-mechanical actuators, or other suitable types of actuators, including other nonlinear actuators known in the art.

As shown in FIG. 9C, when the hold and release mechanism 810 is commanded to release, the hold-down arm 984 rotates away from the attachment fitting 970, thereby enabling the fitting 970 to move upwardly and forwardly out of the backstop fitting 980 as the vehicle 100 (FIG. 1A) separates away from the sled 400 (FIG. 4A). Movement of the hold-down arm 984 can be controlled by various suitable drive systems known in the art. For example, in some embodiments the hold-down arm 984 can be held in the "hold" position (FIG. 9A) and then moved to the "release" position (FIG. 9C) by a linkage that is hydraulically or pneumatically actuated. In other embodiments, movement of the hold-down arm 984 can be controlled by an electro-mechanical system.

Figure 12A:
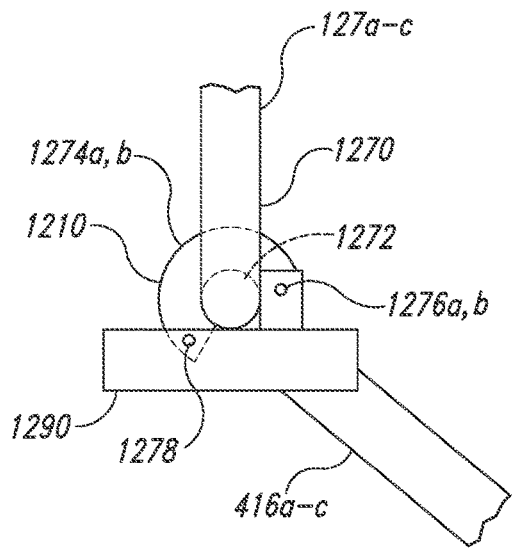
FIGS. 12A and 12B are side and rear views, respectively, of another support arm hold and release mechanism in a first stage of operation.
Figure 12B:
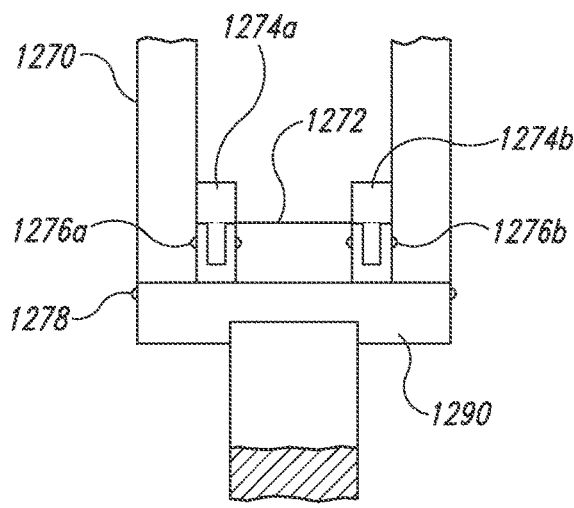
Figure 12C:
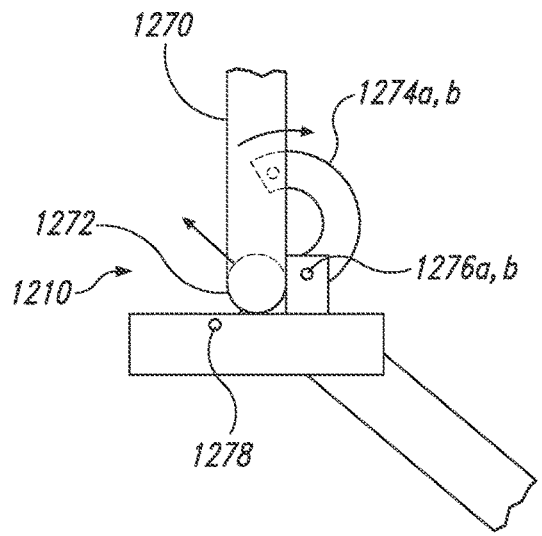
FIGS. 12C and 12D are side and rear views, respectively, of the support arm hold and release mechanism in a second stage of operation, in accordance with embodiments of the present technology.
Figure 12D:
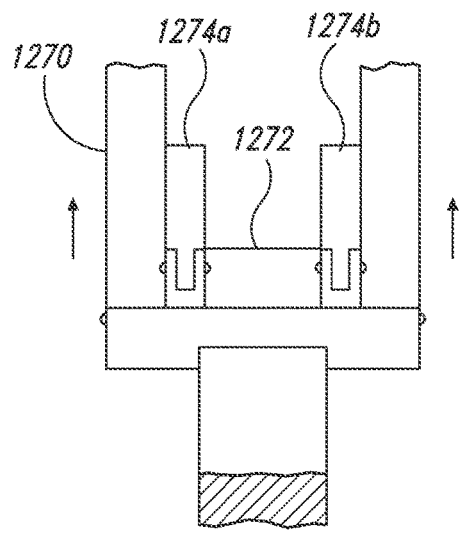

The hold and release mechanism 810 described above with reference to FIGS. 9A-11B is one example of a suitable hold and release system that can be used with embodiments of the present technology. In other embodiments, other suitable hold and release mechanisms can be used without departing from the present disclosure. For example, FIGS. 12A and 12B are side and rear views, respectively, of a hold and release mechanism 1210 in a first stage of operation, and FIGS. 12C and 12D are corresponding side and rear views, respectively, of the hold and release mechanism 1210 in a second stage of operation, in accordance with embodiments of the present technology. Referring first to FIGS. 12A and 12B, the hold and release mechanism 1210 can be referred to as a "clamshell" type hold and release mechanism that utilizes two hold-down members 1274a, b to securely attach an end fitting 1270 at each of the vehicle interfaces 127a-c to the corresponding support arm 416a-c. In the illustrated embodiment, the hold-down members 1274a, b are arcuate ring segments (or "clamshells") having an inner diameter configured to encircle a cylindrical crossbar 1272 that extends horizontally on the end fitting 1270. The proximal end portions of the first and second hold-down members 1274a, b are pivotally coupled to a base 1290 by means of corresponding pivot pins 1276a, b. The distal end portions of the first and second hold-down members 1274a, b are releasably secured to the base 1290 in the closed position by a lockpin 1278 that extends through a bore in the base 1290 and through corresponding holes (not shown) in the distal end portions.

Turning next to FIGS. 12C and 12D, when the hold and release mechanism 1210 is commanded to release, the lockpin 1278 is retracted from the distal end portions of the first and second hold-down members 1274a, b and the hold-down members 1274a, b are rotated aft about the corresponding pivot pins 1276a, b. Movement of the hold-down members 1274a, b in the foregoing manner releases the crossbar 1272 and enables the attachment fitting 1270 to move forwardly and upwardly away from the hold and release mechanism 1210 as the vehicle 100 separates from the sled 400. The hold and release mechanisms described above are provided by way of example only. Accordingly, those of ordinary skill in the art will appreciate that other suitable hold and release mechanisms can be used, consistent with the present disclosure.

Figure 13:
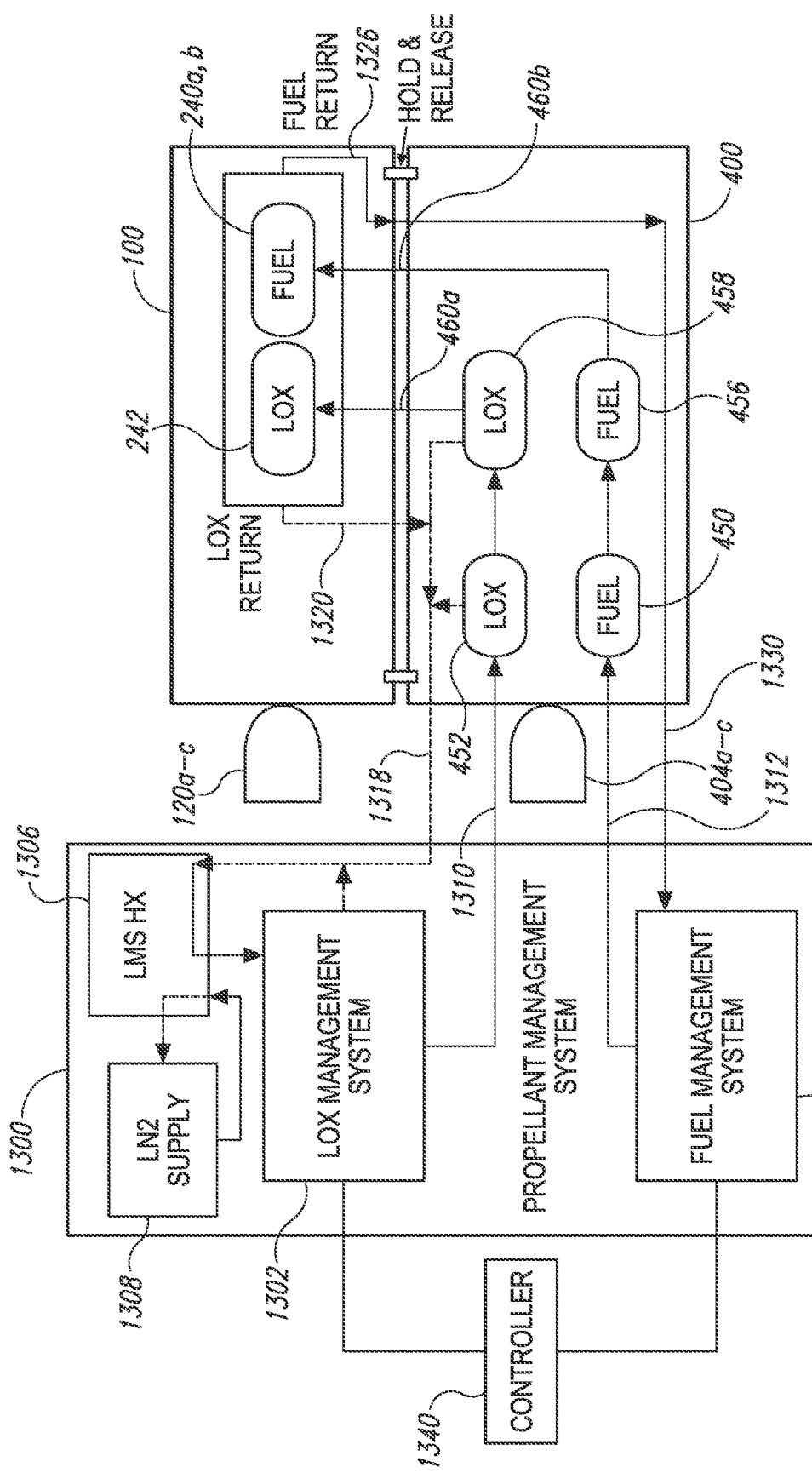
FIG. 13 is a schematic diagram of an aerospace vehicle and a launch sled operably coupled to a propellant management system configured in accordance with embodiments of the present technology.

FIG. 13 is a schematic diagram illustrating a ground based propellant management system 1300 connected to the vehicle 100 and the sled 400 in accordance with embodiments of the present technology. In some embodiments, the propellant management system 1300 includes an oxidizer management system 1302 (e.g., a LOX management system) and a fuel management system 1304 which are operably connected to a controller 1340. Those of ordinary skill in the art will understand that the oxidizer management system 1302 and the fuel management system 1304 include electronically controlled propellant pumps, valves, actuators, and associated propellant conduits, etc. configured to direct the propellant flows in the manner described herein. The propellant management system controller 1340 includes one or more processors that control operations and functions of the oxidizer management system 1302, the fuel management system 1304, and other components of the propellant management system 1300 in accordance with computer-readable instructions stored on a suitable memory. It will be understood that the controller 1340 can include any logic processing unit, such as one or more CPUs, DSPs, APUs, etc. The propellant management system 1300 further includes a heat exchanger 1306 and a liquid nitrogen (LN2) supply 1308. The LN2 supply 1308 is configured to circulate LN2 through the heat exchanger 1306 to increase the density of LOX flowing through the heat exchanger 1306 by lowering its temperature from the normal boiling point (NBP) of LOX (i.e., −182.96 degrees C.) to the NBP of LN2 (i.e., −195.79 degrees C.). It will be appreciated that although the system of FIG. 13 is described in the context of a LOX management system, such system could be used with other types of oxidizer.

In the illustrated embodiment, the propellant management system 1300 includes a LOX feed line 1310 that can be releasably connected in fluid communication to the sled LOX tanks 452, and a fuel feed line 1312 that can be releasably connected in fluid communication to the sled fuel tanks 450. Although the sled 400 includes three LOX tanks 452 and three fuel tanks 450 in some embodiments, the LOX tanks 452 and the fuel tanks 450 are depicted as a single LOX tank and a single fuel tank, respectively, in FIG. 13 for ease of illustration. The propellant management system 1300 further includes a LOX return line 1318 and a fuel return line 1330. The LOX return line 1318 can be releasably connected in fluid communication to the sled LOX tanks 452, the auxiliary LOX tank 458, and the vehicle LOX tank 242 to enable vented LOX to recirculate through the heat exchanger 1306. The fuel return line 1330 can be releasably connected to the sled 400 in fluid communication with the vehicle fuel tank 240.

Figure 14:
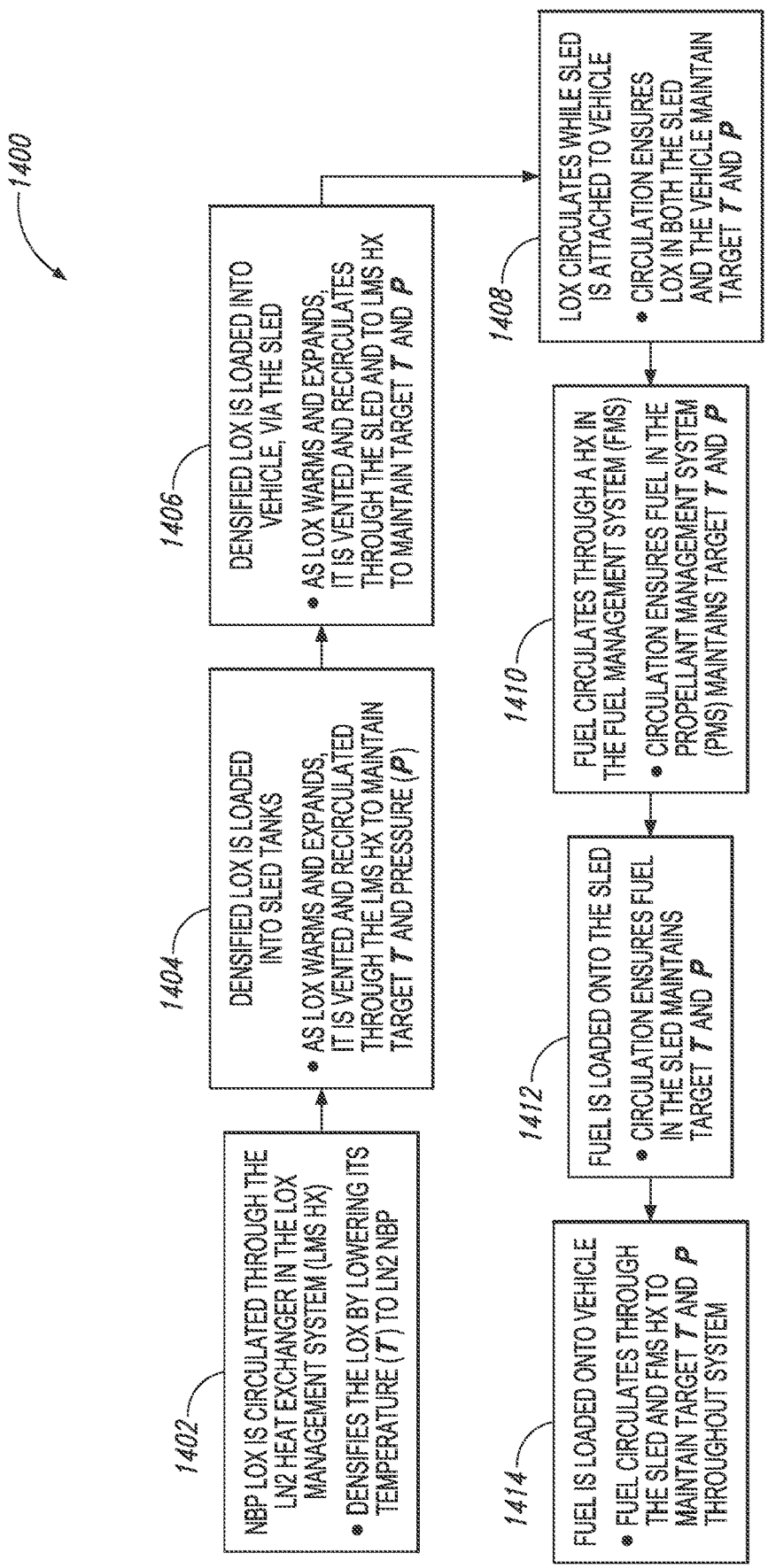
FIG. 14 is a flow diagram of a routine for loading propellants onto a launch sled and an aerospace vehicle in accordance with embodiments of the present technology.

FIG. 14 is a flow diagram of a routine 1400 for loading propellants onto the vehicle 100 and the sled 400 in accordance with embodiments of the present technology. All or portions of the routine 1400 can be performed by ground control computers, the propellant management system controller 1340, and/or computers onboard the vehicle 100 in accordance with computer readable instructions stored on memory. Referring to FIG. 14 with reference to FIG. 13, in block 1402, once the vehicle 100 is at its liftoff angle of attack, NBP LOX is circulated through the LN2 heat exchanger 1306. This increases the density of the LOX by lowering its temperature from LOX NBP (i.e., −182.96 degrees C.), or from about LOX NBP, to LN2 NBP (i.e., −195.79 degrees C.), or to about LN2 NBP. In block 1404, the LOX management system 1302 transfers the densified LOX from the heat exchanger 1306 to the sled LOX tanks 452 and the auxiliary LOX tank 458 via the LOX feed line 1310. It will be understood that, in some embodiments the propellant management system 1300 and/or the sled 400 can include one or more propellant pumps and/or associated valves operably connected to the LOX feed line 1310 to facilitate and control the transfer of LOX from the heat exchanger 1306 to the sled LOX tanks 452 and the auxiliary LOX tank 458. As the LOX in the tanks 452 and 458 warms to its NBP, it expands and is vented from the tanks and returns to the heat exchanger 1306 via the recirculation line 1318 so that the LOX can be re-densified. The heat exchanger 1306 maintains the LOX at the target temperature of, e.g., −195.79 degrees C., or about −196 degrees C., and a target pressure of, e.g., about 17 psia. In other embodiments, the heat exchanger 1306 can maintain the LOX at other target temperatures and/or target pressures. For example, in some embodiments the heat exchanger 1306 (and/or other components of the propellant management system 1300) can maintain the LOX at a target pressure less than 17 psia, or greater than 17 psia, such as about 20 psia, or about 40 psia.

In block 1406, once the temperature and pressure of the LOX in the sled tanks 452 and 458 have stabilized at the target temperature and pressure, densified LOX is loaded into the vehicle LOX tank 242 from the sled auxiliary LOX tank 458 via the first propellant umbilical 460a. It will be understood that, in some embodiments the sled 400 and/or the vehicle 100 can include one or more propellant pumps and/or associated valves operably connected in fluid communication with the first propellant umbilical 460a to facilitate and control the transfer of LOX from the sled auxiliary LOX tank 458 into the vehicle LOX tank 242. As the LOX in the vehicle LOX tank 242 warms and expands, it is vented from the LOX tank 242 through a recirculation umbilical 1320 back to the sled 400, and then back to the heat exchanger 1306 via the recirculation line 1318. Although the recirculation umbilical 1320 is depicted as being separate from the first propellant umbilical 460a for ease of illustration, it will be understood from the description of the first propellant umbilical 460a provided above with reference to FIG. 8B that, in some embodiments, the LOX recirculation umbilical 1320 can be conjoined or otherwise combined with the first propellant umbilical 460a.

In block 1408, the LOX flowing back to the heat exchanger 1306 is cooled and densified as described above and can be recirculated back to the sled LOX tanks 452, the sled auxiliary LOX tank 458, and the vehicle LOX tank 242, as needed to maintain the tanks in full, or at least nearly full, conditions. In block 1410, once the LOX in the sled and vehicle tanks has stabilized, the fuel management system 1304 begins circulating fuel through a fuel heat exchanger (not shown) until it reaches its target temperature and pressure (e.g., about 60 degrees F. and about 40 psia). In other embodiments, the fuel heat exchanger can maintain the fuel at other target temperatures and/or target pressures. For example, in some embodiments the fuel heat exchanger (and/or other components of the propellant management system 1300) can maintain the fuel at a target pressure less than 40 psia, such as about 17 psia, or about 20 psia, or greater than 40 psia. In block 1412, the fuel is then loaded into the sled fuel tanks 450 and the sled auxiliary fuel tank 456 via the fuel feed line 1312 and circulated to maintain the fuel at its target temperature and pressure. It will be understood that, in some embodiments the propellant management system 1300 and/or the sled 400 can include one or more propellant pumps and/or associated valves operably connected to the fuel feed line 1312 to facilitate and control the transfer of fuel from the fuel management system 1304 to the sled fuel tanks 450 and the sled auxiliary fuel tank 456. In block 1414, fuel then flows from the auxiliary fuel tank 456 on the sled 400 to the vehicle fuel tank 240 via the second propellant umbilical 460b. In some embodiments, the sled 400 and/or the vehicle 100 can include one or more propellant pumps and/or associated valves operably connected in fluid communication with the second propellant umbilical 460b to facilitate and control the transfer of fuel from the sled auxiliary fuel tank 456 into the vehicle fuel tank 240. The fuel circulates from the vehicle fuel tank 240 back to the sled 400 via a recirculation line 1326. Although the recirculation line 1326 is illustrated as being separate from the second propellant umbilical 460b for ease of illustration, as described above with reference to FIG. 8B, in some embodiments the fuel recirculation path from the vehicle 100 to the sled 400 can be through a conduit that is carried by the second propellant umbilical 460b. The recirculated fuel then flows from the sled 400 back to the fuel management system 1304 via the fuel recirculation line 1330 to maintain the fuel at the target temperature and pressure. Circulation of the fuel through the tanks 450, 456 and 240 and the fuel management system heat exchanger as described above ensures that the fuel maintains its target temperature and pressure throughout the system.

Figure 15:
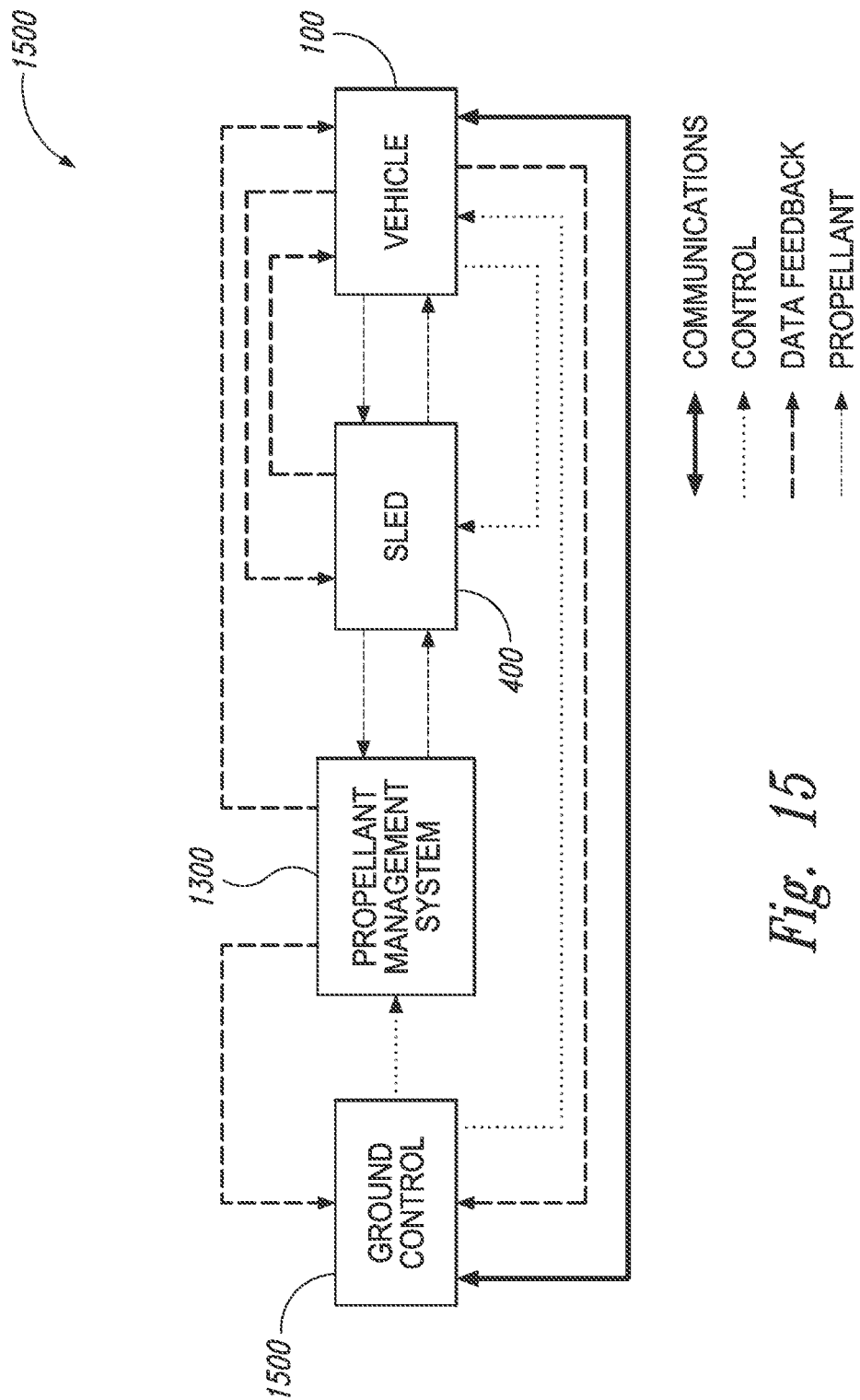
FIG. 15 is a schematic diagram of a system architecture for controlling a propellant management system, a launch sled, and an aerospace vehicle during propellant loading, in accordance with embodiments of the present technology.

FIG. 15 is a schematic diagram of a suitable control system architecture for performing all or a portion of the routines described above when the vehicle 100 is connected to the propellant management system 1300, in accordance with embodiments of the present technology. In the illustrated embodiment, ground control 1500 (e.g., one or more controllers and/or other processing devices executing computer readable instructions and/or responding to user inputs) controls the propellant management system 1300, ensuring that the temperature, pressure and flow rates of the propellants remain constant, or at least approximately constant, as the propellants flow through the sled 400 and the vehicle 100. The propellant management system 1300 provides the status of the propellants and other relevant data about the propellant management system (e.g., data feedback) to ground control 1500 and the vehicle 100. Ground control 1500 also controls operations of the vehicle 100 at this time and, through the vehicle 100, is able to control the sled 400. In other embodiments, ground control 1500 can control operation of the sled 400 directly. The sled provides data feedback to the vehicle 100, which in turn provides data feedback from both the sled and the vehicle 100 to ground control 1500. Ground control and the vehicle 100 remain in constant communications (e.g., verbal communications from the crew of the vehicle 100 to ground control personnel) throughout the entire process with ground control 1500 providing updates to the crew of the vehicle 100 and the crew providing information to ground control, when necessary. In other embodiments, the communication, control, and/or feedback paths between ground control 1500, the vehicle 100 and/or the sled 400 can differ from those described above. As further illustrated in FIG. 15, and as described in detail above, the propellant management system 1300 provides propellants to both the sled and the vehicle and maintains the propellants at target temperatures and pressures via recirculation. It will be understood by those of ordinary skill in the art that the communications, controls, and data feedback provided between the ground control 1500, the propellant management system 1300, the sled 400, and the vehicle 100 will generally be implemented via wired and/or wireless connections providing digital communications of information, data, control signals, etc. between the respective system controllers.

Figure 16A:
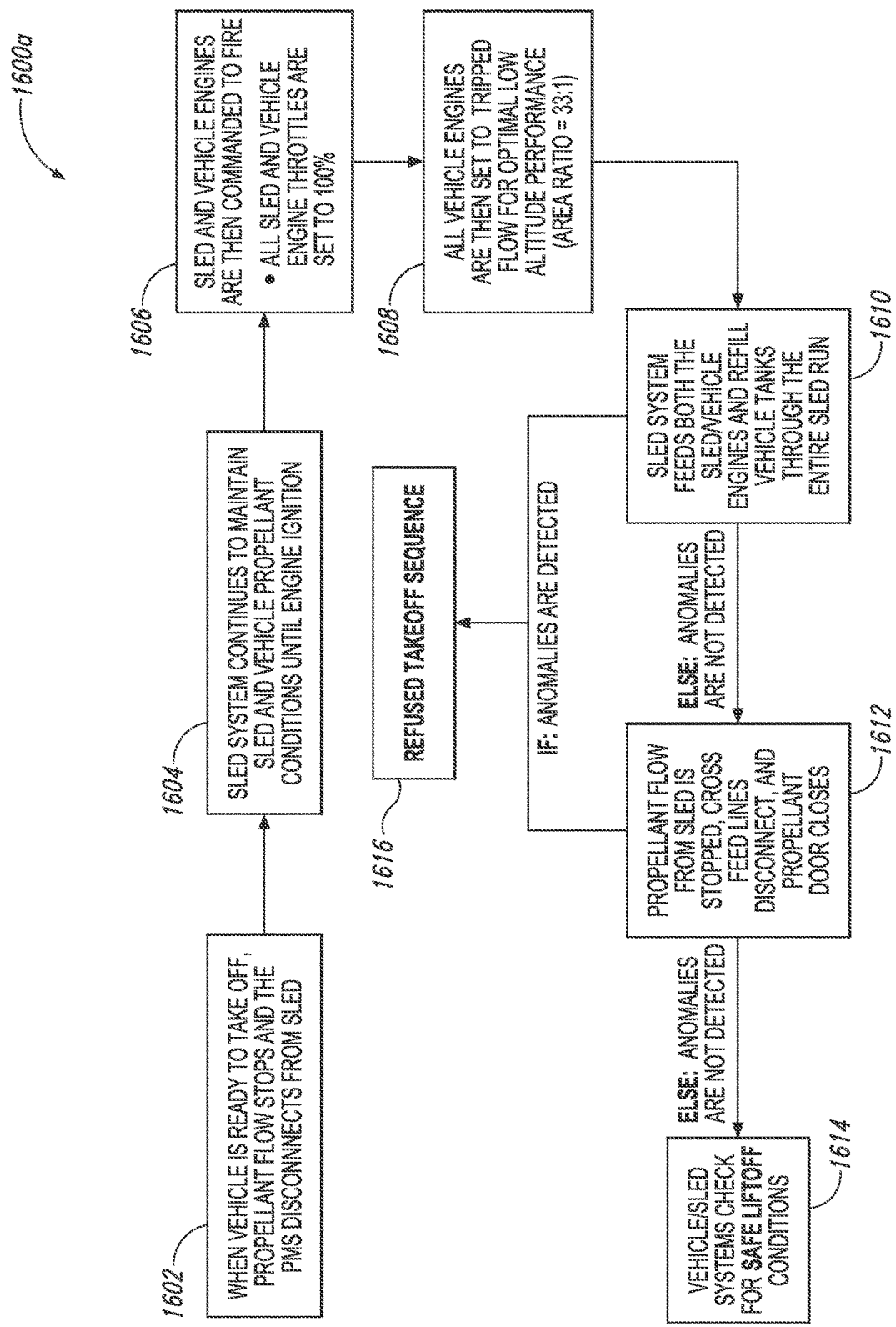
FIG. 16A is a flow diagram of a routine for operating an aerospace vehicle and a launch sled during a takeoff run.
Figure 16B:
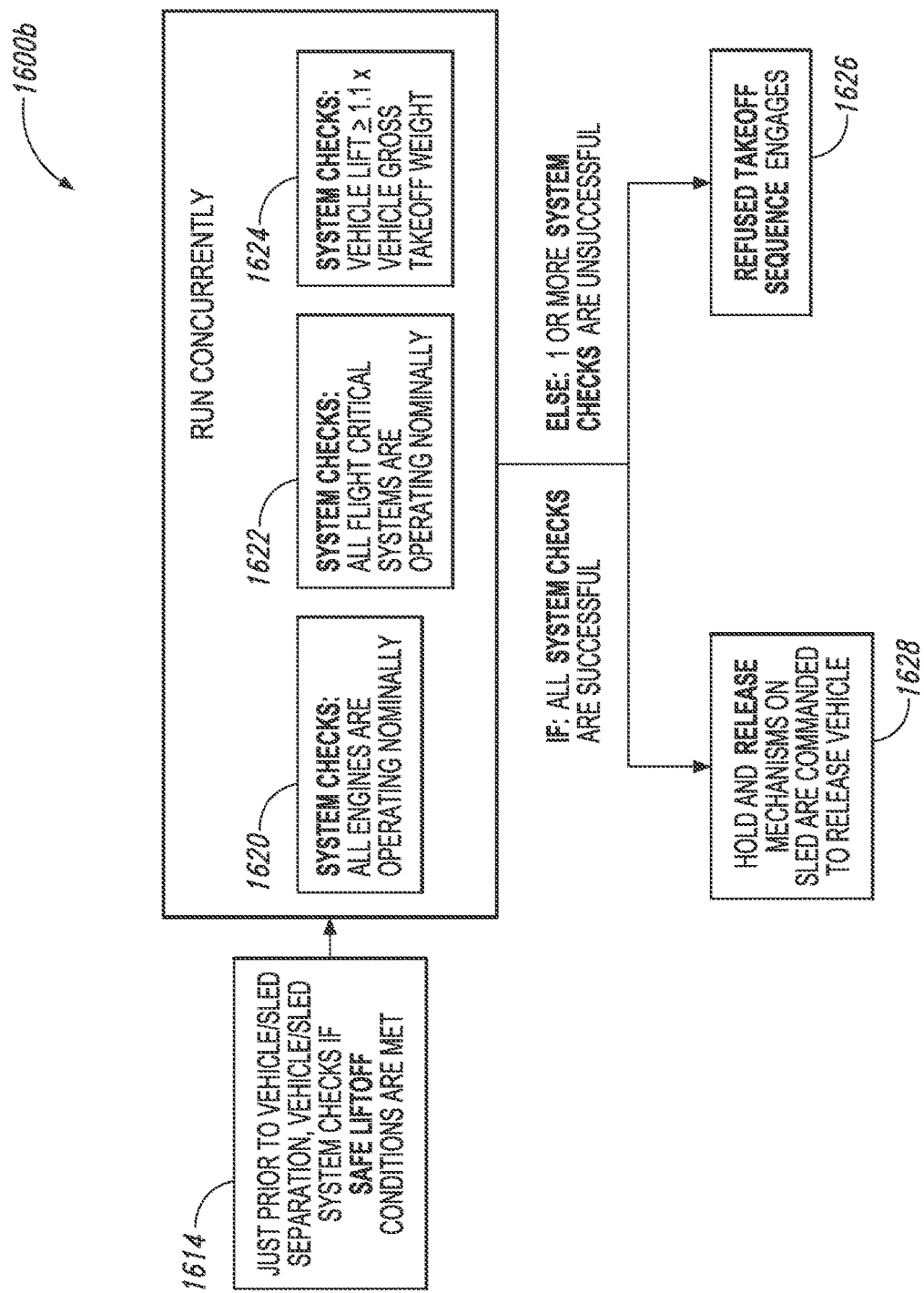
FIG. 16B is a flow diagram of a routine for confirming safe liftoff conditions prior to release of the aerospace vehicle from the launch sled.
Figure 16C:
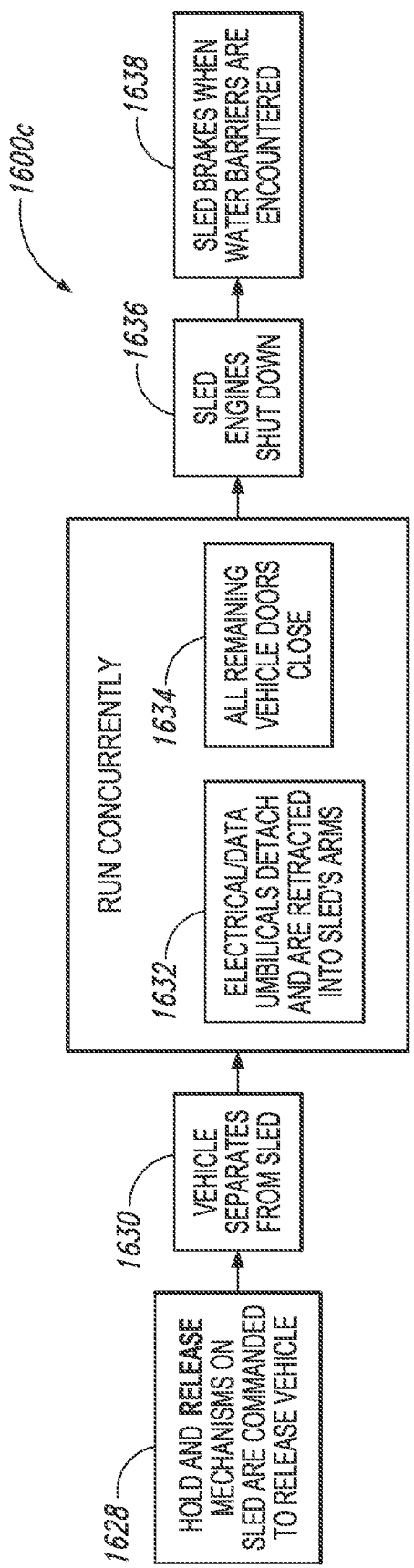
FIG. 16C is a flow diagram of a routine for liftoff of the aerospace vehicle from the launch sled.
Figure 16D:
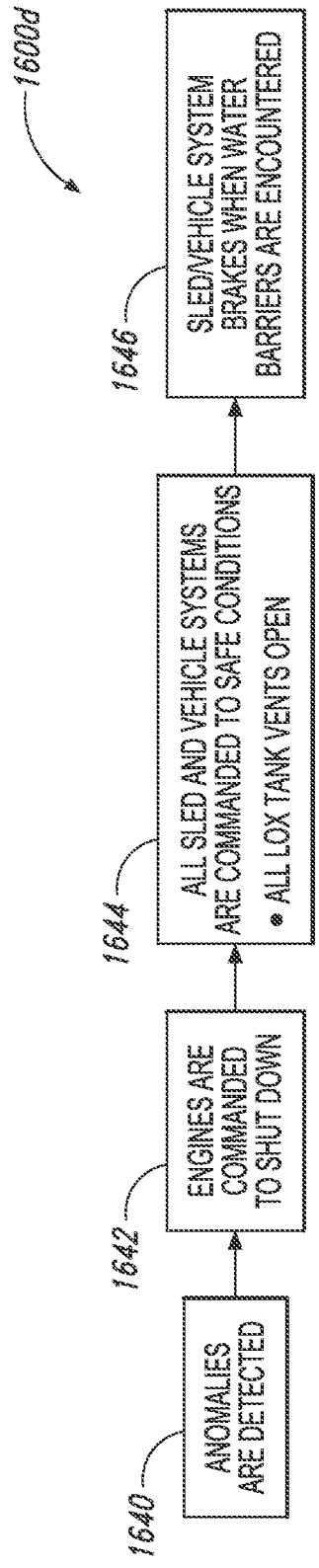
FIG. 16D is a flow diagram of a routine for aborting liftoff of the aerospace vehicle from the launch sled, in accordance with embodiments of the present technology.
Figure 17A:
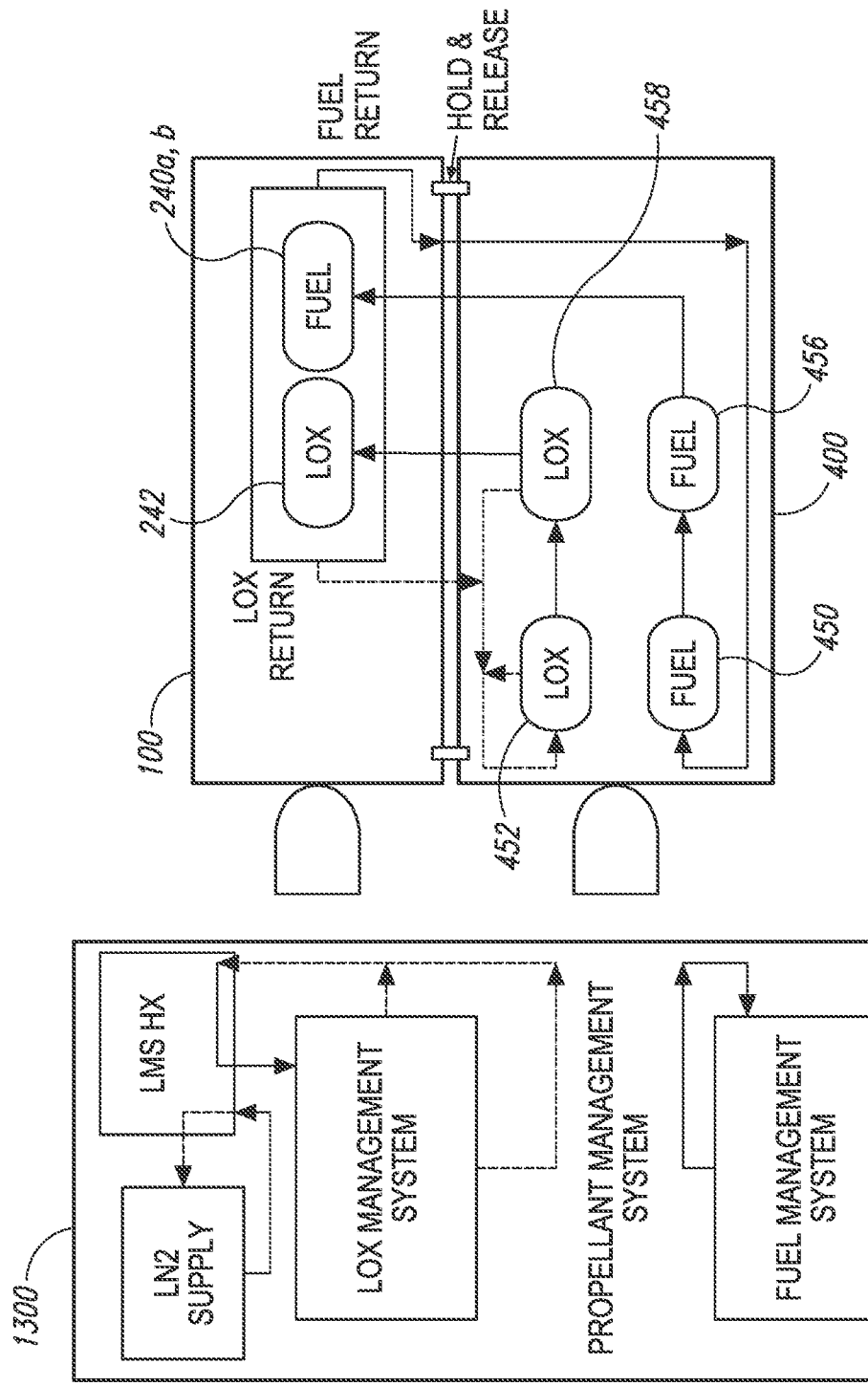
FIGS. 17A-17D are a series of schematic diagrams illustrating operation of an aerospace vehicle and a launch sled at various stages of a launch process in accordance with embodiments of the present technology.

FIG. 16A is a flow diagram of a routine 1600a for operating the vehicle 100 and the launch sled 400 during a takeoff run; FIG. 16B is a flow diagram of a routine 1600b for confirming safe liftoff conditions prior to release of the vehicle 100 from the sled 400; FIG. 16C is a flow diagram of a routine 1600c for liftoff of the vehicle 100 from the sled 400; and FIG. 16D is a flow diagram of a routine 1600d for aborting liftoff of the vehicle 100 from the sled 400, in accordance with embodiments of the present technology. FIGS. 17A-17D are a series of schematic diagrams illustrating operation of the vehicle 100 and the launch sled 400 at various stages of the launch sequences described in FIGS. 16A-16D, in accordance with embodiments of the present technology. Referring first to the routine 1600a of FIG. 16A, in block 1602, once all of the pre-flight checkouts for the vehicle 100 have been completed and the vehicle is ready for takeoff, ground control stops propellant flow from the propellant management system 1300 (FIG. 13) to the sled 400 and then disconnects the propellant management system 1300 from the sled 400, as shown in FIG. 17A. In block 1604, the sled propellant system continues to maintain the sled and vehicle propellant conditions until engine ignition by recirculation of LOX and fuel from the vehicle LOX tank 242 and the vehicle fuel tank 240, respectively, to the sled LOX tanks 452 and 458, and the sled fuel tanks 450 and 456, respectively, as also shown in FIG. 17A.

Figure 17B:
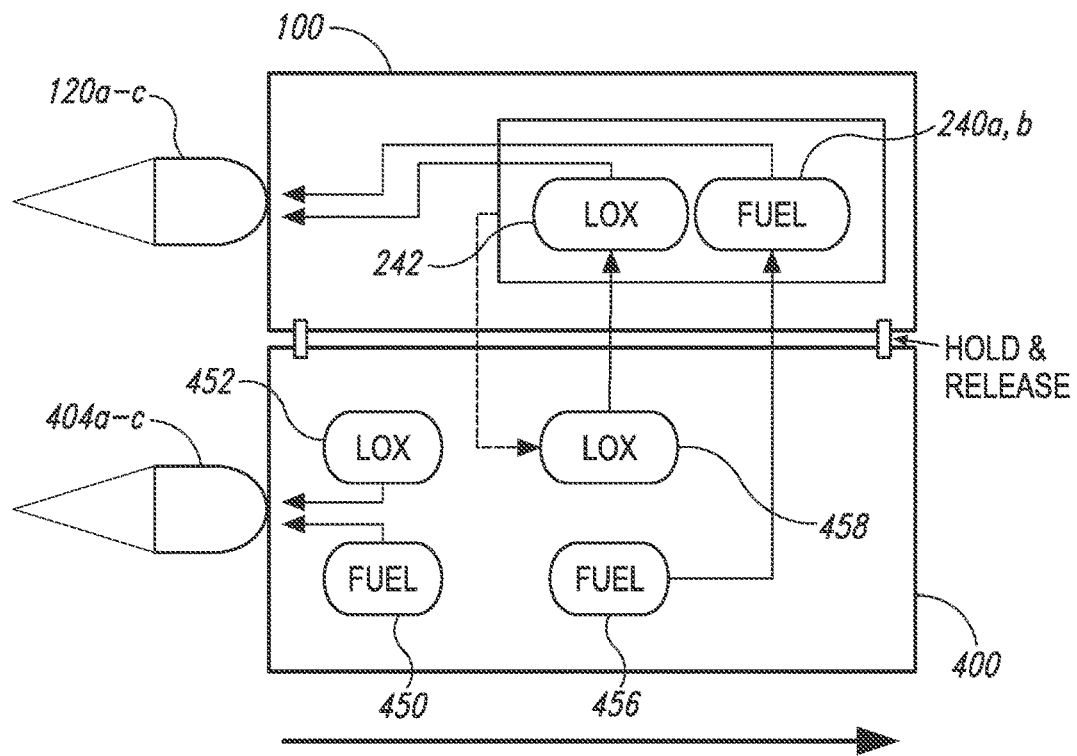

In block 1606, ground control commands the sled and vehicle engines 404a-c and 120a-c, respectively, to ignite and throttle up to 100 percent, as shown in FIG. 17B. In block 1608, all the engines 120a-c on the vehicle 100 are then set to "tripped flow" for optimal, or at least near optimal, low altitude performance. In some embodiments, setting the engines 120a-c to tripped flow changes the area ratio of the engines from, e.g., 60:1 to, e.g., 33:1. Together, the vehicle engines 120a-c and the sled engines 404a-c provide thrust to propel the sled 400 and the vehicle 100 down the launch rails 410a-c (FIG. 4A) for takeoff. In block 1610, throughout the entire sled run, the sled LOX and fuel tanks 452 and 450, respectively, feed propellants to the sled engines 404a-c, while the auxiliary LOX and fuel tanks 458 and 456, respectively, refuel the vehicle LOX and fuel tanks 242 and 240, respectively. As described above and elsewhere herein, refueling of the vehicle propellant tanks in the foregoing manner enables the vehicle 100 to lift off from the sled 400 with full, or at least approximately full, propellant tanks, thereby eliminating, or at least greatly reducing, the liftoff dry weight penalty associated with conventional space launch vehicles.

In some embodiments, the vehicle 100 is in the takeoff angle of attack position shown in FIG. 7E during the takeoff run. In other embodiments, instead of being positioned at the takeoff angle of attack during the entire takeoff run, the vehicle 100 can begin the takeoff run at a lower angle of attack (such as the position shown in FIG. 7D) to reduce drag and increase acceleration, and then the support arms 416a-c can rotate aft to increase the angle of attack of the vehicle 100 just prior to liftoff and separation from the sled 400.

Figure 17C:
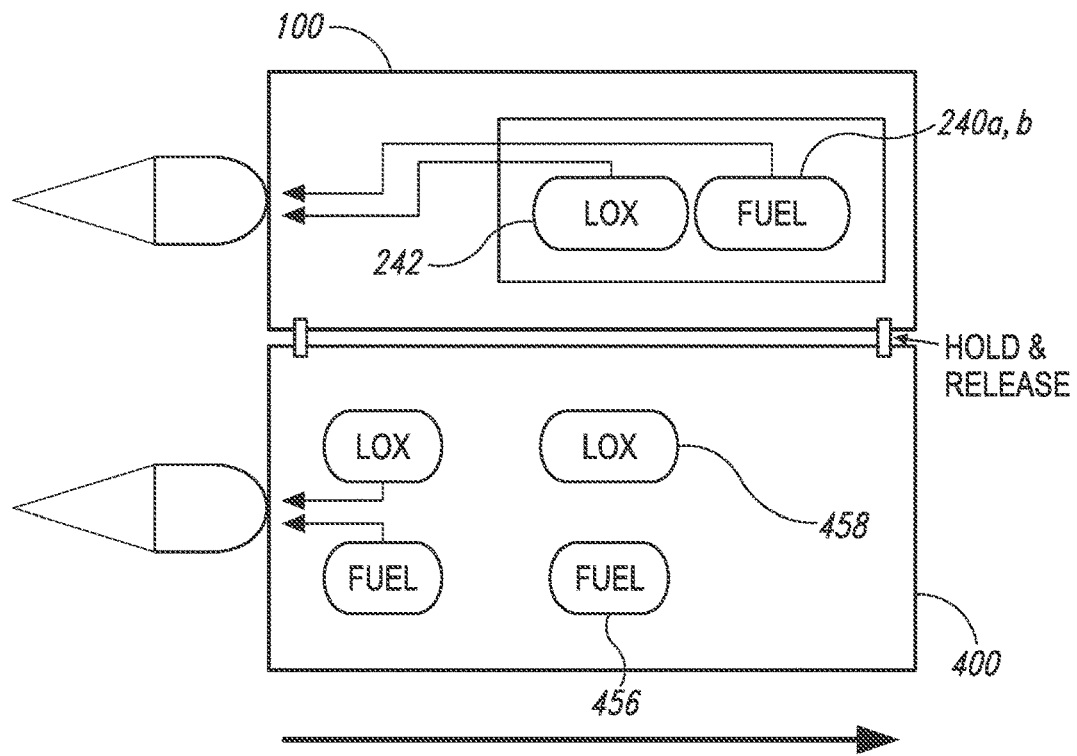

If any anomalies are detected during any part of the sled run after block 1610, the routine proceeds to block 1616 and initiates a refused takeoff sequence. Alternatively, if no anomalies are detected, the routine proceeds to block 1612 and, at or just before reaching takeoff speed, the propellant flow from the sled 400 to the vehicle 100 is stopped, the first and second propellant umbilicals 460a and 460b are disconnected and retracted from the vehicle 100, and the propellant doors 804 (FIG. 8A) on the vehicle 100 are closed, as depicted by FIG. 17C. From this point forward, the vehicle engines 120a-c are using propellant solely from the vehicle LOX and fuel tanks 252 and 240, respectively. If anomalies are detected during or after the separation process of block 1612, the routine proceeds to block 1616 and initiates the refused takeoff sequence. If not, then the routine proceeds to block 1614 and the vehicle and sled systems (e.g., the respective controllers) check their respective operating systems to confirm that safe liftoff conditions have been met.

Figure 17D:
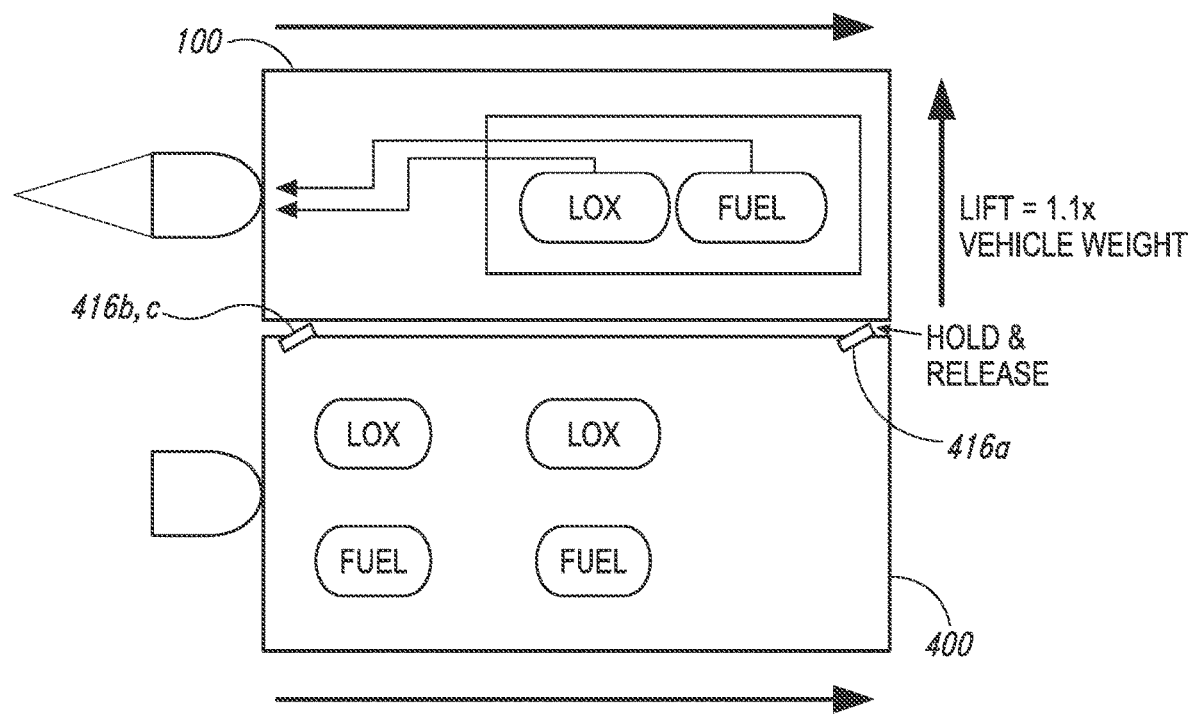

Referring next to FIG. 16B, the routine 1600b starts at block 1614 from the routine 1600a above. In block 1614, just prior to vehicle separation from the sled 400, the vehicle 100 and the sled 400 perform a number of system checks to confirm that safe liftoff conditions are met. The system checks can be run concurrently, and can include, for example, confirming that all engines on the vehicle 100 and the sled 400 are operating nominally (block 1620), all flight critical systems are operating nominally (block 1622), and the lift on the vehicle is equal to or greater than 1.1 times the gross takeoff weight of the vehicle (block 1624). If one or more of the system checks fail or are unsuccessful, the routine proceeds to block 1626 and executes the refused takeoff sequence. Conversely, if all of the system checks are successful, the routine proceeds to block 1628 and the hold and release mechanisms on the sled support arms 416a-c are commanded to release the vehicle 100 as depicted in FIG. 17D.

Referring next to FIG. 16C, the routine 1600c starts at block 1628 from the routine 1600b above. In block 1628, once the hold and release mechanisms on the sled support arms have been commanded to release the vehicle 100, the routine proceeds to block 1630 and the vehicle 100 separates and lifts off from the sled 400. In block 1632, the electrical/data umbilicals (e.g., the electrical umbilical 426 (FIG. 4A)) are detached from the vehicle interface 125 (FIG. 1E) and retracted (e.g., retracted onto the forward support arm 416a (FIG. 4A)), and in block 1634 all remaining doors (e.g., the support arm doors 802 and the electrical/propellant umbilical doors 804 (FIG. 8A)) are closed. At this time, the vehicle controller 140 can confirm that all of the electrical and propellant umbilicals have been disconnected from the vehicle 100 and all of the associated doors on the vehicle 100 have been closed. In block 1636, the sled engines 404a-c are shut down and in block 1638 the sled slows down and comes to a stop when it encounters the water barriers at the end of the sled run.

Turning next to FIG. 16D, as noted above FIG. 16D is a flow diagram of a routine 1600d for executing a refused takeoff sequence in accordance with embodiments of the present technology. In block 1640, the routine begins when anomalies are detected at any point during the sled run. In block 1642, all engines on the sled 400 and the vehicle 100 are immediately commanded to shut down, and in block 1644 all sled and vehicle systems are commanded to safe conditions. Such safe conditions can include, for example, opening tank vents on the LOX tanks on both the sled 400 and the vehicle 100. In block 1646, the sled 400 with the vehicle 100 still mounted thereon slows and safely brakes to a stop when the sled 400 encounters the water barriers at the end of the sled run.

Figure 18A:
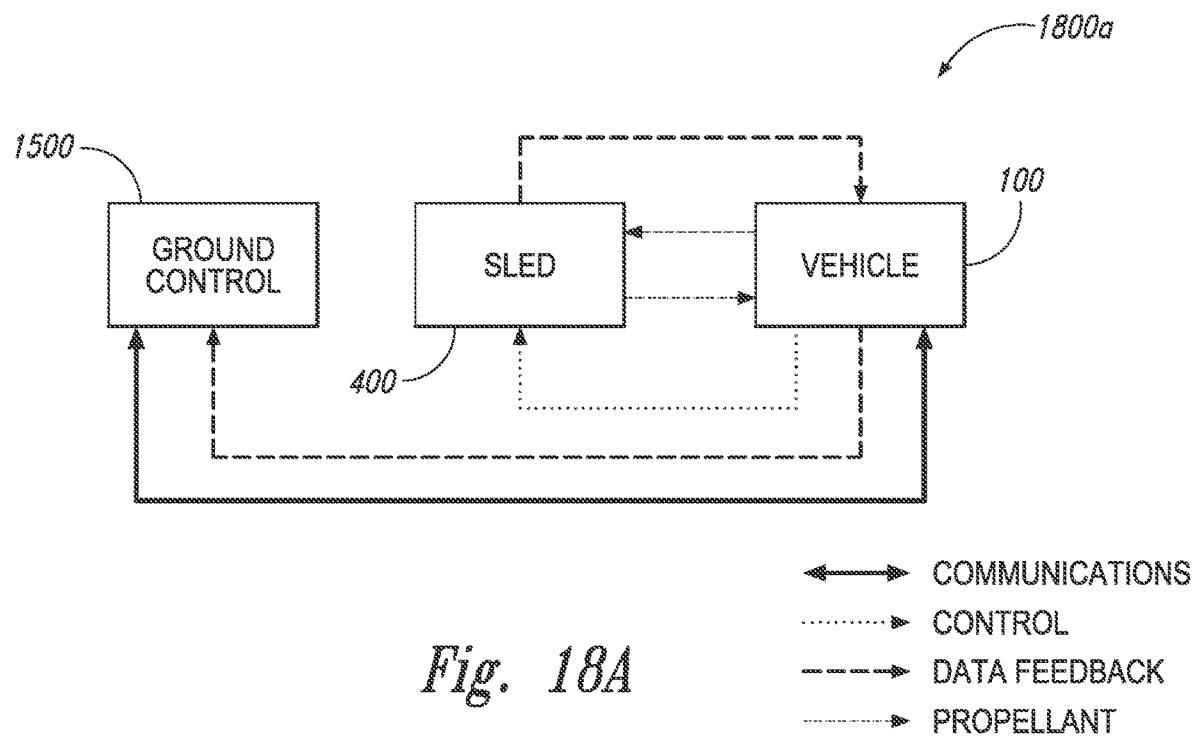
FIG. 18A is a schematic diagram of a system architecture for controlling an aerospace vehicle and a launch sled after separation from a propellant management system.
Figure 18B:
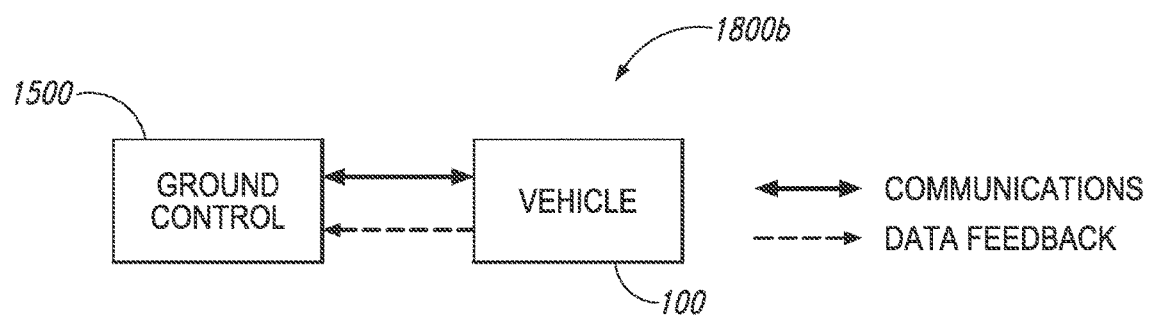
FIG. 18B is a schematic diagram of a system architecture for controlling the aerospace vehicle after liftoff from the launch sled, in accordance with embodiments of the present technology.

FIG. 18A is a schematic diagram of a suitable control system architecture 1800a for performing all or a portion of the routines 1600a, 1600b, and 1600d described above after the vehicle 100 and the sled 400 have detached from the propellant management system 1300, in accordance with embodiments of the present technology, and FIG. 18B is a schematic diagram of a suitable control system architecture 1800b for performing all or a portion of the routine 1600c after the vehicle 100 has detached from the sled 400, in accordance with embodiments of the present technology. Referring first to FIG. 18A, when the vehicle 100 and the sled 400 have disconnected from the propellant management system 1300, the vehicle 100 is in control of the sled 400 and provides both electrical power and control actuation commands to the sled 400. The sled 400 provides data feedback on the commanded controls from the vehicle 100 and on the status of the propellant as it continues flowing from the sled 400 into the vehicle 100. The vehicle 100 provides data feedback on all systems in both the sled 400 and the vehicle 100 to ground control 1500. In some embodiments, ground control 1500 is no longer able to control the vehicle 100 at this point, but both maintain constant communications (e.g., wireless communications) throughout the entire process, providing information to the other when necessary. In other embodiments, ground control 1500 can provide all, or a portion, of the control inputs for the vehicle 100 after separation from the sled 400. Accordingly, it will be understood that ground control 1500 includes suitable communications systems for wireless transmission of communications, command signals, and telemetry to and from the vehicle 100.

Turning next to FIG. 18B, once the vehicle 100 has disconnected from the sled 400, the vehicle 100 is able to provide data feedback from its onboard systems to ground control 1500, but ground control 1500 is not able to directly control the vehicle 100. Instead, vehicle guidance, navigation, control, systems management, etc. is performed by the vehicle controller 140 in accordance with flight control software and trajectory optimization code tasks, as described in greater detail below. As noted above, however, in other embodiments ground control 1500 can provide all or a portion of the control commands and/or input necessary for vehicle guidance, navigation, control, and/or systems management. Throughout the flight, ground control 1500 and the vehicle 100 can maintain constant communication, providing information to the other when necessary.

Figure 19:
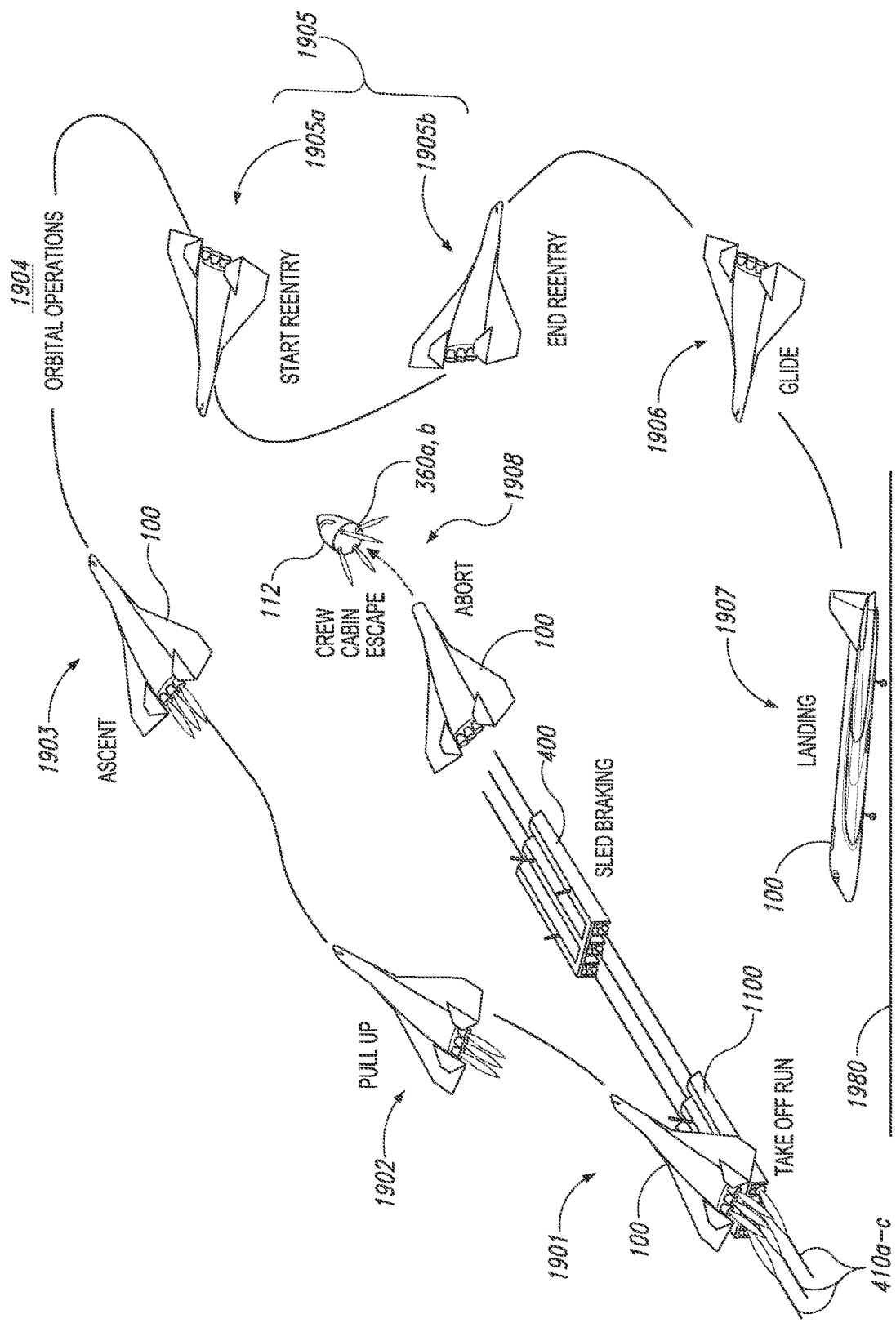
FIG. 19 is a partially schematic diagram illustrating various stages of a flight sequence of an aerospace vehicle in accordance with embodiments of the present technology.

FIG. 19 is a partially schematic diagram illustrating various phases in a flight sequence of the vehicle 100 in accordance with some embodiments of the present technology. In a takeoff phase 1901, the sled 400 is mounted to the launch rails 410a-c as described above with reference to FIG. 4A, and the vehicle 100 is mounted to the sled 400 as described above with reference to FIG. 7E. On a typical flight, the vehicle 100 may carry a payload of about 5,000-7,500 lbs. and a crew of five. Prior to takeoff, the vehicle engines 120a-c (FIG. 1A) and the sled engines for 404a-c are ignited and brought up to full thrust using propellant from the sled 400 as described above. If needed, the sled 400 can be held in place on the rails 410a-c as the engines are brought up to full thrust using a sled braking system or a hold and release mechanism. During the takeoff run, the additional thrust from the sled 400 boosts the vehicle acceleration, and the use of sled propellants instead of vehicle propellants enables the vehicle 100 to take off fully loaded with propellant. At or near takeoff speed, the electrical and propellant umbilicals disconnect from the vehicle 100 and the vehicle 100 releases from the support arms 416a-c and enters a pull up phase 1902.

In some embodiments, the vehicle 100 can achieve a takeoff speed of from about 400 mph to about 500 mph, or about 436 mph (0.7 Mach), in about 20 seconds after traveling down the rails 410a-c a distance of from about 4,500 ft. to about 6,000 ft., or about 5,182 ft. In some embodiments, the vehicle 100 and crew may experience relatively low dynamic forces during takeoff, with maximum accelerations ranging from about 1 g to about 2 g's, or about 1.42 g's. The foregoing launch parameters are illustrative of some embodiments of the present technology. In other embodiments, the vehicle 100 can achieve different takeoff speeds in different takeoff run distances, and resulting in different maximum acceleration levels, without departing from the present disclosure.

As described above with reference to FIG. 4A, the sled 400 can include a braking system 455. In some embodiments, the braking system 455 can enable the sled 400 to decelerate, with the vehicle 100 attached to the sled 400, from the takeoff speed to zero in a distance of from about 3,000 ft. to about 3,500 ft., or about 3,200 ft., resulting in a maximum deceleration of from about 1 g to about 3 g's, or about 2 g's. This sled braking feature can enable the sled 400 to perform a refused takeoff at any point prior to takeoff if necessary for mission safety.

After the vehicle 100 lifts off from the sled 400, the vehicle flight path is controlled by operation of the aerodynamic control surfaces described above with reference to FIG. 1A and/or gimballing the engines 120a-c. The pull up phase 1902 can be relatively gentle and permit a low velocity turn to a target azimuth that provides orbital inclination flexibility. In some embodiments, the maximum accelerations the vehicle 100 experiences during the pull up phase 1902 can be from about 1.2 g's to about 2 g's, or about 1.7 g's. After the pull up phase 1902, the vehicle 100 enters an ascent phase 1903 in which the vehicle may be limited to maximum accelerations of, for example, about 3 g's to maintain crew/passenger comfort. Vehicle directional control during all or a portion of the ascent phase can be provided, or at least supplemented, by engine thrust vector control and/or engine gimbaling. During the ascent phase 1903, the vehicle can experience a maximum dynamic pressure (max Q) of from about 1,000 psf to about 1,100 psf, or about 1,080 psf. In some embodiments, at the end of the ascent phase 1903 the vehicle 100 will be traveling at a speed of from about 15,000 mph to about 20,000 mph, or about 17,560 mph or more, and the vehicle will be at an altitude of from about 275,000 ft. to about 325,000 ft., or about 300,000 ft. or more.

Figure 20:
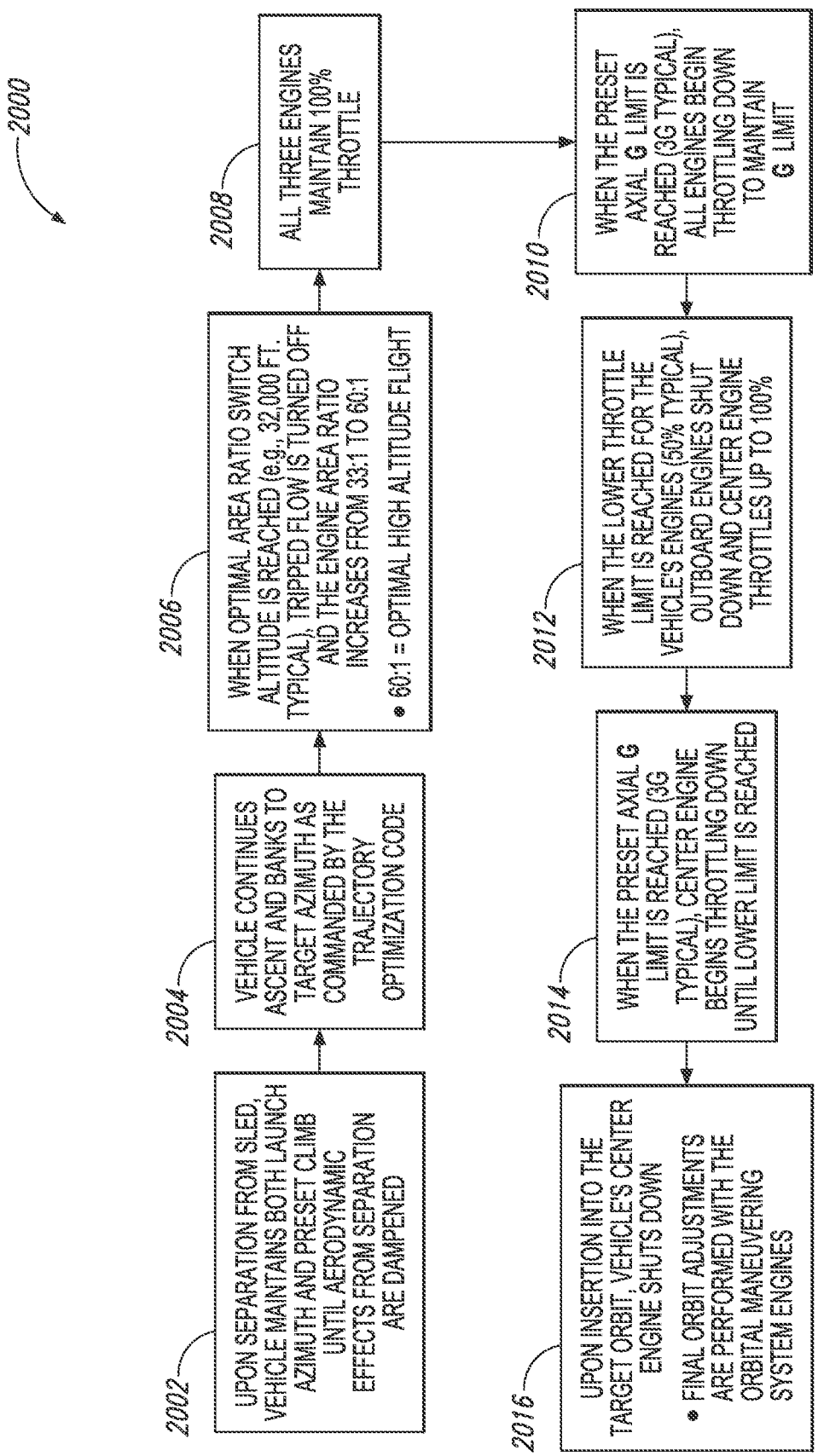
FIG. 20 is a flow diagram of a routine for performing an ascent of an aerospace vehicle in accordance with embodiments of the present technology.

Turning next to FIG. 20, this Figure is a flow diagram of a routine 2000 for performing an ascent sequence of the vehicle 100 in accordance with embodiments of the present technology. Upon separation from the sled 400 in block 2002, the vehicle 100 maintains both the launch azimuth and a preset rate of climb until the aerodynamic effects from separation are dampened. In block 2004, the vehicle continues the ascent and banks to the target azimuth as commanded by the vehicle controller 140 (FIG. 1A) in accordance with flight control software executing a trajectory optimization code. In block 2006, when the optimal altitude has been reached for changing the area ratio of the nozzles of the engines 120a-c (e.g., typically about 32,000 ft.), the tripped flow is turned off and the engine area ratio is increased from, e.g., about 33:1 to, e.g., about 60:1. In some embodiments, an area ratio of 60:1, or at least approximately 60:1, can provide optimal, or near optimal, high altitude flight performance of the vehicle engines 120a-c.

In block 2008, all three of the engines 120a-c maintain 100 percent throttle until, in block 2010, a preset axial acceleration limit is reached. In some embodiments, the preset axial acceleration limit can be 3 g's. In other embodiments, other preset axial acceleration limits can be used that are higher or lower than 3 g's. Once the axial acceleration limit has been reached, all the engines 120a-c begin throttling down to maintain the axial acceleration at or below the limit. When the lower throttle limit is reached on the engines 120a-c (typically about 50 percent throttle), the outboard engines 120a and 120c are shut down, and the center engine 120b (FIG. 1A) is throttled up to 100 percent. In block 2014, when the preset axial acceleration limit is again reached, the center engine 120b begins throttling down until it reaches its lower throttle limit (e.g., about 50 percent). In block 2020, upon vehicle insertion into the target orbit, the vehicle center engine 120b shuts down. Final adjustments to the orbit of the vehicle 100 can then be performed using the OMS engines 122a, b (FIG. 1A).

As noted above, all or a portion of the vehicle trajectory and control during the ascent sequence of FIG. 20, and/or other portions of the flight of the vehicle 100, can be controlled by the vehicle controller 140 in response to execution by the processer 142 of computer-readable instructions stored on non-volatile memory 144 (FIG. 1A). The computer-readable instructions executed by the processor 142 can include flight control software and trajectory optimization code. In some embodiments, the trajectory optimization code can include tasks for flight profile optimization and engine management. For example, in some embodiments the trajectory optimization code tasks can include optimizing the vehicle angle of attack profile and the vehicle bank angle profile to achieve the desired ascent trajectory. Additionally, in some embodiments the code tasks can also include optimizing engine control to determine, for example, when to throttle down the engines, shut off the outboard engines, change the engine area ratios, etc. The trajectory optimization code tasks can also include maintaining flight path constraints. For example, in some embodiments this can include maintaining normal acceleration (i.e., acceleration along an axis perpendicular to the longitudinal axis of the vehicle and extending from the bottom of the vehicle to the top of the vehicle) at less than or equal to 2.5 g's, maintaining axial acceleration at less than or equal to 3 g's, and maintaining vehicle dynamic pressure at less than or equal to 1,200 psf. The foregoing flight path constraints are examples of some suitable constraints for some embodiments of the present technology. Accordingly, other embodiments can utilize other flight path constraints. In addition to the foregoing, the trajectory optimization code tasks can further include targeting the desired final conditions upon insertion into the target orbit. Such conditions can include, for example, maximizing the final vehicle weight and achieving preset orbital targets. In some embodiments, the preset targets can include a perigee altitude of 50 nautical miles, an apogee altitude of 100 nautical miles, and an orbital inclination of 51.6 degrees. The foregoing orbital parameters are provided by way of example, and in other embodiments the trajectory optimization code can be tasked with achieving other final conditions, orbits, etc.

Returning now to FIG. 19, in an orbital phase 1904 the vehicle 100 can engage in various orbital operations including, for example, transfer of crew and/or cargo to on-orbit stations. Typical missions on orbit could be from about 3 to 5 days. Once orbital operations are complete, the vehicle 100 can move to a tail-first orientation using the RCS thrusters 136 described above with reference to FIGS. 1D and 1E. Next, the vehicle 100 can ignite the OMS engines 122a, b (FIG. 1A) to reduce orbital speed and deorbit, thereby entering a reentry phase 1905 in which the vehicle 100 descends through the Earth's atmosphere. In some embodiments, the vehicle 100 can have a weight of about 60,000 lbs. and be at an altitude of about 400,000 ft. at a reentry start point 1905a. In some embodiments, the angle of attack and the bank angle of the vehicle 100 can be optimized during reentry so that the vehicle 100 will be at an altitude of about 50,000 ft. and travelling at a speed of about 0.6 Mach at a reentry end point 1905b that is about 3,000 nautical miles from the reentry start point 1905a. Accelerations during the reentry phase 1905 are relatively low and can range from a maximum acceleration of from about 1.5 g's to about 2.5 g's. During a final glide phase 1906 and subsequent landing phase 1907, the vehicle speed and descent rate can be at least generally similar to the speed and descent of a conventional commercial jet aircraft. For example, in some embodiments the vehicle 100 can land at a speed of from about 120 mph to about 160 mph, or about 140 mph, and at a sink rate of about 10 feet per second. Additionally, the vehicle 100 can land on a standard runway 1580. Although the foregoing reentry and landing parameters of some embodiments are provided herein by way of example, in other embodiments the vehicle 100 and missions thereof can have other reentry and landing parameters.

In the event the vehicle 100 lands at a runway that does not have a suitable launch sled, the vehicle 100 can be moved to a runway that does have a launch sled using a number of different methods. For example, in some embodiments the vehicle can be towed through the air to a new runway by a tow aircraft. In other embodiments, the vehicle 100 can include provisions for jet engines that can be temporarily installed on the wings 104a, b (FIG. 1A) to enable the vehicle 100 to fly to the new runway under its own power.

If an irrecoverable emergency arises during any phase of flight, the vehicle 100 can execute an abort phase 1908. In the abort phase 1908, the crew cabin 112 separates from the rest of the vehicle 100 as described above with reference to FIG. 3A. Immediately after separation, the high-power escape thrusters 360a, b propel the crew cabin 112 safely away from the rest of the vehicle 100, and the recovery chute 364 is deployed so that the crew cabin 112 can descend to a safe landing. The emergency parachute landing system is configured to bring the crew cabin 112 down safely on land or in water, and the cabin 112 has provisions that permit crew survival for an extended period of time if rescue is delayed.

Figure 21:
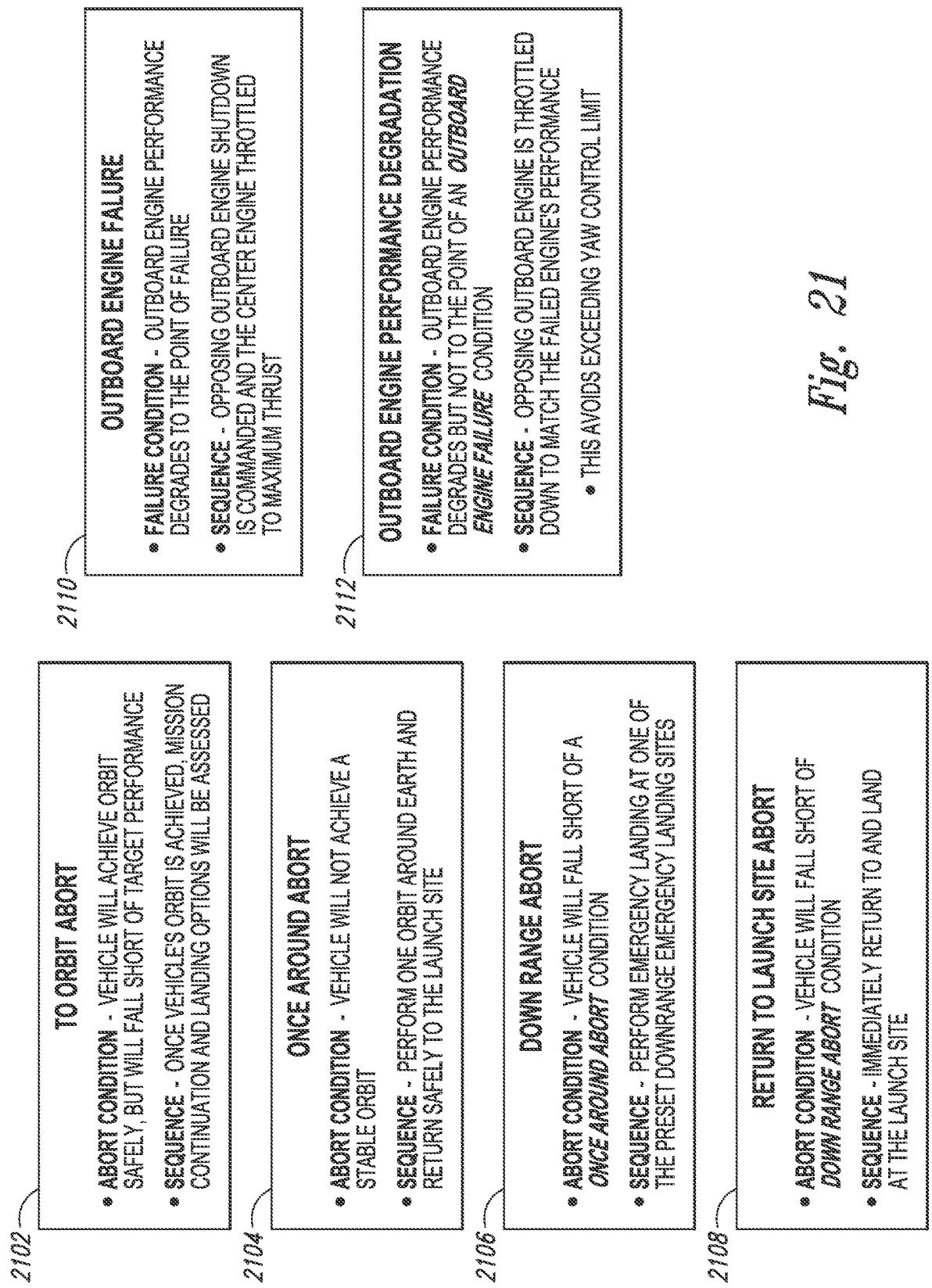
FIG. 21 is a chart listing example types of mission aborts and engine failures/degradations that an aerospace vehicle could experience, in accordance with embodiments of the present technology.

FIG. 21 is a chart listing example types of mission aborts and engine failures/degradations that the vehicle 100 could experience, in accordance with embodiments of the present technology. In some embodiments, there are four main types of mission aborts and two main types of engine failures. The least impactful of the aborts is a "To Orbit Abort" 2102. This abort condition arises when the vehicle 100 will achieve orbit safely but will fall short of target performance. To successfully abort the mission under this condition, the vehicle 100 will continue the mission until orbit is achieved, and then mission continuation and landing options will be assessed. A slightly more impactful abort is a "Once Around Abort" 2104. This abort condition arises when the vehicle 100 will not achieve a stable orbit. To abort this condition, the vehicle 100 will perform one orbit around the Earth and return safely to the launch site. The second most impactful abort is a "Down Range Abort" 2106. This abort condition arises when the vehicle 100 is unable to perform one orbit around the Earth as required by the Once Around Abort 2104. This abort sequence calls for the vehicle 100 to perform an emergency landing at one of a preset downrange emergency landing sites (e.g., a landing strip or runway). The most impactful abort is a "Return to Launch Site Abort" 2108. This abort condition arises when the vehicle performance falls short of the conditions for the Down Range Abort 2106. In a Return to Launch Site Abort, the vehicle 100 will immediately return to and land at the launch site. In some embodiments, the propellant tanks on the vehicle 100 can include one or more drain valves configured to rapidly discharge the propellant from the tanks prior to landing to ensure that the vehicle 100 lands with empty, or near empty propellant tanks during an abort. Landing with empty, or near empty propellant tanks enables the landing gear 126a-c to be substantially lighter than would otherwise be required for landing the vehicle 100 with full, or near full propellant tanks.

In some embodiments, the most impactful of the engine failures is an "Outboard Engine Failure" 2110 resulting from the performance of one or both of the outboard engines 120a, c (FIG. 1A) degrading to the point of failure. To address this issue, the vehicle 100 executes a sequence that commands both the outboard engines 120a, c to shut down and the center engine 120b to increase throttle to maximum thrust. The least impactful of these failures is an "Outboard Engine Performance Degradation" 2112. This failure condition is due to the performance of one of the outboard engines 120a or 120c degrading, but not to the point of the outboard engine failure condition 2110. To address this issue, the vehicle 100 executes a sequence that commands the opposing outboard engine to throttle down to match the failed engine's performance. Throttling the opposing engine in this manner balances the thrust from the outboard engines 120a, c and avoids exceeding the yaw control limit of the vehicle 100.

Figure 22:
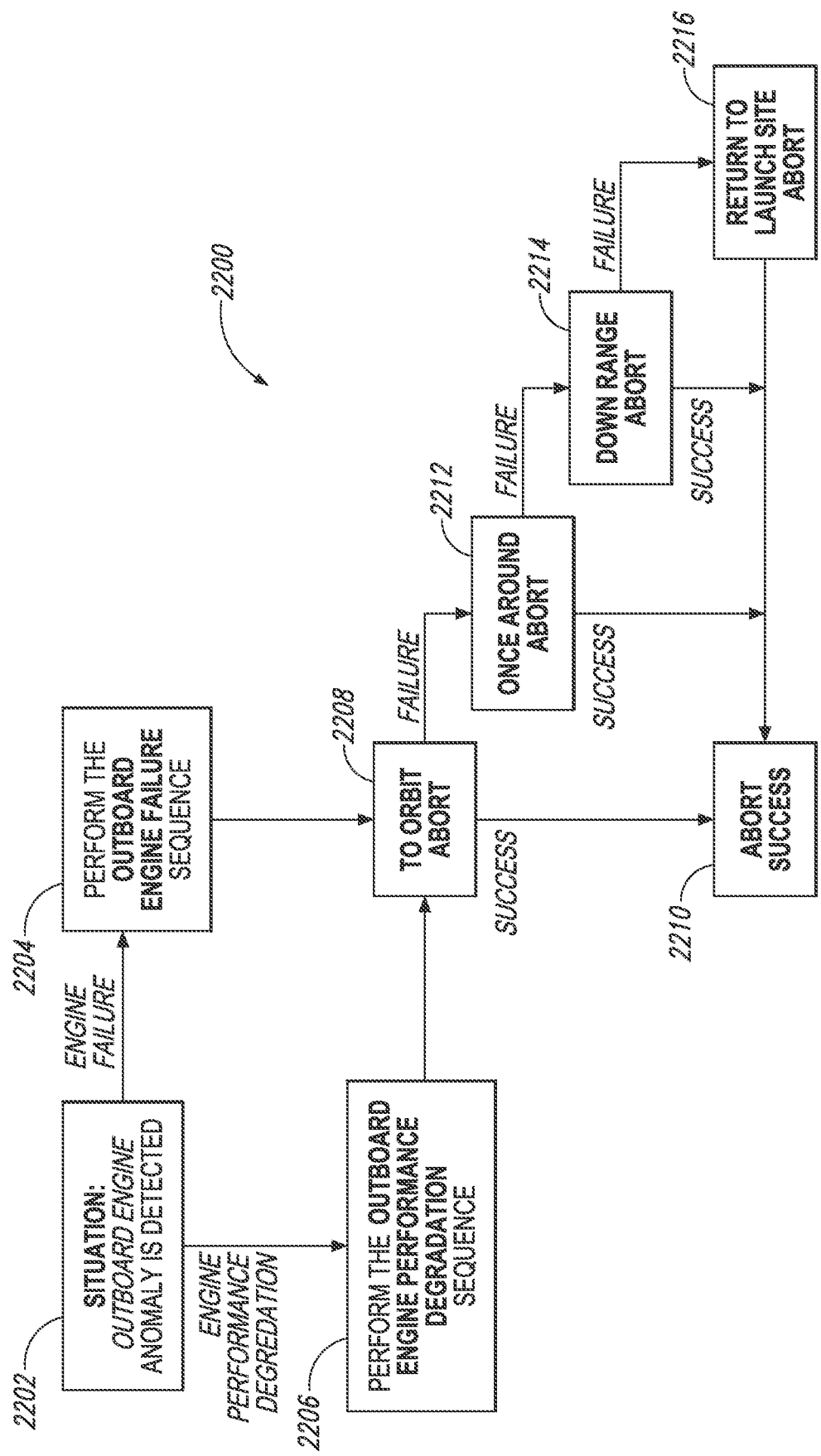
FIG. 22 is a flow diagram of a routine for responding to an engine anomaly after liftoff of an aerospace vehicle in accordance with embodiments of the present technology.

FIG. 22 is a flow diagram of a routine 2200 for executing an outboard engine anomaly abort sequence, in accordance with embodiments of the present technology. In block 2202, the routine starts when an anomaly in performance of one of the outboard engines 120a, c (FIG. 1A) is detected. If the anomaly is an engine failure, then the routine proceeds to block 2204 and performs the outboard engine failure sequence described above with reference to FIG. 21. Conversely, if an engine performance degradation is detected in one of the outboard engines, then the routine proceeds to block 2206 and performs the outboard engine performance degradation sequence described above with reference to FIG. 21. In either situation, after execution of the appropriate sequence, the routine proceeds to block 2208. In block 2208, the vehicle initiates the To Orbit Abort sequence 2102 of FIG. 21 and, if the To Orbit Abort condition is met (e.g., the vehicle will achieve orbit safely, but will fall short of target performance), then the routine proceeds to block 2210 and the vehicle 100 executes the To Orbit Abort sequence outlined in FIG. 21 (success). Conversely, if the To Orbit Abort condition is not met (failure), then the routine proceeds to block 2212. In block 2212, the vehicle initiates the Once Around About sequence 2104 of FIG. 21 and, if the Once Around Abort condition is met, then the vehicle 100 executes the appropriate abort sequence (e.g., perform one orbit around Earth and return safely to the launch site) (success). If the Once Around Abort condition is not met (failure), then the routine proceeds to block 2214. In block 2214, the vehicle initiates the Down Range Abort sequence 2106 of FIG. 21 and, if the Down Range Abort condition is met, then the vehicle 100 executes the appropriate abort sequence (success). Conversely, if the Down Range Abort condition is not met (failure), then the routine proceeds to block 2216 and performs the Return to Launch Site Abort sequence 2108 of FIG. 21 and executes the appropriate abort sequence (e.g., immediately return to and land at the launch site).

The flow diagram of FIG. 22 and the other flow diagrams described herein depict processes used in some embodiments of the present technology. These flow diagrams may not show all functions or exchanges of data, but instead they provide an understanding of commands, data, and/or information exchanged under some embodiments of the systems. Those of ordinary skill in the relevant art will recognize that some functions or exchange of commands and data may be repeated, varied, omitted, or supplemented, and other (less important) aspects not shown in the flow diagrams may be readily implemented. Each of the steps depicted in the flow diagrams described herein can itself include a sequence of operations that need not be described herein. Those of ordinary skill in the art can create source code, microcode, program logic arrays, etc. or otherwise implement the disclosed technology based on the flow diagrams and the Detailed Description provided herein. Such routines are preferably stored in non-volatile memory, e.g., the memory 144 that forms part of the vehicle controller 140 (FIG. 1A).

Figure 23A:
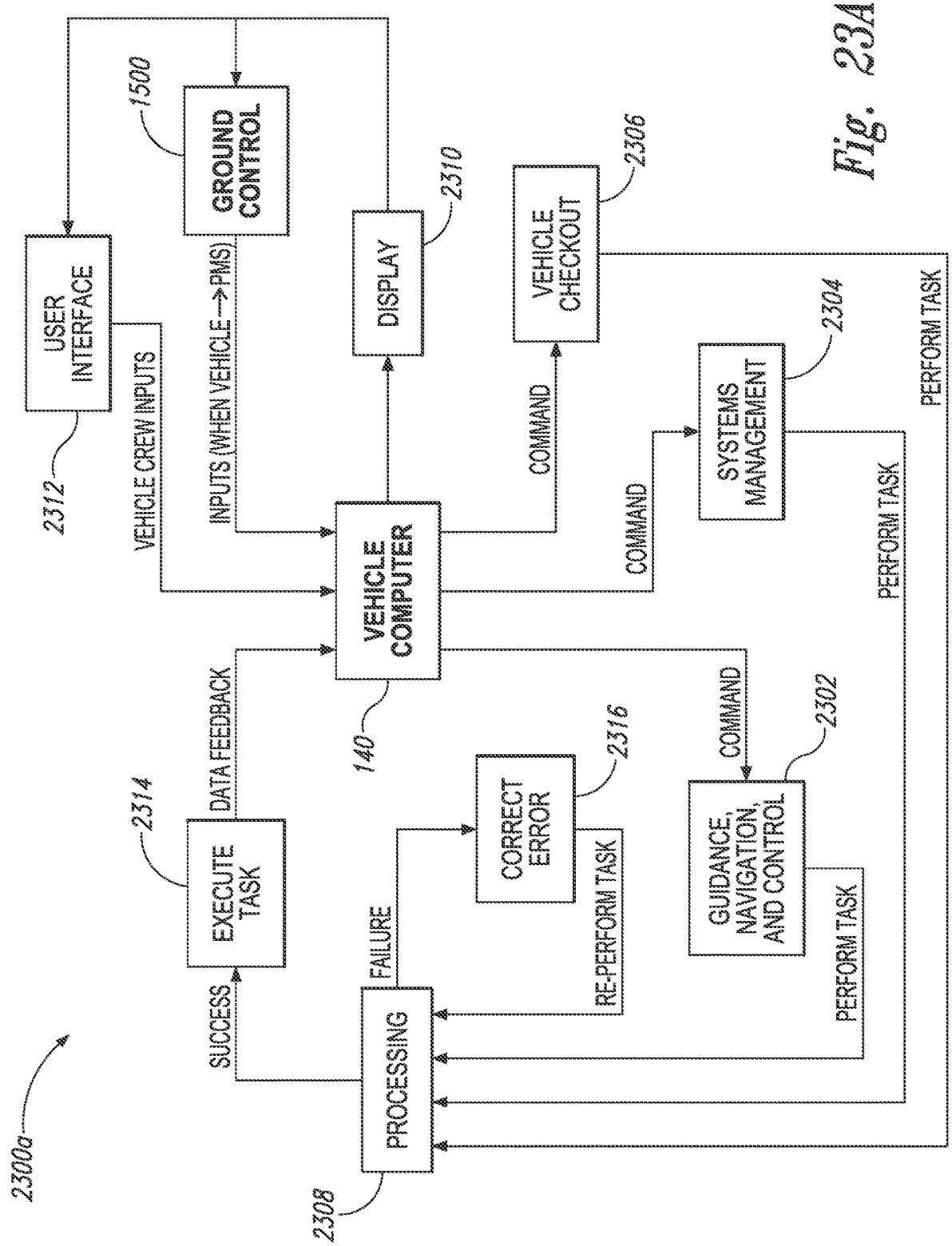
FIG. 23A is a schematic diagram of a control system for an aerospace vehicle.

FIG. 23A is a block diagram of a suitable computing environment 2300a in which the vehicle controller 140 can implement the various sequences and routines described in detail above. In the illustrated embodiment, the vehicle 100 includes a display 2310 and a user interface 2312 which are operably connected to the controller 140. The display 2310 can include one or more conventional display devices (e.g., LCD displays, LED displays, etc.) for providing textual, graphical, and other information to users (e.g., vehicle crew). The user interface 2312 can include any suitable user interface devices and tools including, for example, touchscreens, keyboards, keypads, joy sticks, graphical user interfaces, etc. In one aspect of the present technology, the vehicle controller 140 can include or access a number of on-board software applications. For example, in the illustrated embodiment the environment 2300a includes a guidance, navigation, and control (GNC) application 2302, a systems management (SM) application 2304, and a vehicle check out (VCO) application 2306. The GNC application 2302 is configured to determine flight parameters, such as the position, velocity, and attitude of the vehicle 100 during flight. The GNC application 2302 also receives and manages various outputs from vehicle sensors (e.g., airspeed sensors, altitude sensors, acceleration sensors, pressure sensors, temperature sensors, etc.) and displays the output values to the vehicle crew via the display 2310 and to ground control 1500 via one or more associated displays. In addition, the GNC application 2302 also manages the majority of subsystems aboard the vehicle, such as the avionic subsystems, throughout the entirety of the vehicle flight from after sled separation to vehicle landing. The SM application 2304 manages and controls the remainder of the vehicle subsystems that are not controlled by the GNC application 2302, such as the payload subsystems, etc. Additionally, the SM application 2304 is also configured to identify anomalies/errors mid-flight and display them to both the vehicle crew and the ground control crew. The VCO application 2306 manages and controls all subsystems (e.g., the avionics subsystems) during their initialization process (which can occur during the vehicle propellant loading sequence described above). The VCO application 2306 also performs all of the ground and in-flight checkouts for the vehicle systems and subsystems including, for example, determining if safe separation conditions are met, if engine performance conditions are met, etc. The VCO application 2306 also processes ground control commands when the vehicle is connected to the propellant management system 1300 (FIG. 13). The vehicle controller 140 can receive inputs from the vehicle crew via the user interface 2312, from ground control when the vehicle is attached to the propellant management system 1300, and through data feedback from the GNC application 2302, the SM application 2304, and/or the VCO application 2306.

By way of an example implementation of the environment 2300a, the vehicle controller 140 utilizes the GNC application 2302, the SM application 2304, and the VCO application 2306 to perform and execute the mission tasks for the vehicle 100 as described in detail above. The system applications 2302, 2304 and 2306 process these tasks (2308) and, when the processing is successful, a task is executed (2314) and data feedback is sent back to the vehicle controller 140. Conversely, when the processing results in a failure, the task is corrected (2316) and reperformed until successful. The data feedback can be displayed on both the vehicle user interface 2312 or display 2320, as well as one or more user interfaces associated with ground control 1500.

Figure 23B:
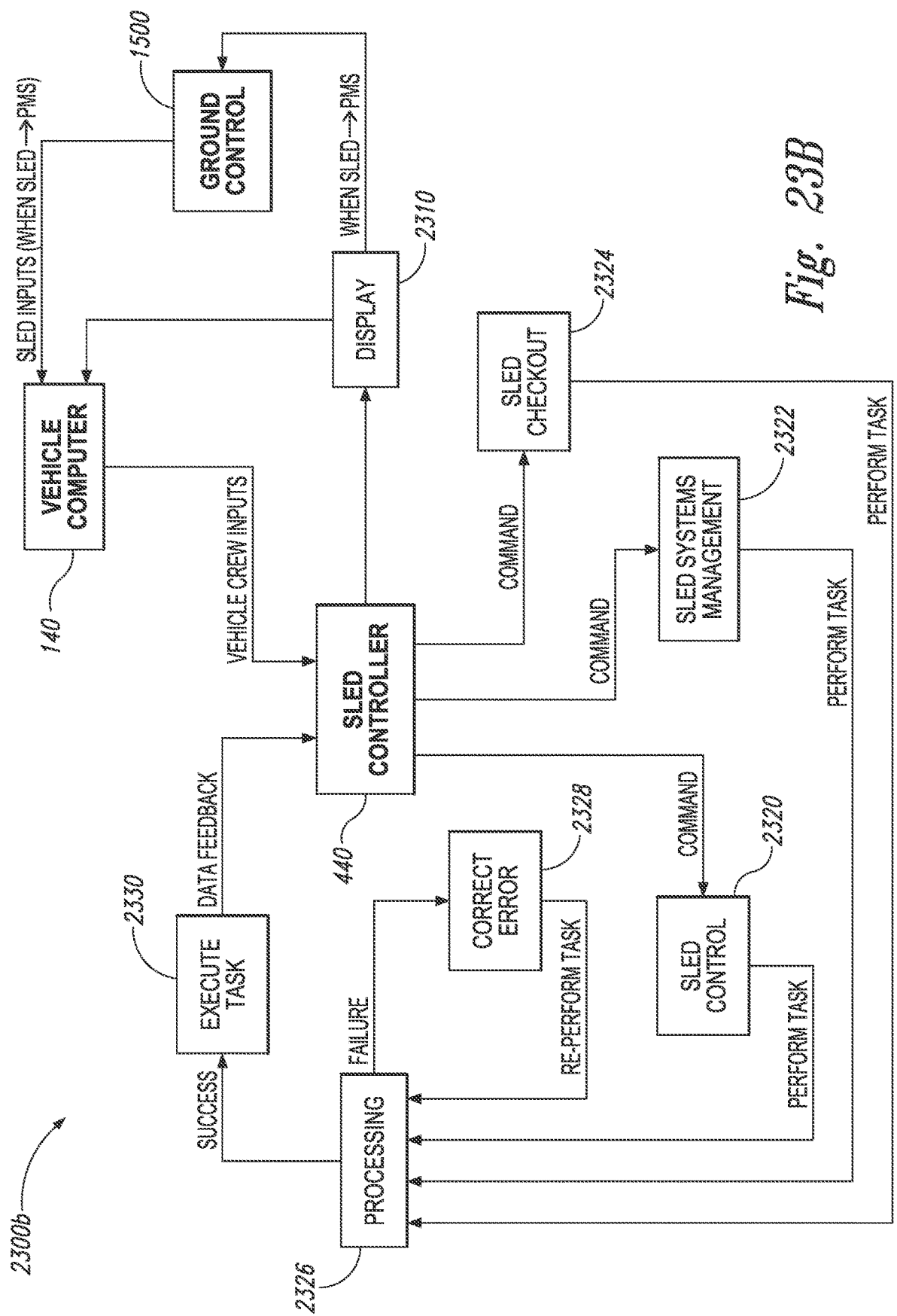
FIG. 23B is a schematic diagram of a control system for a launch sled, configured in accordance with embodiments of the present technology.

FIG. 23B is a block diagram of a suitable computing environment 2300b in which the sled controller 440 can implement one or more of the sled routines described in detail above. In the illustrated embodiment, the sled controller 440 includes and/or accesses a number of software applications, including, e.g., a sled control (SC) application 2320, a sled systems management (SSM) application 2322, and a sled checkout (SCO) application 2324. In operation, the sled controller 440 receives inputs from the vehicle crew via the vehicle controller 140. The sled controller 440 can also receive inputs from ground control 1500 via the vehicle controller 140 when the vehicle 100 is attached to the propellant management system 1300 (FIG. 13). The sled controller 440 can also receive data feedback from the SC application 2320, the SSM application 2322, and the SCO application 2324. The sled controller 440 uses the three software applications to perform specific tasks in accordance with input and commands received from the vehicle computer 140 and/or ground control 1500. Such tasks can include, for example, igniting the sled engines 404a-c, moving the support arms 416a-c, controlling sled propellant flow, etc. These tasks are processed (2326) and, if the processing is successful, the tasks are executed (2330) and feedback data is sent back to the sled controller 440. Alternatively, if the task processing results in a failure, the task is corrected (2328) and reperformed until it has been successfully executed. Data feedback to the sled controller 440 can also be sent to the vehicle controller 140 and displayed to both the vehicle crew (via, e.g., the display 2310) and ground control 1500 when the sled 400 is attached to the propellant management system 1300.

Figures 24A, 24B:
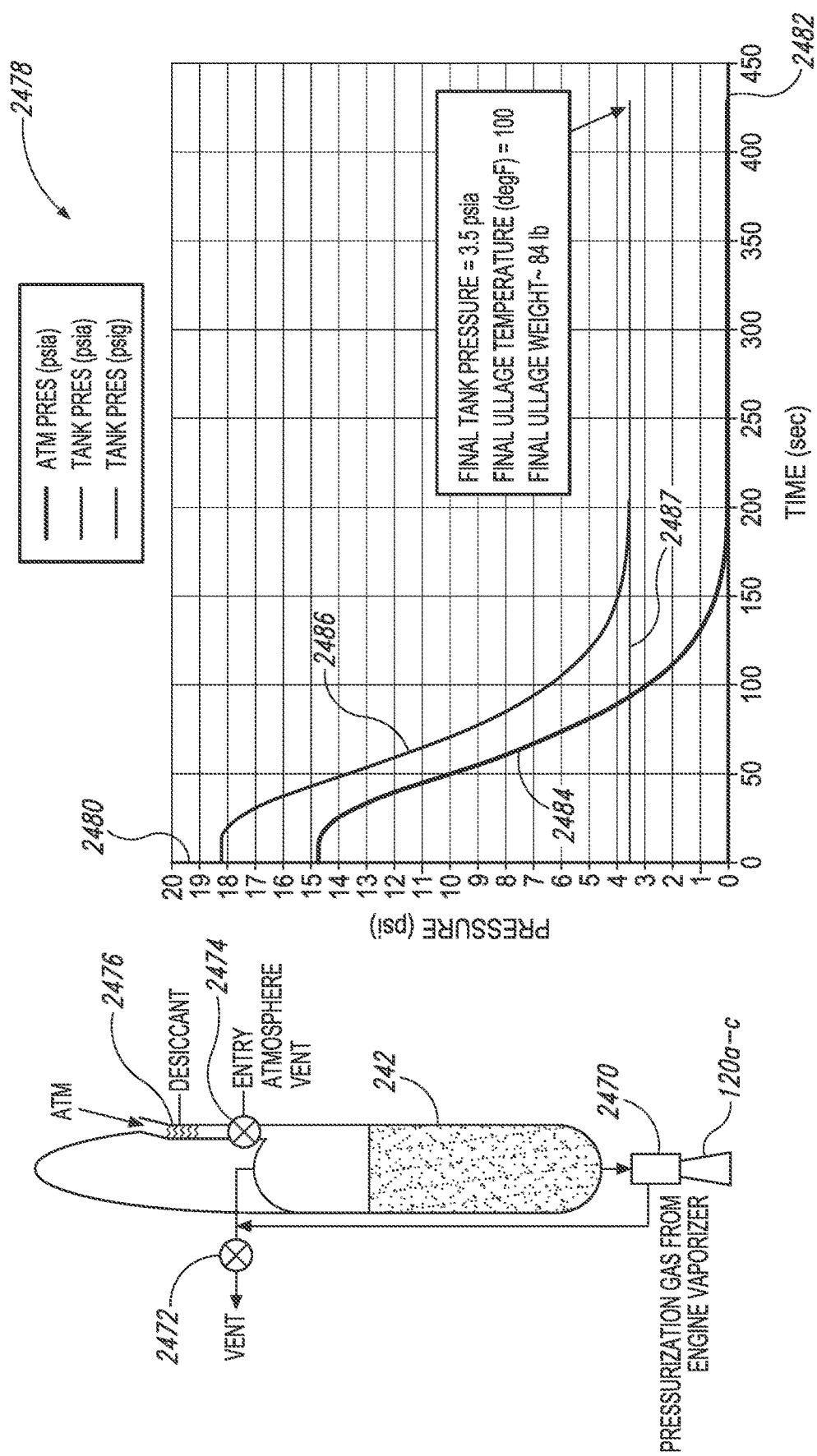
FIG. 24A is a partially schematic diagram of an oxidizer tank configured in accordance with embodiments of the present technology.
FIG. 24B presents a graph of various pressures versus time for the oxidizer tank and its environment.

FIG. 24A is a schematic diagram of the vehicle LOX tank 242 (FIG. 2), and FIG. 24B is a graph illustrating various pressures associated with the LOX tank 242 as a function of time, in accordance with embodiments of the present technology. Oxygen is gaseous during normal vehicle operating conditions and liquid at temperatures below its Normal Boiling Point (NPB) of −182.96 degrees C. Since oxygen boils at such a low temperature, it has a high vapor pressure at normal vehicle operating conditions and is typically kept in heavy, round tanks capable of withstanding relatively high pressures (e.g., pressures over 20 psig) in conventional launch vehicles. In one aspect of the present technology, however, the LOX in the vehicle 100 is subcooled to a temperature of, e.g., −195.79 degrees C., or about −196 degrees C., to reduce the vapor pressure to less than 4 psig (e.g., 2-3 psig) across the walls of the LOX tank 242. As a result of this relatively low pressure, the fuselage/wing LOX tank 242 of the vehicle 100 can be shaped for aerodynamic efficiency and designed to support flight loads, without requiring a rounded, pressure stabilized design as typically found in conventional launch vehicle LOX tanks. This feature also enables the use of lightweight composite materials, which lowers the structural tank weight, and provides a higher LOX load than NPB LOX because the LOX density increases with the lower temperature. The increased LOX load improves vehicle performance by increasing the amount of propellant that can be loaded into a given tank volume, improving the mass fraction of the flight vehicle 100.

Referring to FIG. 24A, in the illustrated embodiment the LOX tank 242 can be vented outward through a first relief valve 2472 during vehicle ascent. Additionally, the LOX tank 242 can also include a second relief valve 2474 that enables the LOX tank 242 to vent inward from the atmosphere to prevent negative pressure tank collapse on reentry. Desiccant canisters 2476 can be installed at the vent inlet to prevent ingestion of moisture during ground operations. During ground operations, the LOX will be stored in the LOX tank 242 at the lowest vapor pressure possible (or approaching the lowest vapor pressure possible), resulting in a pressure differential across the tank walls of less than 3 psig. During engine operation, the LOX tank 242 can receive pressurization gas from a heat exchanger 2470 coupled to one or more of the main engines 120a-c. A boost pump (not shown in FIG. 24A) can be used to increase the LOX pressure to, for example, about 40 psia to meet inlet conditions for the turbo pumps associated with the engines 120a-c.

Before takeoff, the LOX tank 242 can be filled and pressurized using ground-based sources of subcooled LOX (e.g., the propellant management system 1300 of FIG. 13). By way of example, in some embodiments the LOX tank 242 can receive LOX at a temperature of about −196 degrees C. (i.e., about −320 degrees F.) from a LOX densification unit. During engine operation, pressure can be maintained in the LOX tank 242 by adding vaporized propellant gasses supplied by the heat exchanger 2470 on the main engine 120. In some embodiments, the pressure differential across the tank walls will be maintained in a range from about 2 to 3.5 psig during ascent to prevent boiling of the LOX, and to maintain tank pressure above local ambient (i.e., 14.7 psia or less) to prevent tank buckling due to a negative pressure differential. During ascent and on orbit, residual ullage gasses vent through the first relief valve 2472. During reentry, the LOX tank 242 vents to the atmosphere via the second relief valve 2474 to prevent negative pressure tank collapse.

Operation of the LOX tank 242 as described above is reflected by the graph 2478 shown in FIG. 24B. In the graph 2478, pressure in psi is measured along a vertical axis 2480, and time in seconds is measured along a horizontal axis 2482. A first plot line 2484 illustrates the atmospheric pressure during the ascent phase of flight, a second plot line 2486 illustrates tank internal pressure (absolute pressure) during this phase of flight, and a third plot line 2487 illustrates tank differential pressure during this phase of flight. As the first plot line 2484 illustrates, the atmospheric pressure drops from about 14.7 psia at launch to essentially zero during ascent. As shown by the second plot line 2486, the tank internal pressure follows this curve relatively closely to maintain a positive pressure differential of about 3.5 psig at all times during the launch and ascent phases of flight, as shown by the third plot line 2487.

Figures 25A, 25B:
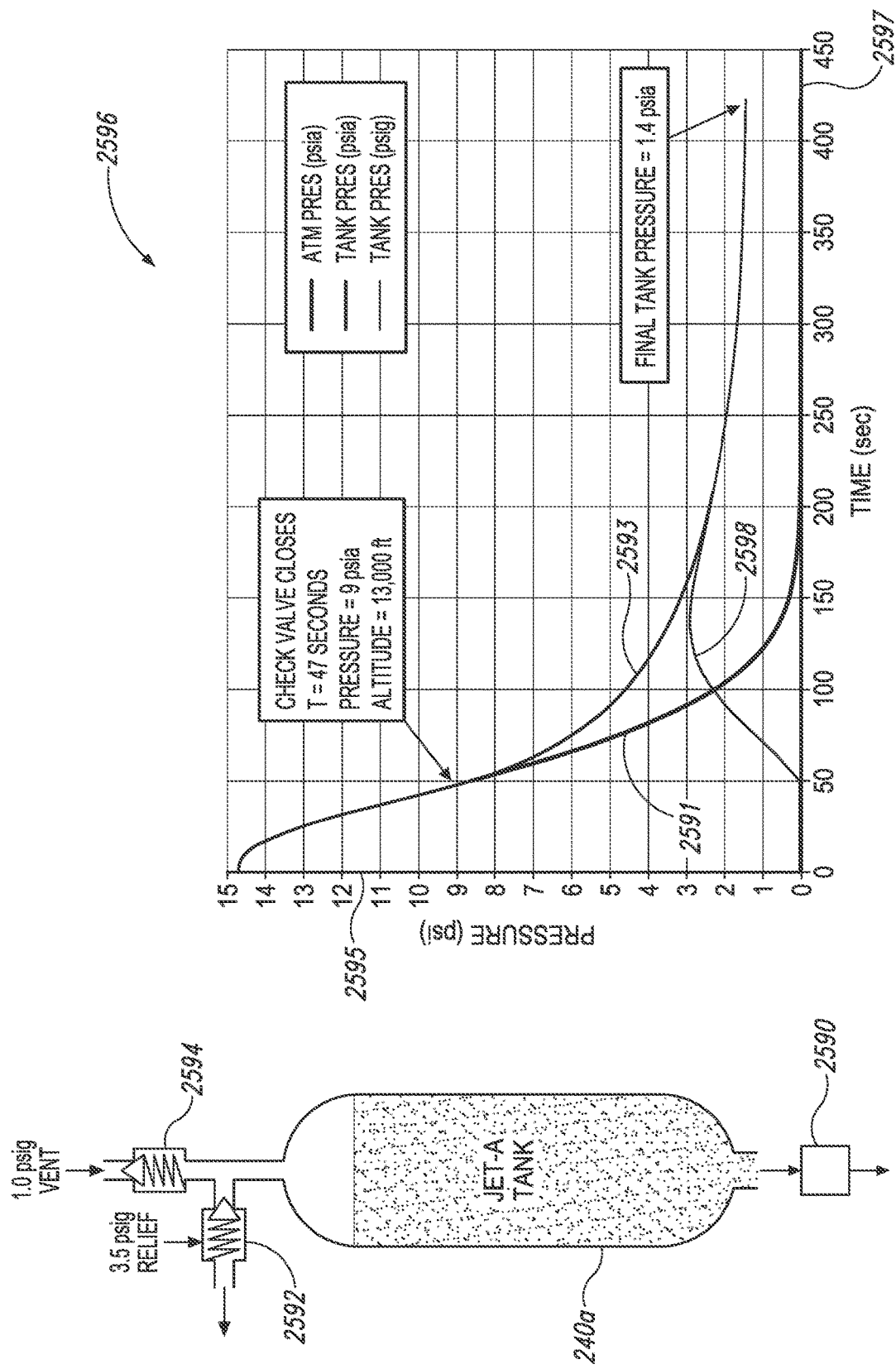
FIG. 25A is a partially schematic diagram of a fuel tank configured in accordance with embodiments of the present technology.
FIG. 25B presents a graph of various pressures versus time for the fuel tank and its environment.

FIG. 25A is a schematic diagram of the left-wing fuel tank 240a (FIG. 2), and FIG. 25b is a graph 2596 illustrating various pressures associated with the fuel tank 240a during vehicle ascent, in accordance with embodiments of the present technology. Although the foregoing description refers to the left-wing fuel tank 240a, it will be understood that the description applies equally to the right-wing fuel tank 240b. Referring to FIG. 25A, as noted above in some embodiments the vehicle 100 will use Jet-A as the fuel for the vehicle main engines 120a-c. Jet fuel is abundant, inexpensive, and has a naturally low vapor pressure across vehicle operating conditions which allows it to be stored inside aerospace vehicle wings, fuselages, etc. of virtually any shape. In the illustrated embodiment, the fuel tank 240a includes a first relief valve 2592, a second relief valve 2594, and a boost pump 2590. As with the LOX tank 242 described above with reference to FIG. 24A, during engine operation the fuel tank 240a can maintain positive pressure by the addition of vaporized propellant gasses supplied from a heat exchanger on one or more of the vehicle engines 120 (not shown). In orbit, residual ullage gasses can be vented from the fuel tank 240a through the first relief valve 2592. During reentry, the fuel tank 240a can be vented to atmosphere via the second relief valve 2594 to prevent negative pressure collapse. Although not shown, desiccant canisters can be installed at the vent inlet to the relief valve 2594 to prevent ingestion of moisture during ground operations.

Referring next to FIG. 25B, pressure in psi is measured along a vertical axis 2595, and time in seconds is measured along a horizontal axis 2597. A first plot line 2591 illustrates the atmospheric pressure as a function of time during vehicle ascent, and a second plot line 2593 illustrates the internal (absolute) pressure of the fuel tank 240a during this phase of flight. The differential tank pressure across the tank wall is illustrated by a third plot line 2598. In this embodiment, the first relief valve 2592 is open and the fuel tank 240a vents so that the internal pressure (second plot line 2593) is essentially equivalent to the atmospheric pressure (first plot line 2591) for the initial portion of vehicle ascent. At about 47 seconds after takeoff, the first relief valve 2592 closes. At this time, the vehicle will be at an altitude of about 13,000 ft. and the atmospheric pressure will be about 9 psia. As vehicle ascent continues, the tank internal pressure is allowed to build relative to the atmospheric pressure as shown by a comparison of the first plot line 2591 to the second plot line 2593. As a result of this pressure differential, the fuel tank 240a has a positive pressure differential across the tank walls of from about 3 psig to about 1.4 psig at the end of the vehicle ascent phase, as shown by the third plot line 2598.

Figure 26A:
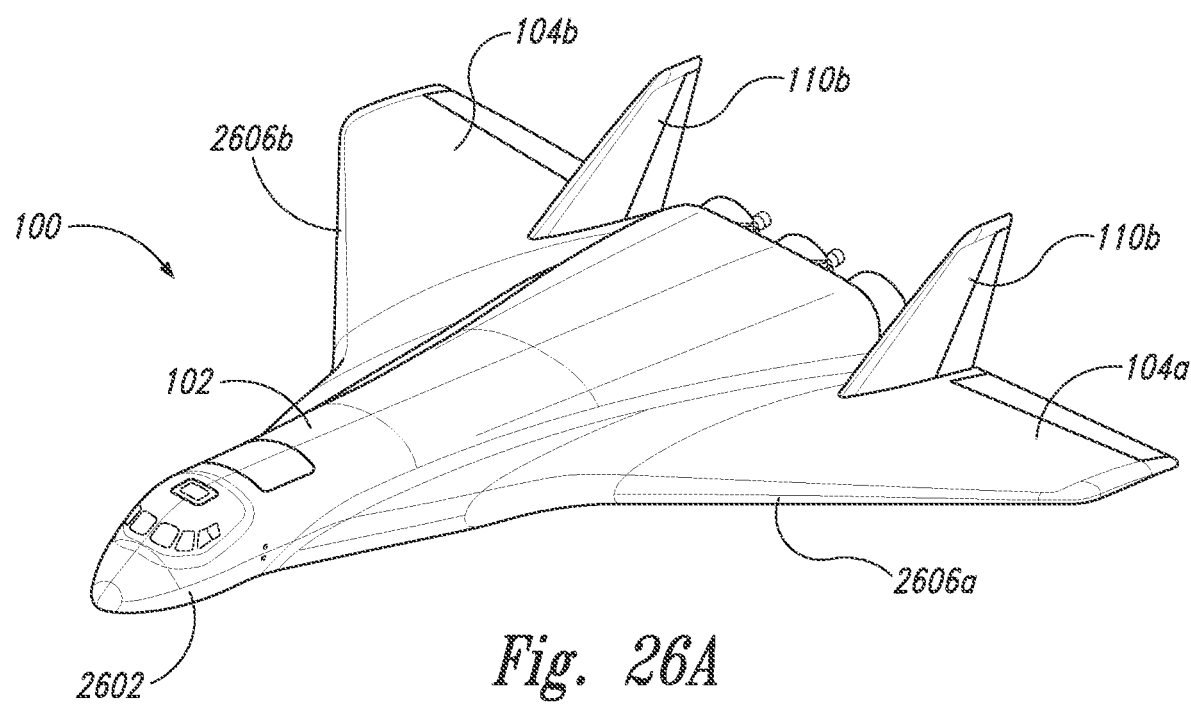
FIGS. 26A and 26B are top front isometric and bottom front isometric views, respectively, of the aerospace vehicle of FIGS. 1A-1D illustrating various aspects of the airframe and an associated thermal protection system, configured in accordance with embodiments of the present technology.
Figure 26B:
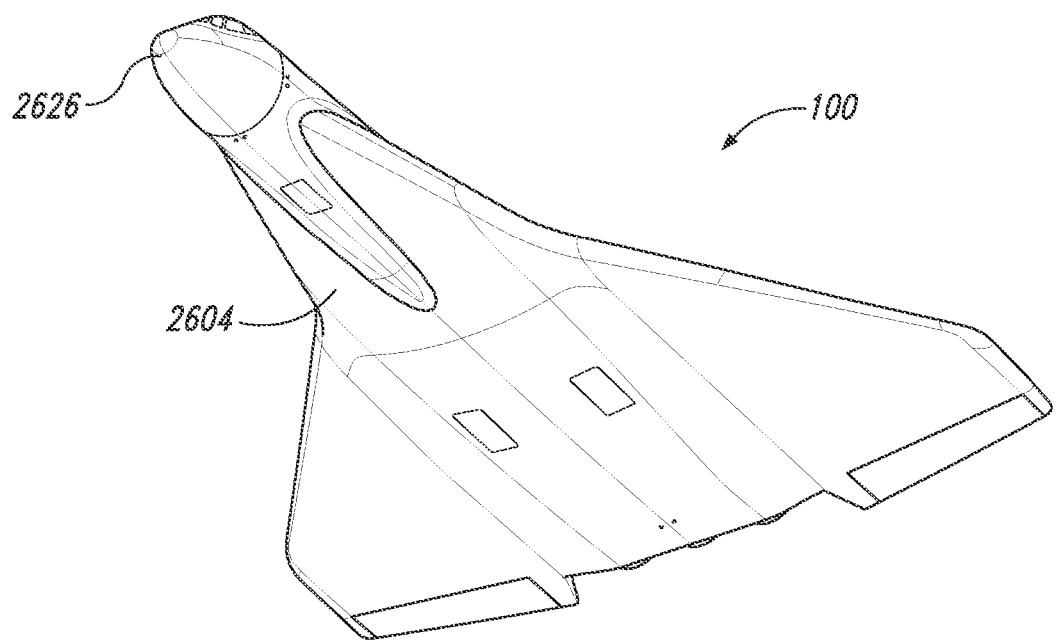

FIGS. 26A and 26B are top and bottom isometric views, respectively of the vehicle 100. In some embodiments, the vehicle primary structure, external surfaces, etc. (including, for example, the wings 104a, b, the fuselage 102, the vertical stabilizers 110a, b, etc.) can be constructed from lightweight, durable composite materials. The composite materials can include graphite and an epoxy matrix including, for example, a polyurethane that is resistant to micro cracking and oxygen infusion. In some embodiments, portions of vehicle 100 can also be constructed from metal including, for example, aluminum, titanium, stainless steel, etc. Additionally, portions of the vehicle 100 can be covered with a thermal protection system (TPS) to prevent structural degradation due to aerothermal heating during vehicle reentry. For example, in some embodiments the TPS can be applied to at least a fuselage nose portion 2602, wing leading edge portions 2606a and 2606b, and an underside portion 2604 of the fuselage 102 and the wings 104a, b. Various suitable materials known in the art may be used for the TPS. By way of example, in some embodiments the TPS can include a Toughened Uni-piece Fibrous Reinforced Oxidation-resistant Composite material known as "TUFROC." TUFROC can survive extreme heat environments up to 3,600 degrees F. and above. In other embodiments, other types of TPS materials can be used to protect vehicle 100 from aerothermal heating degradation.

There are a number of advantages associated with embodiments of the rocket powered launch sled 400 described above. For example, the launch sled 400 can enable the flight vehicle 100 to gain more velocity during the takeoff run than could otherwise be achieved by the unassisted vehicle 100. Additionally, by transferring propellant to the vehicle 100 during the takeoff run, the sled 400 enables the vehicle 100 to leave the ground full (or at least nearly full) of propellant, thereby minimizing (or at least reducing) the vehicle dry weight penalty and maximizing (or at least increasing) available flight performance. In this way, the sled 400 can be viewed as a "first stage" of the vehicle 100 that never leaves the ground. The sled 400 can also provide a measure of safety during the critical first seconds of vehicle main engine firing, because the sled braking system 455 (FIG. 4A) is configured to slow the vehicle 100 to a stop and/or hold it in place if anomalous performance of the main vehicle engines 120a-c is detected at any time during takeoff. Additionally, since the vehicle 100 takes off on the sled 400 and not its own landing gear 126a-c, the landing gear 126a-c do not have to be sized to withstand the structural loads associated with takeoff with a full load of propellant. Instead, the landing gear 126a-c need only be sized to carry the lower loads associated with landing with empty, or near empty, propellant tanks. Accordingly, the sled 400 also eliminates the need for a heavy-duty takeoff-rated landing gear system, thereby saving flight vehicle weight and reducing system complexity.

The above Detailed Description of examples and embodiments of the present technology is not intended to be exhaustive or to limit the disclosed technology to the precise forms disclosed above. While specific examples for the present technology are described above for illustrative purposes, various equivalent modifications are possible within the scope of the disclosed technology, as those skilled in the relevant art will recognize. For example, while processes, routines, and/or blocks are presented in a given order, alternative implementations may perform processes and routines having steps, or employ systems having blocks, in a different order, and some processes, routines or blocks may be deleted, moved, added, subdivided, combined, and/or modified to provide alternative or sub-combinations. Each of the processes or blocks may be implemented in a variety of different ways. Also, while processes or blocks are at times shown as being performed in series, these processes or blocks may instead be performed or implemented in parallel, or may be performed at different times.

Several embodiments of the present technology may take the form of controller- or computer-executable instructions, such as routines executed by the vehicle controller 140 and/or the sled controller 440, or by another data processing device, e.g., an onboard computer, special-purpose computer, server computer, personal computer, etc. Those skilled in the relevant art will appreciate that aspects of the present technology can be practiced with other computer/controller systems, including other communications, data processing, or computer system configurations. Aspects of the present technology can be embodied in a special purpose computer or data processor that is specifically programmed, configured, or constructed to perform one or more of the functions, methods, and/or computer-executable instructions explained herein. Accordingly, the terms "computer" and "controller" as generally used herein refer to any data processor and can include onboard and remote computers, Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including a liquid crystal display.

EXAMPLES

The following examples provide additional embodiments of the present technology:

1. A method of operating a reusable space vehicle, the method comprising:
 releasably attaching the space vehicle to a launch sled;
 igniting one or more rocket engines on the launch sled;
 igniting one or more rocket engines on the space vehicle; and
 providing propellant from one or more propellant tanks on the launch sled to the one or more rocket engines on the space vehicle and to the one or more rocket engines on the launch sled, while the one or more rocket engines on the space vehicle and the one or more rocket engines on the launch sled provide thrust for launch of the space vehicle.

2. The method of example 1, further comprising:
 accelerating the launch sled toward a takeoff speed of the space vehicle;
 at or near the takeoff speed, ceasing to provide propellant from the one or more propellant tanks on the launch sled to the one or more rocket engines on the space vehicle; and
 releasing the space vehicle from the launch sled.

3. The method of example 2, further comprising, at or near the takeoff speed, providing propellant from one or more propellant tanks on the space vehicle to the one or more rocket engines on the space vehicle.

4. The method of example 2, wherein the space vehicle is configured to fly into space, orbit the Earth, and then reenter the Earth's atmosphere, and wherein the method further comprises:
 flying the vehicle toward a landing site;
 deploying a landing gear on the vehicle; and
 horizontally landing the vehicle on the landing gear at the landing site.

5. The method of example 1, further comprising returning vented propellant from the space vehicle to the one or more propellant tanks on the launch sled as the one or more rocket engines on the space vehicle provide thrust for launch of the space vehicle.

6. The method of example 1 wherein the one or more propellant tanks on the launch sled includes an oxidizer tank, and wherein providing propellant from the one or more propellant tanks on the launch sled includes providing oxidizer from the oxidizer tank to the one or more rocket engines on the launch sled and to the one or more rocket engines on the space vehicle.

7. The method of example 1 wherein the one or more propellant tanks on the launch sled includes a fuel tank, and wherein providing propellant from the one or more propellant tanks on the launch sled includes providing fuel from the fuel tank to the one or more rocket engines on the launch sled and to the one or more rocket engines on the space vehicle.

8. The method of example 1 wherein the one or more propellant tanks on the launch sled include an oxidizer tank and a fuel tank, and wherein providing propellant from the one or more propellant tanks includes providing oxidizer from the oxidizer tank and fuel from the fuel tank to the one or more rocket engines on the space vehicle and to the one or more rocket engines on the launch sled.

9. The method of example 1 wherein the launch sled includes a first oxidizer tank and a second oxidizer tank, and wherein providing propellant from the one or more propellant tanks includes providing oxidizer from the first oxidizer tank to the one or more rocket engines on the launch sled and providing oxidizer from the second oxidizer tank to the one or more rocket engines on the space vehicle.

10. The method of example 1 wherein the launch sled includes a first fuel tank and a second fuel tank, and wherein providing propellant from the one or more propellant tanks includes providing fuel from the first fuel tank to the one or more rocket engines on the launch sled and providing fuel from the second fuel tank to the one or more rocket engines on the space vehicle.

11. The method of example 1, further comprising:
 prior to igniting the one or more rocket engines on the launch sled and the one or more rocket engines on the space vehicle, releasably attaching a propellant umbilical between the launch sled and the space vehicle, wherein providing propellant from one or more propellant tanks on the launch sled to the one or more rocket engines on the space vehicle includes flowing the propellant through the propellant umbilical;
 after igniting the one or more rocket engines on the launch sled and the one or more rocket engines on the space vehicle, accelerating the launch sled toward a takeoff speed of the space vehicle;
 at or near the takeoff speed, disconnecting the propellant umbilical from the space vehicle; and
 releasing the space vehicle from the launch sled.

12. The method of example 1 wherein releasably attaching the space vehicle to the launch sled includes releasably coupling one or more support arms extending from the launch sled to the vehicle, and wherein the method further comprises:
 supporting the space vehicle solely by the one or more support arms.

13. The method of example 12, further comprising rotating the one or more support arms relative to the launch sled to increase an angle of attack of the space vehicle.

14. The method of example 1, further comprising:
 prior to releasably attaching the space vehicle to the launch sled, rolling the vehicle onto the launch sled on a vehicle landing gear, wherein releasably attaching the space vehicle to the launch sled includes releasably coupling one or more support arms extending from the launch sled to the vehicle; and
 retracting the vehicle landing gear so that the space vehicle is supported solely by the support arms.

15. The method of example 14, further comprising, prior to retracting the vehicle landing gear, rotating the one or more support arms relative to the launch sled to raise the vehicle off of the landing gear.

16. A space vehicle system, comprising:
a reusable space vehicle having one or more rocket engines; and
a launch sled having one or more rocket engines, wherein the launch sled is configured to support the space vehicle during launch from Earth, and wherein the launch sled is further configured to provide propellant to the one or more rocket engines of the launch sled and to the one or rocket engines of the space vehicle during launch of the space vehicle.

17. The space vehicle system of example 16 wherein the reusable space vehicle is a horizontal takeoff/horizontal landing (HTHL) spaceplane.

18. The space vehicle system of example 16 wherein the reusable space vehicle is a single-stage-to-orbit (SSTO) spaceplane.

19. The space vehicle system of example 16 wherein the one or more rocket engines on the vehicle are bipropellant engines that use liquid oxygen and liquid fuel.

20. The space vehicle system of example 16:
wherein the launch sled includes a first propellant tank,
wherein the space vehicle includes a second propellant tank that provides propellant to the one or more rocket engines on the space vehicle, and
wherein the launch sled further includes a propellant umbilical configured to transfer propellant from the first propellant tank to the second propellant tank during launch of the space vehicle.

21. The space vehicle system of example 20 wherein the first propellant tank provides propellant to the one or more rocket engines on the launch sled.

22. The space vehicle system of example 16:
wherein the launch sled includes a first propellant tank and a second propellant tank,
wherein the first propellant tank provides propellant to the one or more rocket engines on the launch sled,
wherein the space vehicle includes a third propellant tank that provides propellant to the one or more rocket engines on the space vehicle, and
wherein the launch sled further includes a propellant umbilical configured to transfer propellant from the second propellant tank to the third propellant tank during launch of the space vehicle.

23. The space vehicle system of example 16 wherein the launch sled includes a first oxidizer tank, wherein the space vehicle includes a second oxidizer tank that provides oxidizer to the one or more rocket engines on the space vehicle, and wherein the launch sled is configured to provide oxidizer from the first oxidizer tank to the second oxidizer tank during launch of the space vehicle.

24. The space vehicle system of example 16 wherein the launch sled includes a first fuel tank, wherein the space vehicle includes a second fuel tank that provides fuel to the one or more rocket engines on the space vehicle, and wherein the launch sled is configured to provide fuel from the first fuel tank to the second fuel tank during launch of the space vehicle.

25. The space vehicle system of example 16:
wherein the launch sled includes one or more support arms configured to releasably support the space vehicle on the launch sled,
wherein a distal end portion of each of the one or more support arms includes a hold and release mechanism configured to releasably attach to a corresponding interface on the space vehicle, and
wherein each of the one or more support arms is movable to change the position of the space vehicle relative to the launch sled.

26. The space vehicle system of example 16:
wherein the launch sled includes a first propellant tank,
wherein the space vehicle includes a second propellant tank that provides propellant to the one or more rocket engines on the space vehicle,
wherein the launch sled further includes a propellant umbilical configured to transfer propellant from the first propellant tank to the second propellant tank during launch of the space vehicle, the propellant umbilical extending between a propellant outlet interface on an upper portion of the launch sled to a propellant inlet interface on an underside of the space vehicle,
wherein the launch sled further includes at least one support arm having a proximal end portion pivotally coupled to the upper portion of the launch sled laterally adjacent to the propellant outlet interface, and a distal end portion configured to be releasably coupled to an interface fitting on the underside of the space vehicle laterally adjacent to the propellant inlet interface, and
wherein the at least one support arm is rotatable to change the position of the space vehicle relative to the launch sled.

27. A reusable space vehicle, comprising:
a pair of wings configured to provide lift during flight of the space vehicle in the Earth's atmosphere;
one or more rocket engines; and
an oxidizer tank configured to provide liquid oxygen to the one or more rocket engines, the oxidizer tank having a non-cylindrical and non-spherical shape.

28. The reusable space vehicle of example 27, further comprising a fuselage having an external sidewall, and wherein the external sidewall forms a portion of the oxidizer tank.

29. The reusable space vehicle of example 27 wherein the oxidizer tank is configured to withstand an internal pressure of less than 4 psig.

30. The reusable space vehicle of example 27 wherein the oxidizer tank is configured to carry liquid oxygen at a temperature of from about −196 degrees C. to about −182 degrees C. during launch of the space vehicle.

31. The reusable space vehicle of example 27, further comprising one or more structural interfaces on an underside thereof configured to releasably attach the space vehicle to a rocket-powered launch sled for takeoff of the space vehicle.

32. The reusable space vehicle of example 27, further comprising:
one or more structural interfaces on an underside thereof configured to releasably attach the space vehicle to a rocket-powered launch sled for takeoff of the space vehicle; and
a landing gear that is only used for landing the space vehicle.

33. A launch sled for launching a reusable space vehicle, the space vehicle having one or more rocket engines, the launch sled comprising:
one or more rocket engines for providing thrust to the launch sled during launch of the vehicle; and
a propellant tank configured to be operably coupled in fluid communication with the space vehicle, wherein the propellant tank is configured to provide propellant to the one or more engines of the space vehicle during launch of the space vehicle.

34. The launch sled of example 33, further comprising a propellant umbilical configured to be releasably connected between the launch sled and the space vehicle to transfer propellant therebetween during launch of the space vehicle.

35. The launch sled of example 33, further comprising a plurality of movable support arms configured to releasably attach the space vehicle to the launch sled and move the space vehicle relative to the launch sled.

36. A method for loading liquid oxygen into a horizontal takeoff/horizontal landing space vehicle, the method comprising:
cooling the liquid oxygen to a temperature of about −196 degrees C. or less; and
flowing the cooled liquid oxygen into an oxidizer tank on the space vehicle.

37. The method of example 36 wherein cooling the liquid oxygen includes flowing the liquid oxygen through a liquid nitrogen heat exchanger, and wherein the method further comprises:
venting oxygen from the oxidizer tank;
recirculating the vented oxygen through the liquid nitrogen heat exchanger to re-cool the liquid oxygen to a temperature of about −196 degrees C. or less; and
flowing the re-cooled liquid oxygen back to the oxidizer tank.

38. The method of example 36 wherein the space vehicle is mounted to a launch sled having a first oxidizer tank, wherein the oxidizer tank on the space vehicle is a second oxidizer tank, and wherein the method further comprises flowing the cooled liquid oxygen into the first oxidizer tank on the sled and then flowing the cooled liquid oxygen from the first oxidizer tank into the second oxidizer tank.

39. The method of example 36 wherein flowing the liquid oxygen into the oxidizer tank includes flowing the liquid oxygen into an oxidizer tank having a non-cylindrical, non-spherical shape.

40. The method of example 36 wherein flowing the liquid oxygen into the oxidizer tank includes flowing the liquid oxygen into an oxidizer tank on a space vehicle having a pair of wings for horizontal takeoff and landing in the Earth's atmosphere.

41. The method of example 36 wherein flowing the liquid oxygen into the oxidizer tank includes flowing the liquid oxygen into an oxidizer tank in a fuselage of a space vehicle having a pair of wings for horizontal takeoff and landing in the Earth's atmosphere, the oxidizer tank having a non-cylindrical, non-spherical shape.

References throughout the foregoing description to features, advantages, or similar language do not imply that all of the features and advantages that may be realized with the present technology should be or are in any single embodiment. Rather, language referring to the features and advantages is understood to mean that a specific feature, advantage, or characteristic described in connection with an embodiment is included in at least one embodiment of the present technology. Thus, discussion of the features and advantages, and similar language, throughout this specification may, but do not necessarily, refer to the same embodiment. Furthermore, the described features, advantages, and characteristics of the present technology may be combined in any suitable manner in one or more embodiments. One skilled in the relevant art will recognize that the present technology can be practiced without one or more of the specific features or advantages of a particular embodiment. In other instances, additional features and advantages may be recognized in certain embodiments that may not be present in all embodiments of the present technology.

Any patents and applications and other references noted herein, including any that may be listed in accompanying filing papers, are incorporated herein by reference. To the extent that any materials incorporated herein by reference conflict with the present disclosure, the present disclosure controls. Aspects of the present technology can be modified, if necessary, to employ the systems, functions, and concepts of the various references described above to provide yet further implementations of the present technology.

While the above description describes various embodiments of the disclosed technology and the best mode contemplated, regardless how detailed the above text, the technology can be practiced in many ways. Details of the system may vary considerably in its specific implementation, while still being encompassed by the present disclosure. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used should not be construed to limit the disclosed technology to the specific examples disclosed in the specification, unless the above Detailed Description section explicitly defines such terms. As used herein, the term "and/or", as in "A and/or B," refers to A alone, B alone, and both A and B. From the foregoing, it will be appreciated that specific embodiments of the disclosed technology have been described herein for purposes of illustration, but that various modifications may be made without deviating from the spirit and scope of the present disclosure.

From the foregoing, it will be appreciated that specific embodiments of the invention have been described herein for purposes of illustration, but that various modifications may be made without deviating from the spirit and scope of the various embodiments of the invention. Further, while various advantages associated with certain embodiments of the invention have been described above in the context of those embodiments, other embodiments may also exhibit such advantages, and not all embodiments need necessarily exhibit such advantages to fall within the scope of the invention. Accordingly, the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

We claim:

1. A method of operating a reusable space vehicle, the method comprising:
releasably attaching the space vehicle to a launch sled;
igniting one or more rocket engines on the launch sled;
igniting one or more rocket engines on the space vehicle;
providing propellant from one or more propellant tanks on the launch sled to the space vehicle and to the one or more rocket engines on the launch sled, while the one or more rocket engines on the space vehicle and the one or more rocket engines on the launch sled provide thrust for launch of the space vehicle; and
returning a portion of the propellant from the space vehicle to the one or more propellant tanks on the launch sled as the one or more rocket engines on the space vehicle provide thrust for launch of the space vehicle.

2. The method of claim 1, further comprising:
accelerating the launch sled toward a takeoff speed of the space vehicle;
at or near the takeoff speed, ceasing to provide propellant from the one or more propellant tanks on the launch sled to the space vehicle; and
releasing the space vehicle from the launch sled.

3. The method of claim 2, further comprising, at or near the takeoff speed, providing propellant from one or more propellant tanks on the space vehicle to the one or more rocket engines on the space vehicle.

4. The method of claim 2, wherein the space vehicle is configured to fly into space, orbit the Earth, and then reenter the Earth's atmosphere, and wherein the method further comprises:
flying the vehicle toward a landing site;
deploying a landing gear on the vehicle; and
horizontally landing the vehicle on the landing gear at the landing site.

5. The method of claim 1 wherein the one or more propellant tanks on the launch sled includes an oxidizer tank, and wherein providing propellant from the one or more propellant tanks on the launch sled includes providing oxidizer from the oxidizer tank to the one or more rocket engines on the launch sled and to the one or more rocket engines on the space vehicle.

6. The method of claim 1 wherein the one or more propellant tanks on the launch sled includes a fuel tank, and wherein providing propellant from the one or more propellant tanks on the launch sled includes providing fuel from the fuel tank to the one or more rocket engines on the launch sled and to the one or more rocket engines on the space vehicle.

7. The method of claim 1 wherein the one or more propellant tanks on the launch sled include an oxidizer tank and a fuel tank, and wherein providing propellant from the one or more propellant tanks includes providing oxidizer from the oxidizer tank and fuel from the fuel tank to the one or more rocket engines on the space vehicle and to the one or more rocket engines on the launch sled.

8. The method of claim 1 wherein the launch sled includes a first oxidizer tank and a second oxidizer tank, and wherein providing propellant from the one or more propellant tanks includes providing oxidizer from the first oxidizer tank to the one or more rocket engines on the launch sled and providing oxidizer from the second oxidizer tank to the one or more rocket engines on the space vehicle.

9. The method of claim 1 wherein the launch sled includes a first fuel tank and a second fuel tank, and wherein providing propellant from the one or more propellant tanks includes providing fuel from the first fuel tank to the one or more rocket engines on the launch sled and providing fuel from the second fuel tank to the one or more rocket engines on the space vehicle.

10. The method of claim 1, further comprising:
prior to igniting the one or more rocket engines on the launch sled and the one or more rocket engines on the space vehicle, releasably attaching a propellant umbilical between the launch sled and the space vehicle, wherein providing propellant from one or more propellant tanks on the launch sled to the space vehicle includes flowing the propellant through the propellant umbilical;
after igniting the one or more rocket engines on the launch sled and the one or more rocket engines on the space vehicle, accelerating the launch sled toward a takeoff speed of the space vehicle;
at or near the takeoff speed, disconnecting the propellant umbilical from the space vehicle; and
releasing the space vehicle from the launch sled.

11. The method of claim 1 wherein releasably attaching the space vehicle to the launch sled includes releasably coupling one or more support arms extending from the launch sled to the vehicle, and wherein the method further comprises:
supporting the space vehicle solely by the one or more support arms.

12. The method of claim 11, further comprising rotating the one or more support arms relative to the launch sled to increase an angle of attack of the space vehicle.

13. The method of claim 1, further comprising:
prior to releasably attaching the space vehicle to the launch sled, rolling the vehicle onto the launch sled on a vehicle landing gear, wherein releasably attaching the space vehicle to the launch sled includes releasably coupling one or more support arms extending from the launch sled to the vehicle; and
retracting the vehicle landing gear so that the space vehicle is supported solely by the support arms.

14. The method of claim 13, further comprising, prior to retracting the vehicle landing gear, rotating the one or more support arms relative to the launch sled to raise the vehicle off of the landing gear.

15. The method of claim 1, wherein providing propellant from one or more propellant tanks on the launch sled to the space vehicle includes providing propellant from the one or more propellant tanks on the launch sled to one or more propellant tanks on the space vehicle that provide the propellant to the one or more rocket engines on the space vehicle.

16. The method of claim 1, wherein providing propellant from one or more propellant tanks on the launch sled to the space vehicle includes providing propellant from the one or more propellant tanks on the launch sled to the one or more rocket engines on the space vehicle.

* * * * *